(12) United States Patent
Rasmussen

(10) Patent No.: US 9,359,034 B2
(45) Date of Patent: Jun. 7, 2016

(54) CYCLE AND ASSOCIATED COMPONENTS

(71) Applicant: Recreation Systems, Inc., Kaysville, UT (US)

(72) Inventor: C. Martin Rasmussen, Ogden, UT (US)

(73) Assignee: Recreation Systems, Inc., Kaysville, UT (US)

(*) Notice: Subject to any disclaimer, the term of this patent is extended or adjusted under 35 U.S.C. 154(b) by 0 days.

(21) Appl. No.: 14/327,302

(22) Filed: Jul. 9, 2014

(65) Prior Publication Data

US 2014/0346752 A1    Nov. 27, 2014

Related U.S. Application Data

(63) Continuation-in-part of application No. PCT/US2013/021343, filed on Jan. 12, 2013.

(60) Provisional application No. 61/586,110, filed on Jan. 12, 2012, provisional application No. 61/878,593, filed on Sep. 16, 2013, provisional application No. 61/978,830, filed on Apr. 12, 2014.

(51) Int. Cl.
| | |
|---|---|
| *B62K 5/05* | (2013.01) |
| *B62K 25/04* | (2006.01) |
| *B62M 11/14* | (2006.01) |
| *B62M 6/00* | (2010.01) |
| *B62K 25/28* | (2006.01) |
| *B62K 3/00* | (2006.01) |

(52) U.S. Cl.
CPC . *B62K 5/05* (2013.01); *B62K 3/005* (2013.01); *B62K 25/04* (2013.01); *B62K 25/28* (2013.01); *B62M 6/00* (2013.01); *B62M 11/14* (2013.01)

(58) Field of Classification Search
CPC ............ B62K 5/05; B62K 5/027; B62K 5/08; B62K 2005/001
See application file for complete search history.

(56) References Cited

U.S. PATENT DOCUMENTS

| 585,416 | A | * | 6/1897 | Wattles | ........... F16H 55/36 474/167 |
|---|---|---|---|---|---|
| 3,329,444 | A | | 7/1967 | Lidov | |
| 3,979,136 | A | | 9/1976 | Lassiere | |
| 4,070,032 | A | | 1/1978 | Cunningham | |
| 4,186,935 | A | * | 2/1980 | Rudwick | .............. 280/269 |
| 4,198,072 | A | * | 4/1980 | Hopkins | .............. 280/267 |
| 4,456,277 | A | * | 6/1984 | Carpenter | ............ 280/282 |
| 4,502,705 | A | | 3/1985 | Weaver | |
| 4,548,421 | A | * | 10/1985 | Wiener | .............. 280/282 |
| 4,634,137 | A | * | 1/1987 | Cocksedge | ........... 280/256 |

(Continued)

FOREIGN PATENT DOCUMENTS

| DE | 19838328 C1 | 12/1999 |
|---|---|---|
| DE | 202008004907 U1 | 7/2008 |
| WO | WO 2013/106797 A1 | 7/2013 |

OTHER PUBLICATIONS

International Search Report, PCT/US2013/021343, Mar. 7, 2013 (9 pp.).

(Continued)

*Primary Examiner* — Kevin Hurley
(74) *Attorney, Agent, or Firm* — Holland & Hart LLP

(57) ABSTRACT

A recumbent cycle includes a toothed belt drive system and rear suspension. It also includes a double A-arm suspension assembly and at least one transmission having a planetary gear arrangement.

32 Claims, 53 Drawing Sheets

(56) References Cited

U.S. PATENT DOCUMENTS

| | | | |
|---|---|---|---|
| 4,826,190 A | 5/1989 | Hartmann | |
| 4,846,489 A * | 7/1989 | Kleinebenne | B62K 3/06 280/361 |
| 5,069,469 A | 12/1991 | Rosengrant et al. | |
| 5,486,143 A * | 1/1996 | Ashby | B62M 9/06 474/148 |
| 5,516,134 A | 5/1996 | Crawford et al. | |
| 5,553,881 A * | 9/1996 | Klassen | B62K 25/286 280/283 |
| 5,584,494 A | 12/1996 | Krumm | |
| 5,607,171 A | 3/1997 | Labranche | |
| 5,672,133 A | 9/1997 | Eden | |
| 5,788,254 A | 8/1998 | Davis | |
| 5,873,590 A | 2/1999 | Abe et al. | |
| 6,000,707 A | 12/1999 | Miller | |
| 6,039,137 A * | 3/2000 | Schless | B62M 6/45 180/220 |
| 6,206,397 B1 * | 3/2001 | Klassen | B62K 25/286 280/284 |
| 6,695,335 B1 | 2/2004 | Gaastra | |
| 7,114,737 B1 | 10/2006 | Rasmussen | |
| 7,195,088 B2 | 3/2007 | Matsueda et al. | |
| D558,645 S | 1/2008 | Camasmie | |
| D563,284 S | 3/2008 | Camasmie | |
| 7,338,058 B2 | 3/2008 | Nicolai | |
| 7,338,059 B2 | 3/2008 | Sugimoto | |
| 7,354,055 B2 * | 4/2008 | Rasmussen | 280/282 |
| D570,745 S | 6/2008 | Camasmie | |
| 7,401,799 B2 | 7/2008 | Rasmussen | |
| 7,708,291 B1 * | 5/2010 | Henderson | 280/124.103 |
| 7,854,441 B2 * | 12/2010 | Scurlock | B62K 19/30 248/200 |
| 7,862,064 B2 | 1/2011 | Camasmie | |
| 2004/0188977 A1 * | 9/2004 | Jones et al. | 280/282 |
| 2005/0093270 A1 * | 5/2005 | Wilcox et al. | 280/282 |
| 2010/0194068 A1 * | 8/2010 | Henderson | 280/124.103 |
| 2010/0194182 A1 * | 8/2010 | Katz | B62H 5/08 301/109 |
| 2010/0263959 A1 * | 10/2010 | Hoebel et al. | 180/443 |
| 2011/0247888 A1 * | 10/2011 | Kohlbrenner | 180/206.7 |
| 2011/0316251 A1 * | 12/2011 | Lumpkin | B62K 19/30 280/285 |
| 2012/0038130 A1 * | 2/2012 | Wuthrich | B62K 3/10 280/284 |
| 2012/0274042 A1 * | 11/2012 | Harris | B62K 19/24 280/288 |
| 2014/0231163 A1 * | 8/2014 | Stieger | B62M 6/40 180/206.4 |

OTHER PUBLICATIONS

Gates, Technical Manual 2012, Feb. 2012 (42 pp.).

* cited by examiner

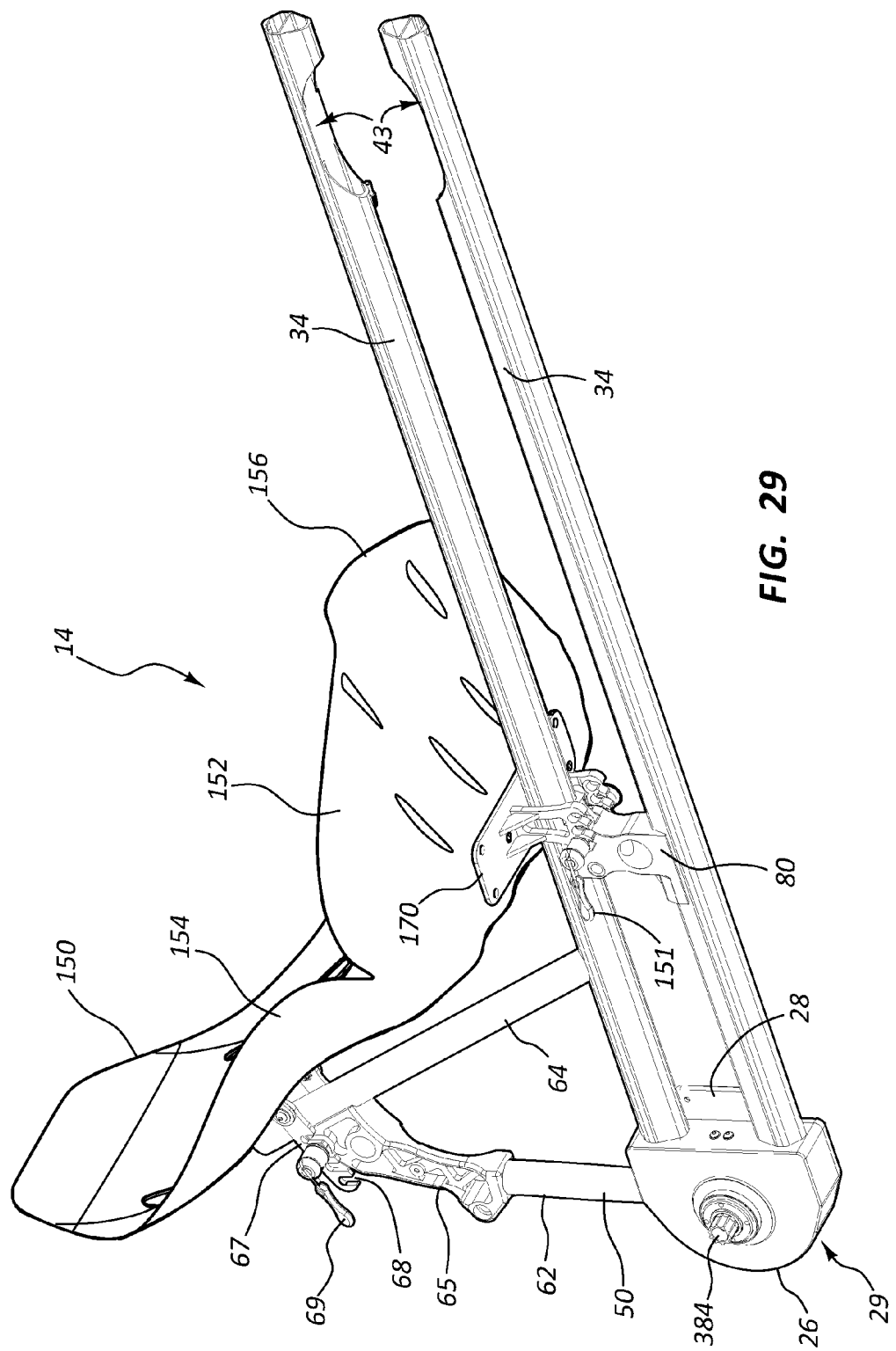

CYCLE AND ASSOCIATED COMPONENTS

CROSS-REFERENCE TO RELATED PATENT APPLICATIONS

This is a continuation-in-part of International Pat. App. No. PCT/US2013/021343, titled "Cycle and Associated Components," filed on 12 Jan. 2013, published as WO 2013/106797, which claims the benefit of U.S. Provisional Patent Application No. 61/586,110, titled "Recumbent Cycle," filed on 12 Jan. 2012, all of which are incorporated by reference into this document in their entirety. This also claims the benefit of U.S. Provisional Patent Application No. 61/878,593, titled "Cycle and Associated Components," filed on 16 Sep. 2013 and U.S. Provisional Patent Application No. 61/978,830, titled "Motors for Bicycles and Other Cycles," filed on 12 Apr. 2014, all of which are incorporated by reference into this document in their entirety. U.S. Pat. No. 7,401,799, titled "Recumbent Vehicle," issued on 22 Jul. 2008, is incorporated by reference into this document in its entirety.

BACKGROUND

More and more people are discovering the many benefits associated with cycling. One of the biggest benefits comes in the form of needed exercise. Unlike running and other forms of exercise, cycling does not involve harsh shocks to the knees or other parts of the body. Instead, pedaling is a fluid motion that requires a constant amount of effort depending on the terrain. Cycling outdoors has the added benefit of enabling riders to experience nature and view beautiful scenery. Some riders enjoy the experience of racing or cycling through rugged mountain terrain.

Riders of conventional upright bicycles sit above the pedals and lean forward to grip the handlebars. In this orientation, the amount of downward force that the rider can apply to the pedals is limited by the rider's weight and gravity. If the rider tries to apply more downward force, it will simply push the rider up rather than push the pedal down. Varying the position of the rider can have a dramatic effect upon the amount of power the rider translates to the crank arm and gearing of the bicycle.

Although individuals of varying ages can enjoy riding upright bicycles, as riders become older it becomes more difficult to use existing bicycles due to the riding position where the rider has to lean forward onto the handlebars when extra power is required. To alleviate the problems associated with this riding position, many bicycling enthusiasts turn to recumbent cycles that allow the rider to have a more reclined sitting position.

A recumbent cycle is a bicycle or tricycle that places the rider in a laid-back reclining position. This design has a number of ergonomic benefits with the principal benefit being that the rider's weight is distributed comfortably over a larger area and is supported by the back and buttocks. On a traditional upright bicycle, the rider's weight rests entirely on a small portion of the sitting bones, the feet, and the hands.

The riding position of conventional recumbent cycles still presents problems for the rider. For example, most of them force the rider to lay back in an almost horizontal position. The rider must lift his or her head just to see the path ahead. Over time, the strain on the rider's head and neck can make this position very uncomfortable.

Recumbent cycles sometimes have an aerodynamic advantage over upright bicycles. The reclined, legs-forward position of the rider's body presents a smaller frontal profile. Recumbent cycles are available in a wide range of configurations, including: long and short wheelbase; large, small, or a mix of wheel sizes; overseat, underseat, or no-hands steering; and rear wheel or front wheel drive.

One type of recumbent cycle is a recumbent bicycle. It has two in-line wheels with the seat mounted on a frame between the wheels. The seat includes a backrest to provide support for the rider. The crank arm and pedals are mounted near the front of the frame and forward of the front wheel so that the rider's legs are either generally horizontal or slightly upwardly inclined while riding. This orientation allows the rider to apply large amounts of force to the pedals and crank arm.

This type of recumbent bicycle still suffers from a number of problems. The sitting position of the rider—i.e., the legs horizontal or slightly upwardly inclined while riding—makes it difficult to balance, especially at low speeds and when the rider is starting out. In fact, it is virtually impossible to balance the recumbent bicycle when starting out on an incline.

Mounting the recumbent bicycle is also difficult due to the placement of the frame and seat. There are also long lengths of exposed chain that extend between the front and rear of the recumbent bicycle that can contact the clothes or skin of the rider, which, in a worst case scenario, could even injure the rider.

Some of these problems can be reduced or eliminated by switching to a three-wheeled recumbent cycle, otherwise known as a recumbent tricycle. The extra wheel increases the stability of the cycle. Unfortunately, many of the problems with conventional recumbent bicycles still remain. For example, riders still find it difficult to mount recumbent tricycles and can still contact the exposed chains.

Conventional recumbent tricycles also suffer from handling and suspension problems. The tricycle may experience undue amounts of roll when the rider turns at medium to high speeds. The roll feeling is unsettling to the rider and can cause the rider to lose control. Also, it can be difficult to adjust the suspension to fit each rider.

Another problem associated with conventional recumbent cycles is that they are often fabricated using manufacturer specific components that are difficult for a typical bicycle facility to repair. The facility is required to order special parts from the manufacturer, which means the cycle is stuck in the shop for a long period of time. Additionally, existing bicycle racks used to repair conventional upright bicycles may not be capable of mounting conventional recumbent cycles.

A further problem associated with conventional recumbent cycles is that they are not capable of using a belt drive system. A belt drive uses one or more toothed belts to transmit power from the pedals to the wheel. Belt drives provide a number of advantages over conventional chain-driven cycles such as low maintenance since the belt doesn't rust and doesn't require lubrication, smooth operation due to the teeth completely engaging and thereby reducing friction, quiet operation, longer life than chains, lightweight, and the like.

Few cycles, if any, recumbent or otherwise, are capable of using a belt drive with a wheel that is also part of a suspension system. The difficulty arises because a belt drive must be maintained at constant tension and the wheel must be capable of pivoting up and down. The tension on the belt must remain constant throughout the wheel's entire range of motion. Conventional chain driven cycles rely on a chain tensioner to provide constant tension. A tensioner cannot be used with a belt because belts cannot wrap like a chain.

Another problem with conventional cycles, recumbent or otherwise, is that they cannot be easily modified to add or remove an electric motor. The cycles are manufactured with or without a motor and once made most of them cannot be converted without making drastic modifications. A user who purchases a conventional cycle must choose at the outset whether the cycle will have an electric motor. In many cases, the only way for the user to switch later is to purchase the other model.

There are a number of benefits associated with a cycle that can be easily converted from manual only operation (i.e., pedals only) to electric only or some combination of the two. For one, it is more economical to manufacture and inventory a single cycle to which a motor can be added or removed than it is to manufacture multiple models. Also, end users appreciate the ability to easily interchange parts because they can now do things such as remove the electric motor to reduce the weight of the cycle when going on a long ride for exercise or add the electric motor to provide extra climbing power on a ride through hilly terrain.

It would be desirable to provide cycles that overcome one or more of these problems or provides some other advantage. In particular, it would be desirable to provide a tadpole tricycle that overcomes one or more of these problems.

SUMMARY

The following description is generally directed towards a tadpole tricycle that provides a stable platform upon which a rider can sit. Advantageously, the tadpole tricycle includes a suspension system that provides the rider with a more comfortable ride than existing tricycles. The suspension allows the the seat to be positioned at a height that is about the same as the horizontal portion of a typical chair. This aids the rider with mounting and dismounting the tadpole tricycle. In addition to positioning the seat at the desired height, the seat can optionally be inclined and moved relative to the position of the pedals and crankset.

The tadpole tricycle includes a rear wheel assembly coupled to a rear or second portion of a frame assembly. A front wheel assembly is coupled to a front or first portion of the frame assembly. A transmission assembly drivingly engages the rear wheel assembly and propels the tadpole tricycle along the ground. The transmission assembly includes a front or first gear ring (also referred to as a toothed wheel) that is slidably mounted to the front portion of the frame assembly. The front gear ring can moved relative to the frame assembly to vary the distance of the front gear ring from the rear wheel assembly. The front wheel assembly is coupled to the frame assembly at a location between the front portion and the rear portion of the frame assembly.

In one embodiment, the frame assembly includes at least one tubular member having a first end, a second end, and a channel or lumen between the first end and the second end. The transmission assembly includes the front gear ring coupled to the front portion of the frame assembly and a rear or second gear ring (also referred to as a toothed wheel) coupled to the rear portion. A chain extends from the front gear ring to the rear gear ring through the lumen of the at least one tubular member.

The tadpole tricycle can also include a suspension system for one or both of the front wheel assembly and the rear wheel assembly. In one embodiment, the suspension system for the front wheel assembly includes a double A-arm suspension system. The double A-arm suspension can be adjusted to alter its stiffness as desired by the rider. For example, the rider may wish to adjust the stiffness of the suspension system based on factors such as the rider's weight, terrain being traversed, and so forth.

The transmission assembly can include a front transmission assembly located at the front portion of the frame assembly and a rear transmission assembly located at the rear portion of the frame assembly. The front transmission assembly includes the crank arms and pedals and is powered by the rider's legs. The power provided by the rider at the front transmission assembly is transferred to the rear transmission assembly by way of a chain or other flexible drive member. The rear transmission assembly transfers the power to the rear wheel assembly to drive the tadpole tricycle.

The transmission assembly can include a secondary power connector where a secondary power source can be coupled to the tadpole tricycle. Secondary power sources include electric motors, gasoline motors, and the like. The tadpole tricycle can be configured so that the secondary power source can be added or removed quickly and easily and without making substantial modifications. In one embodiment, the rear transmission assembly includes the secondary power connector and the the secondary power source bolts directly to the side of the rear transmission assembly.

In one embodiment, the transmission assembly includes one or more toothed belts that drive movement of the tadpole tricycle. For example, a toothed belt can be used to transfer power from the rear transmission assembly to the hub of the rear wheel assembly. Also, a toothed belt can be used to transmit power from the front transmission assembly to the rear transmission assembly.

The rear transmission assembly includes a rear axle that transmits power received from the front transmission assembly or the secondary power source to the rear wheel assembly. The rear wheel assembly can be configured to pivot on the same axis as the rear axle. The distance between the rear hub assembly and the rear axle remains constant over the entire range of motion of the rear wheel assembly so that flexible drive members such as toothed belts can be used with a fully suspended rear wheel assembly.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

DRAWINGS

The preferred and other embodiments are disclosed in association with the accompanying drawings in which:

FIG. 29 shows a perspective view of the seat shown in FIGS. 27-28 coupled to the frame assembly shown in FIG. 5.

DETAILED DESCRIPTION

Figure 1:
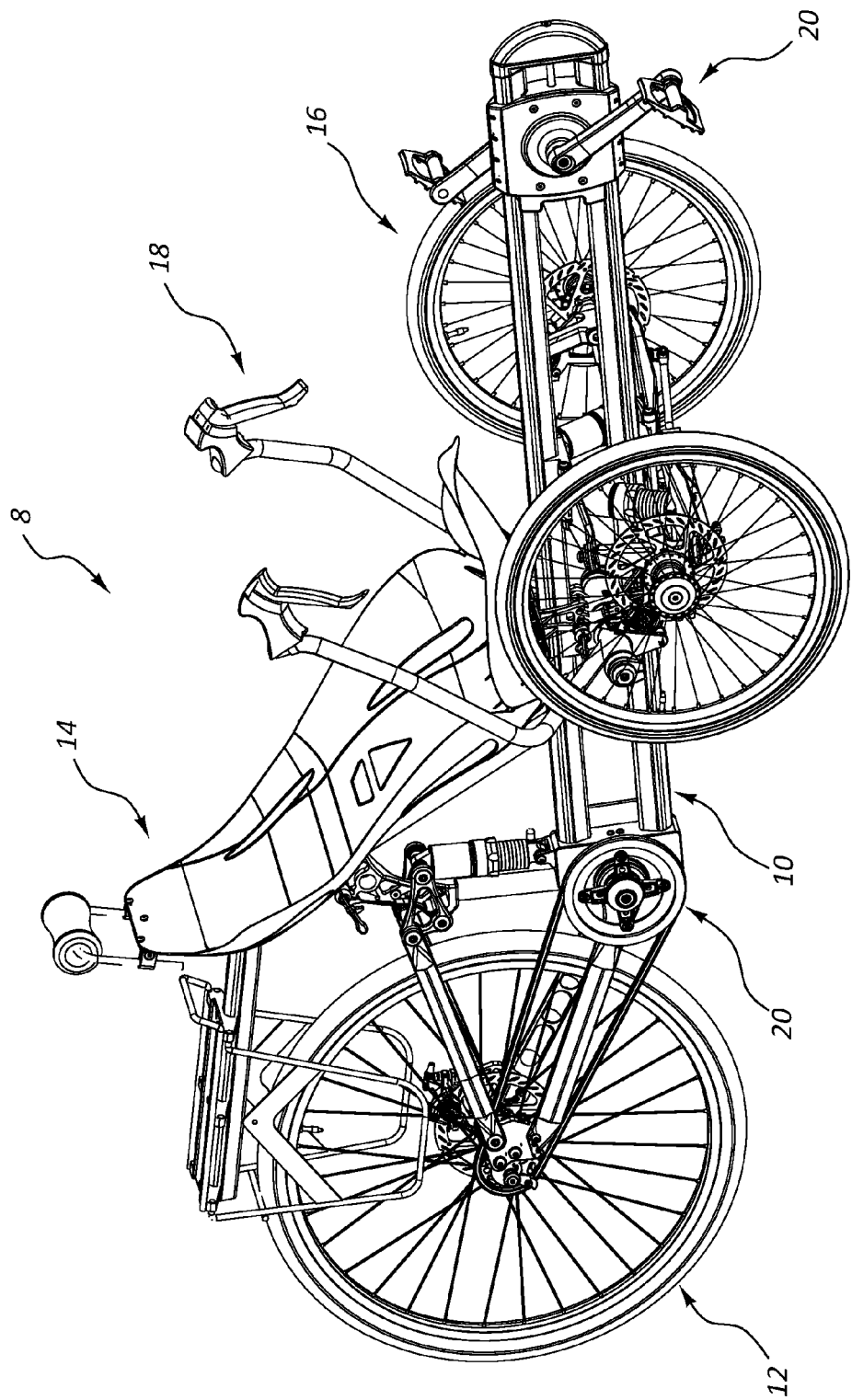
FIGS. 1-4 show perspective views of one embodiment of a tadpole tricycle.

A tadpole tricycle is used to illustrate the various components, features, characteristics, and advantages of the disclosed subject matter. The tadpole tricycle itself represents a significant advance relative to existing cycles, particularly existing recumbent cycles. However, many of the individual components and configurations shown in connection with the tadpole tricycle can be applied separately or in various combinations to other cycles such as recumbent cycles and upright cycles having two, three, or four wheels. For example, the entire rear wheel assembly, suspension, and drivetrain or any individual components from them can be used in upright cycles with only minor modifications. Thus, it should be appreciated that the concepts and components describe in connection with the tadpole tricycle can also be used with and incorporated into any other cycle, individually or in any suitable combination.

The tadpole tricycle is a type of recumbent cycle that has two front wheels and a single rear wheel. It provides a stable platform upon which a rider can sit during operation. The tadpole tricycle includes a front suspension system and a rear suspension mechanism that provides a comfortable and relaxing ride, which is superior to conventional recumbent cycles. The seat of the tadpole tricycle enhances the rider's comfort by at least partially conforming to the shape of the rider's body. The seat can also flex as the tricycle turns to increase stability and comfort. The position and orientation of the seat, pedals, and crank arms can be adjusted to accommodate riders of various sizes.

The tadpole tricycle allows the rider to easily mount and dismount due to the position of the seat relative to the ground. The seat is positioned at a height that is about the same as the horizontal portion of a typical chair. The seat incline and distance to the pedals and the crank arm can be adjusted to fit each rider.

Many of the components are conventional "off-the-shelf" bicycle components. This makes it simple to repair and service the tricycle. Most common repairs can be made by a typical bicycle shop without contacting the manufacturer and/or ordering specialized parts. Maintenance and repairs can be simple enough that the rider can do them on his/her own. The use of "off-the-shelf" components also allows the rider to upgrade the components as desired without purchasing a completely new cycle. In this way, the tadpole tricycle can be adapted to any type of rider.

Turning to FIGS. 1-4, a tadpole tricycle 8 includes a frame assembly 10 (also referred to as a frame) upon which are coupled various additional assemblies and components. The frame assembly 10 provides structural support to the tadpole tricycle 8 and is sized to accommodate a variety of riders. A rear wheel assembly 12, a seat assembly 14, and a front wheel assembly 16 are coupled to the frame assembly 10.

It should be noted that for purposes of this disclosure, the term "coupled" means the joining of two members directly or indirectly to one another. Such joining can be stationary in nature or movable in nature. Such joining can be achieved with the two members or the two members and any additional intermediate members being integrally formed as a single unitary body with one another or with the two members or the two members and any additional intermediate member being attached to one another. Such joining can be permanent in nature or alternatively can be removable or releasable in nature.

The rear wheel assembly 12, as the name suggests, includes the various components associated with the rear wheel of the tadpole tricycle 8, such as, but not limited to, a rear support structure, a rear shock assembly, a rear wheel, and a rear drive sprocket with associated rear axle. A tire mounts to the rear wheel. In one embodiment, all of these components are off-the-shelf components to aid with easy repair and maintenance of the tadpole tricycle 8. In another embodiment, one or more of these components are custom and proprietary.

The seat assembly 14 generally provides the structures and components that enable a rider to sit upon the tadpole tricycle 8. The front wheel assembly 16 provides the components associated with suspending and supporting the front wheels of the front wheel assembly 16 from the frame assembly 10 in a manner that dampens and/or absorbs the forces applied by bumps and other road hazards that a rider may encounter.

A steering assembly 18 is coupled to the frame assembly 10 and includes the components and structures that allow the rider to steer the tadpole tricycle 8. In one embodiment, the rider can lock the steering assembly 18 to aid with mounting and dismounting the tadpole tricycle 8 or when the rider wishes to apply additional force to the transmission assembly 20, such as when the rider is climbing a hill.

A transmission assembly 20 (also referred to as a drivetrain) is coupled to the frame assembly 10 and includes the components and structures that allow the rider to "drive" or power the tadpole tricycle 8 along a surface. In one embodiment, the transmission assembly 20 includes a front gear ring (also referred to as a toothed wheel) linked to a rear gear ring (also referred to as a toothed wheel) by a flexible drive member such as a roller chain. The front gear ring is coupled to a pair of pedals and associated crank arms. The rear gear ring is linked to a rear hub assembly so that energy applied to rotate the rear gear ring is translated to the rear wheel.

Figure 5:
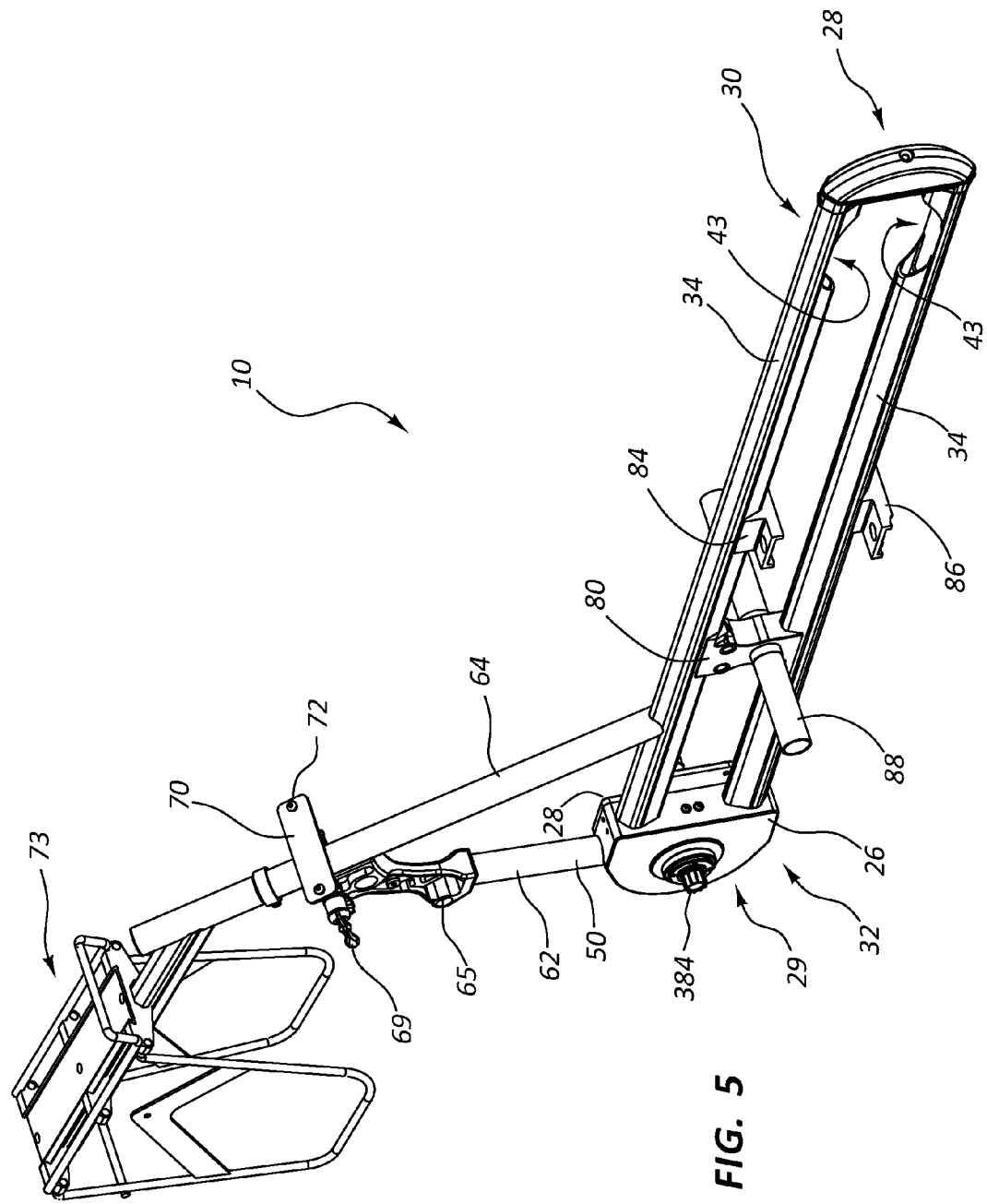
FIG. 5 shows a perspective view of the frame assembly of the tadpole tricycle shown in FIGS. 1-4.

As shown in FIG. 5, the frame assembly 10 has a first end 30 and a second end 32. Two tubular members 34 extend between the first end 30 and the second end 32. A nose assembly 21 is positioned at the first end 30 and a rear transmission assembly 29 is disposed at second end 32. The transmission assembly includes a rear transmission case 26 and a rear transmission cover 28, which together form a transmission housing.

Figure 6:
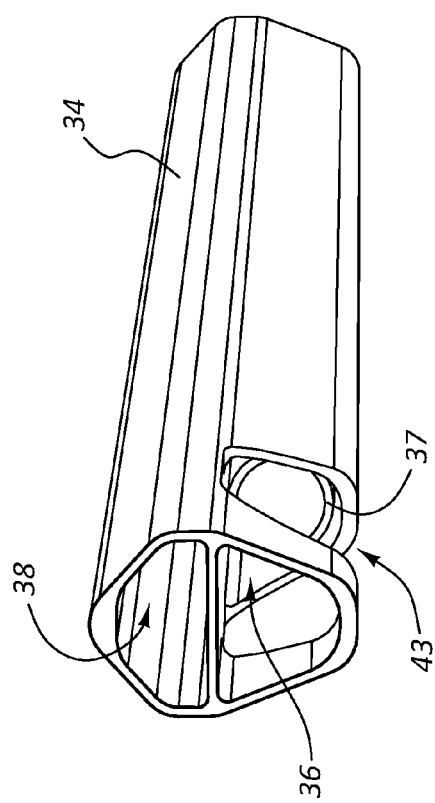
FIGS. 6-7 show perspective views of the upper and lower tubular members, respectively, of the frame assembly shown in FIG. 5.
Figure 7:
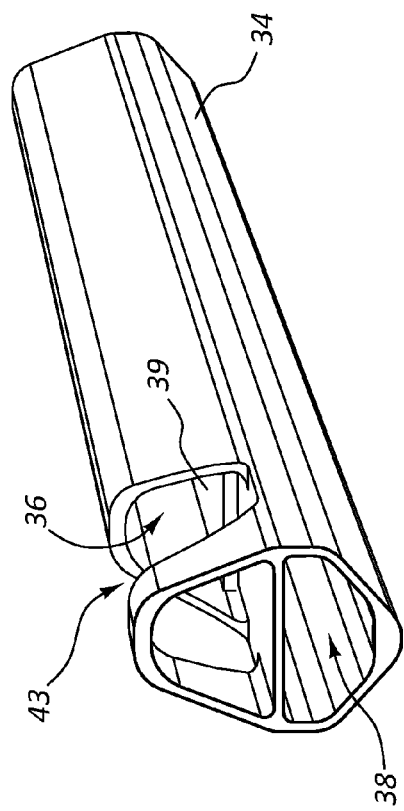

One embodiment of the tubular members 34 is shown in FIGS. 6-7. They have a generally polygonal cross-section and include a first channel 36 and a second channel 38. It should be appreciated, however, that the tubular members 34 can have any suitable shape or configuration. For example, the tubular members 34 can have a variety of cross-sectional shapes, such as but not limited to, generally round, oval, square, rectangular, triangular, or any other cross-section.

The configuration of the tubular members 34 depicted in FIGS. 6-7 represent the upper and lower tubular members, respectively. The upper and lower tubular members 34 are the same but are oriented inversely relatively to each other. Because the upper and lower tubular members 34 are the same, it makes it simpler to manufacture and inventory the frame assembly 10.

The first channel 36 in both the upper and lower tubular members 34 can receive a drive chain (or other flexible drive member) that is part of the transmission assembly 20. Positioning the chain inside the tubular members 34 encloses the chain and prevents it from inadvertently contacting the rider or the rider's clothes. It also protects the chain from weather and other environmental damage.

It should be appreciated that the first channel 36 and second channel 38 can have any suitable cross-sectional configuration, such as but not limited to, generally polygonal, round, oval, square, rectangular, triangular, or any other cross-sectional configuration that allows the chain to pass therethrough.

Wear elements (also referred to as a wear guards) are positioned in the first channel 36 to reduce the friction and wear produced by the chain moving through the first channel 36. The wear elements include a wear tube 37 positioned in the first channel 36 of the upper tubular member 34 and a wear strip 39 positioned in the first channel 36 of the lower tubular member 34.

A tube is used in the upper tubular member 34 because the chain can scrape along the top of the first channel 36 when tension is applied by the rider but can also scrape along the bottom due to gravity when tension is not present. A tube prevents the chain from scraping along either the top or the bottom of the first channel 36.

A wear strip 39 is used on the lower tubular member 34 because it is always the slack side of the chain and gravity causes it to contact the lower surface of the first channel 36. Preferably, the wear tube 37 and the wear strip 39 are made of a low friction material such as polytetrafluoroethylene (PTFE). It should be appreciated that both tubular members 34 can include a tube or a wear strip or any other suitable wear reducing elements or configuration.

Figure 8:
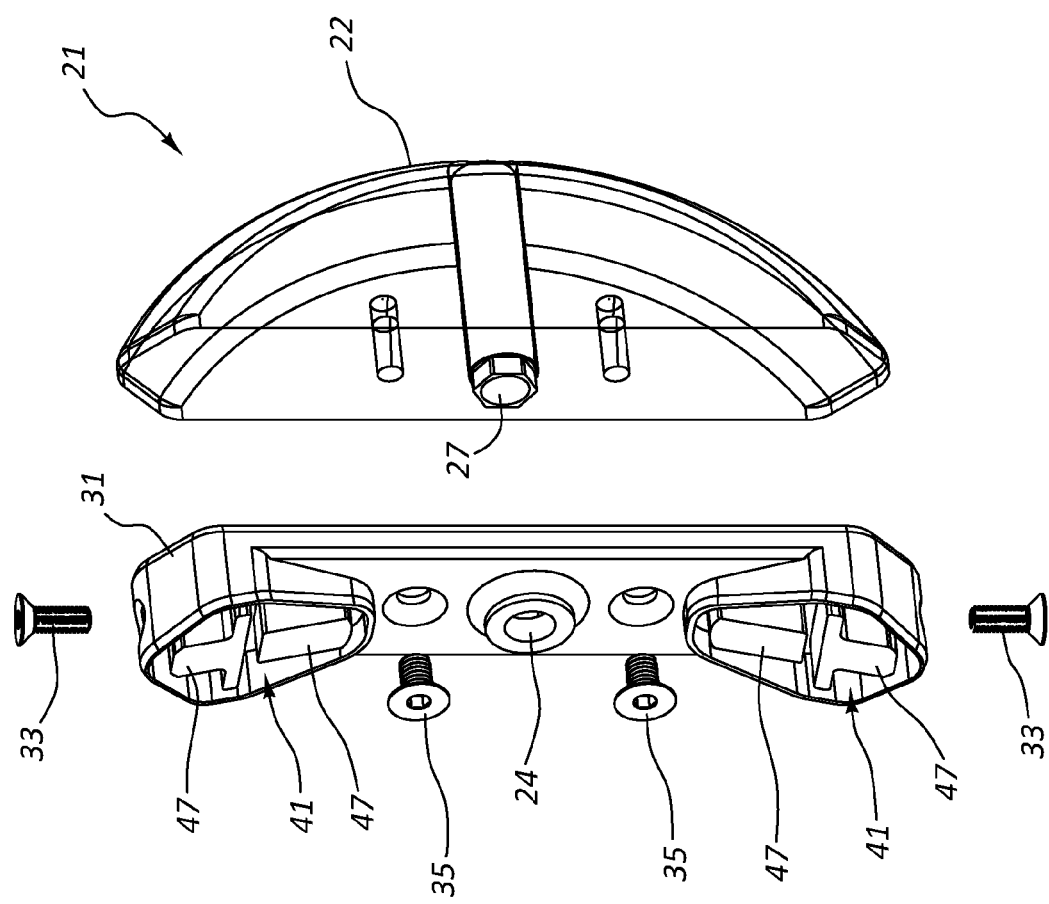
FIG. 8 shows a perspective view of the nose assembly of the frame assembly shown in FIG. 5.

The nose assembly 21, shown in FIG. 8, is used to couple the upper and lower tubular members 34 together at the first end 30 of the frame assembly 10. The nose assembly 21 includes a nose plate 31 coupled to a nose member 22 using fasteners 35, which are screws but can be any other suitable fastener such as bolts, and the like.

The nose plate 31 includes recesses 41 that are shaped to receive the tubular members 34. The recesses 41 include structural elements 47 that fit snugly inside the first and second channels 36, 38. The structural elements 47 prevent vertical and horizontal movement of the tubular members 34 relative to the nose plate 31. Fasteners 33 are used to hold the nose plate 31 and the tubular members 34 together.

In another configuration, the recesses 41 in the nose plate 31 can be deeper to allow the depth of the tubular members 34 in the recesses to vary. Once the tubular members 34 are positioned at the desired depth, the fasteners 33 can be tightened to fix the tubular members 34 in place. This may be desirable to aid with varying the position of the crank arms and pedals to accommodate riders having varying leg lengths.

As shown in FIG. 8, the nose plate 31 and the nose member 22 include corresponding holes 24, 27 that receive a portion of the front transmission assembly 372 (FIGS. 47-49) to allow proper tensioning of the drive chain. For example, a bolt may extend from the front transmission assembly 372 through the holes 24, 27. Rotating the bolt moves the front transmission assembly 372 toward or away from the nose member 22 thereby increasing or decreasing the tension on the drive chain. Although the nose member 22 is illustrated as having a generally curved configuration, it should be appreciated that it can have a polygonal, square, rectangular, triangular, oval, or other configuration.

Returning to FIG. 5, each tubular member 34 includes a recessed portion 43 positioned near the first end 30 of the frame assembly 10 and facing each other. The recessed portion 43 cooperates with the transmission assembly 20 (FIGS. 1-4) and allows lengthwise movement of the front transmission assembly 372 to allow for proper tensioning of the chain and to accommodate riders of differing stride lengths.

The configuration of the recessed portion 43 can vary based upon the configuration of the transmission assembly 20 (FIGS. 1-4). For example, the shape, depth, and length of the recessed portion 43 can vary so that the transmission assembly 20 can be moved along the length of the recessed portion 43.

Turning to FIGS. 9-12, the rear transmission assembly 29 is positioned at the second end 32 of the frame assembly 10 and includes the rear transmission case 26 and the rear transmission cover 28. As the names imply, the rear transmission cover 28 is a cover for the rear transmission case 26. The rear transmission case 26 can support a rear axle 384 (also referred to as a drive shaft) and various other components of transmission assembly 20 (FIGS. 1-4).

The rear transmission cover 28 is coupled to the rear transmission case 26 by way of complementary fasteners, holes, and fastening structures. For example, screws, bolts, or other mechanical fasteners may be used to releasably couple the rear transmission cover 28 to the rear transmission case 26.

Figure 9:
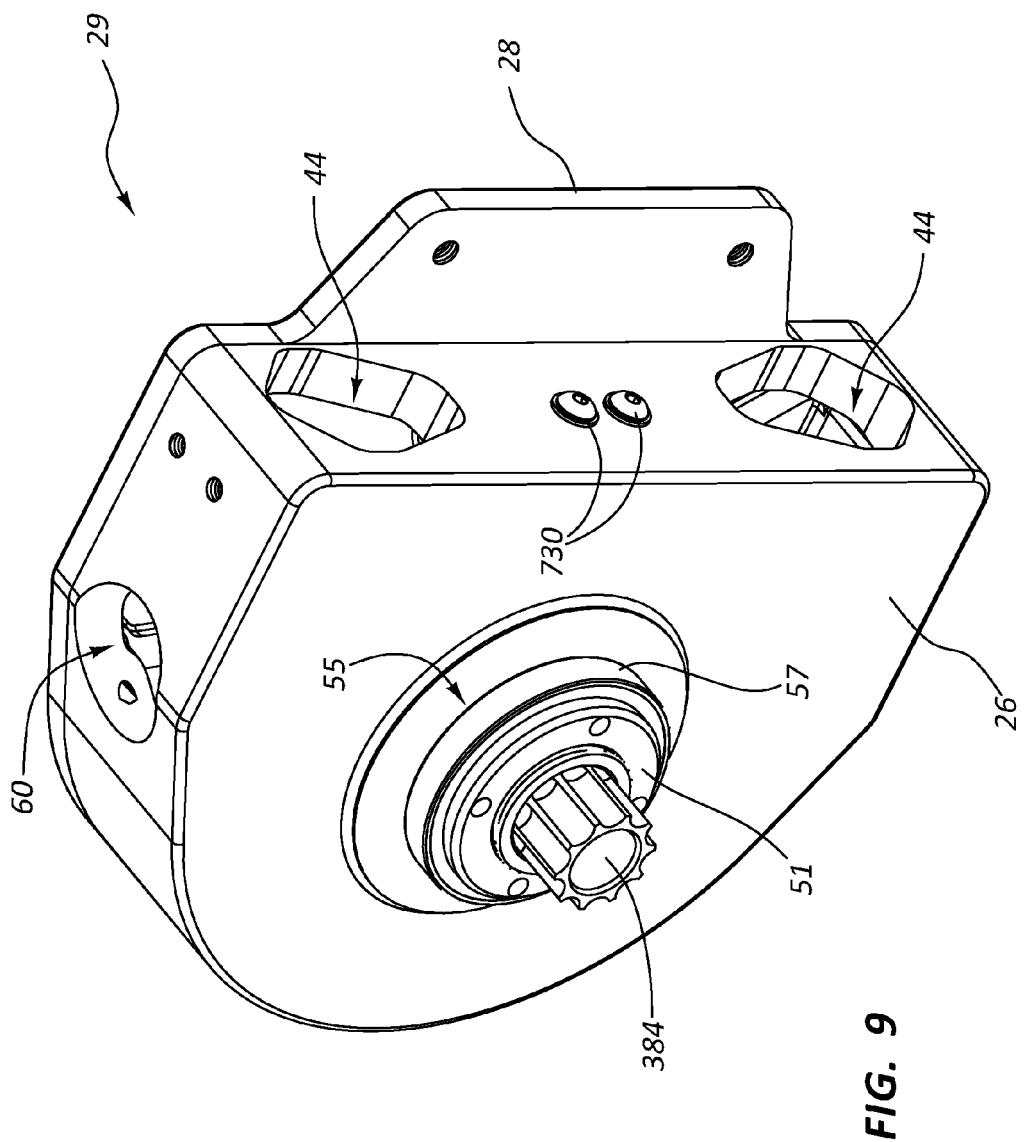
FIGS. 9-10 show perspective views of the rear transmission assembly of the frame assembly shown in FIG. 5.
Figure 10:
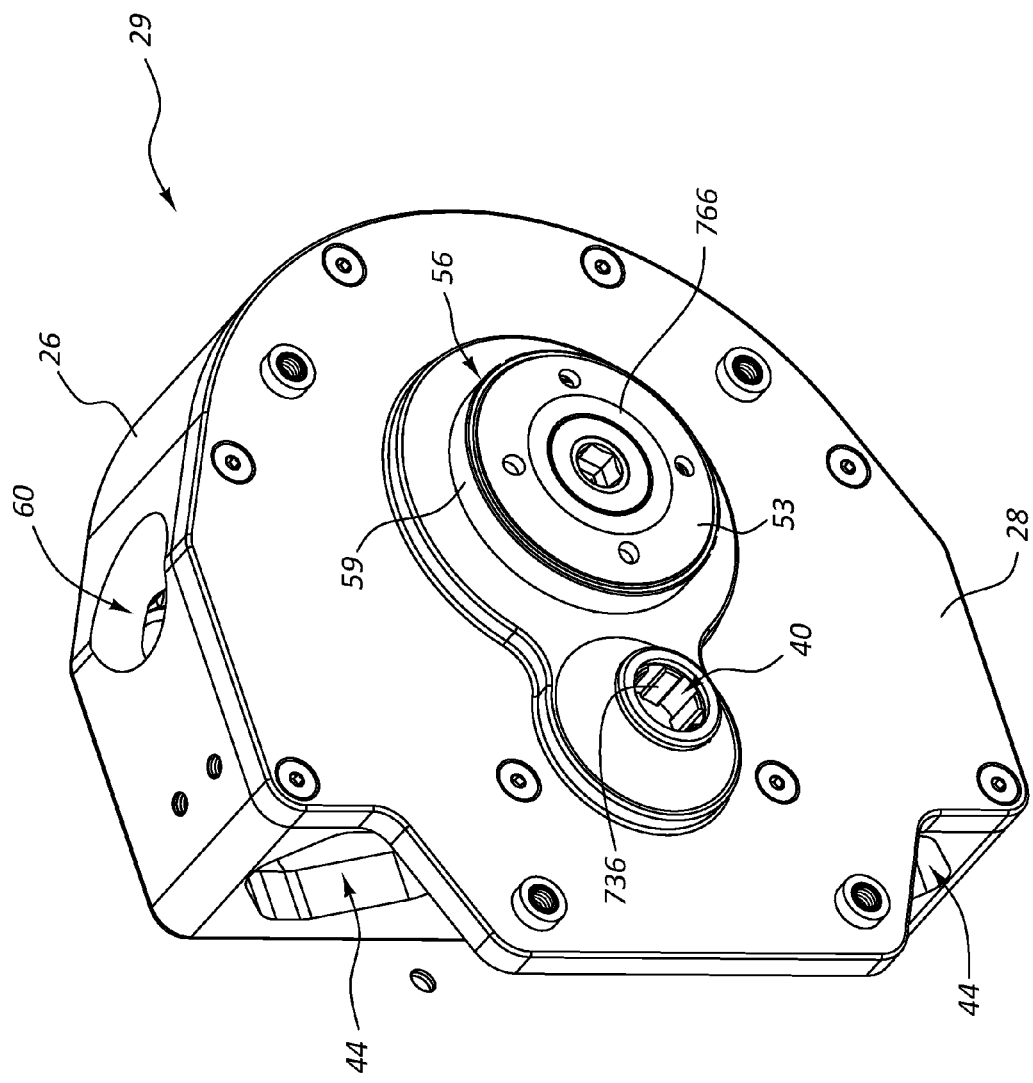
Figure 11:
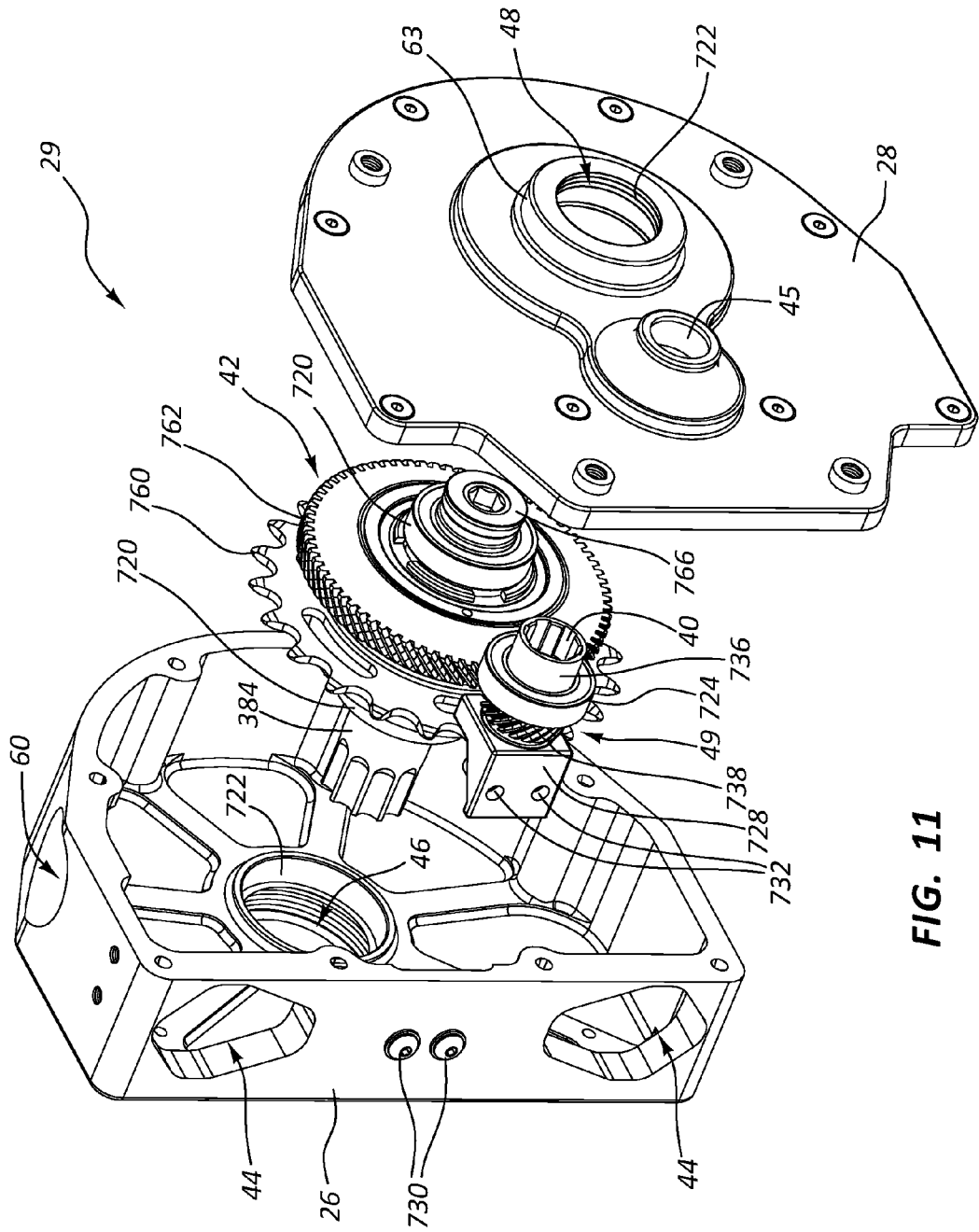
FIGS. 11-12 show exploded perspective views of the rear transmission assembly shown in FIGS. 9-10.

The rear transmission case 26 receives the tubular members 34 in holes 44, which are shown in FIGS. 9-11. The tubular members 34 can be coupled to the rear transmission case 26 by welding or any other suitable fastening technique. The holes 44 have substantially the same shape as the outer surface of the tubular members 34 (FIGS. 6-7) to enable secure mounting of the tubular members 34 to the rear transmission case 26. The engagement of the tubular members 34 and the holes 44 prevents rotational movement of the tubular members 34 and thus provides structural stability to the frame assembly 10 (FIG. 5).

The rear transmission assembly 29 includes a secondary power connector 40 (also referred to as an auxiliary power connector) in the rear transmission cover 28 as shown in FIG. 10. In this embodiment, the secondary power connector 40 is a secondary or auxiliary power port that includes a splined recess configured to receive a splined drive shaft from a secondary or auxiliary power source. A cap or cover (not shown) can be placed over the port when it is not in connected to the secondary power source to keep it clean and in good condition and to prevent debris from entering the rear transmission assembly 29.

It should be appreciated, however, that the secondary power connector 40 could have other configurations. For example, it could include a splined shaft that extends outward from the rear transmission cover 28 and is configured to engage a corresponding splined recess in the secondary power source. It is preferred, however, to provide a port because then there aren't any protruding components when the secondary power source is removed.

The secondary power connector 40 can be configured to connect to any suitable secondary power sources. In one embodiment, the secondary power connector 40 is configured to connect to an electric motor. In another embodiment, the secondary power connector 40 is configured to connect to a gasoline motor. Other suitable secondary power sources can also be used.

Figure 50:
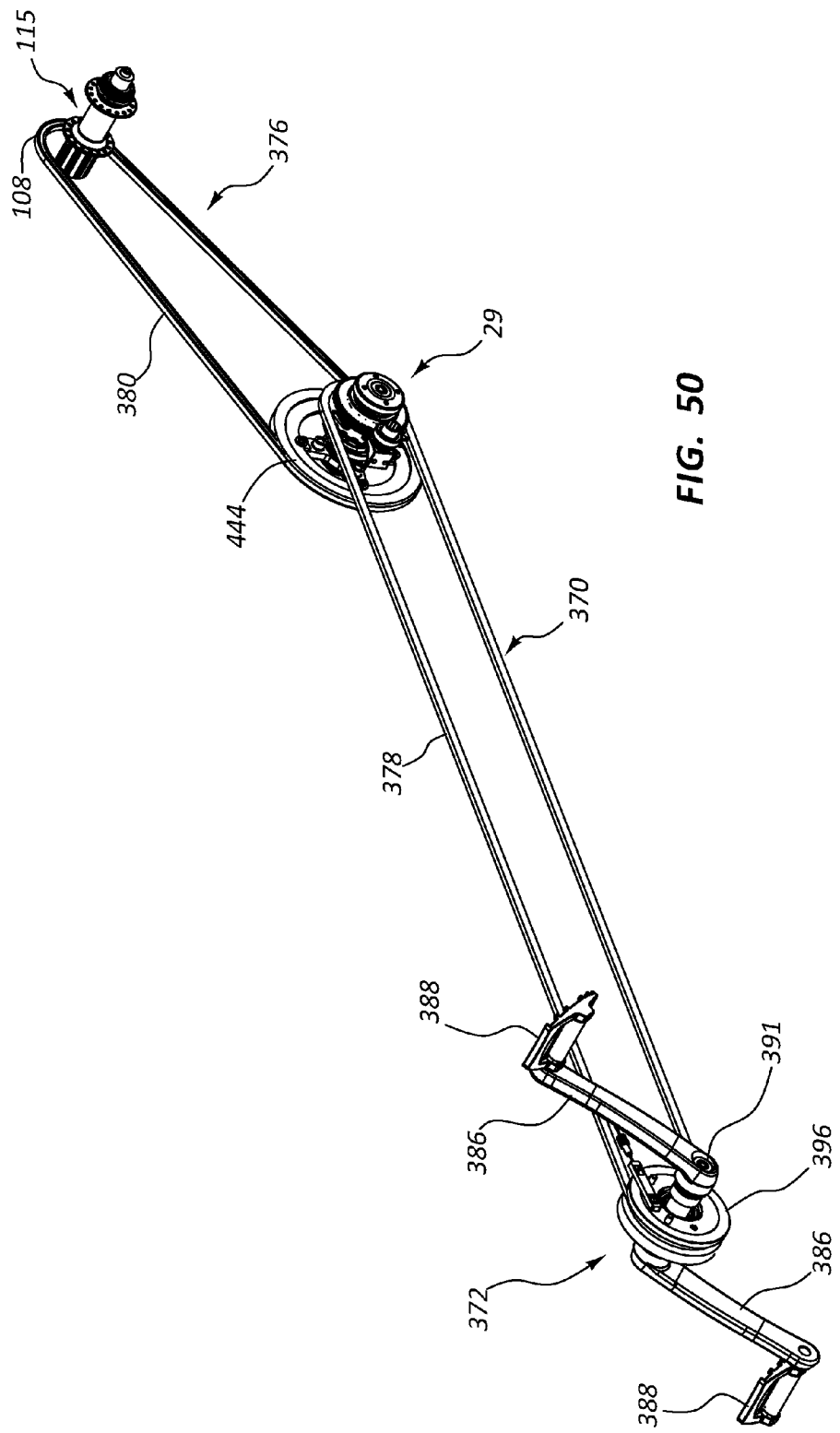
FIG. 50 shows a perspective view of the transmission assembly of the tadpole tricycle shown in FIGS. 1-4.

The rear axle 384 extends through a hole 46 in the rear transmission case 26 and over to a corresponding hole 48 (FIG. 11) in the rear transmission cover 28. The rear axle 384 extends through the hole 46 so that the splines on the rear axle 384 are outside the rear transmission case 26. The splines are configured to receive a rear gear ring 444 (also referred to as a rear drive sprocket or toothed wheel) as shown in FIG. 50. The rear axle 384 does not extend through the hole 48 but instead ends roughly flush with the rear transmission cover 28 as shown in FIG. 10. The rear transmission cover 28 includes a hole 45 (FIG. 11) through which the secondary power source can be connected.

The holes 46, 48 are threaded and configured to receive retainer nuts 51, 53, respectively. The nuts 51, 53 prevent the rear axle 384 and other internal components from coming loose inside the rear transmission case 26. The nuts 51, 53 also prevent debris from entering into the interior of rear transmission case 26. The holes 46, 48 and the retainer nuts 51, 53 are best shown in FIGS. 9-10 and 18-19.

The rear transmission assembly 29 includes a rear axle assembly 42 and a secondary drive assembly 49 (also referred to as an auxiliary drive assembly). The rear axle assembly 42 transfers power from the front transmission assembly and/or the secondary power source to the rear axle 384. The secondary drive assembly 49 transfers power from secondary power source to the rear axle 384. Each is described in greater detail.

Figure 12:
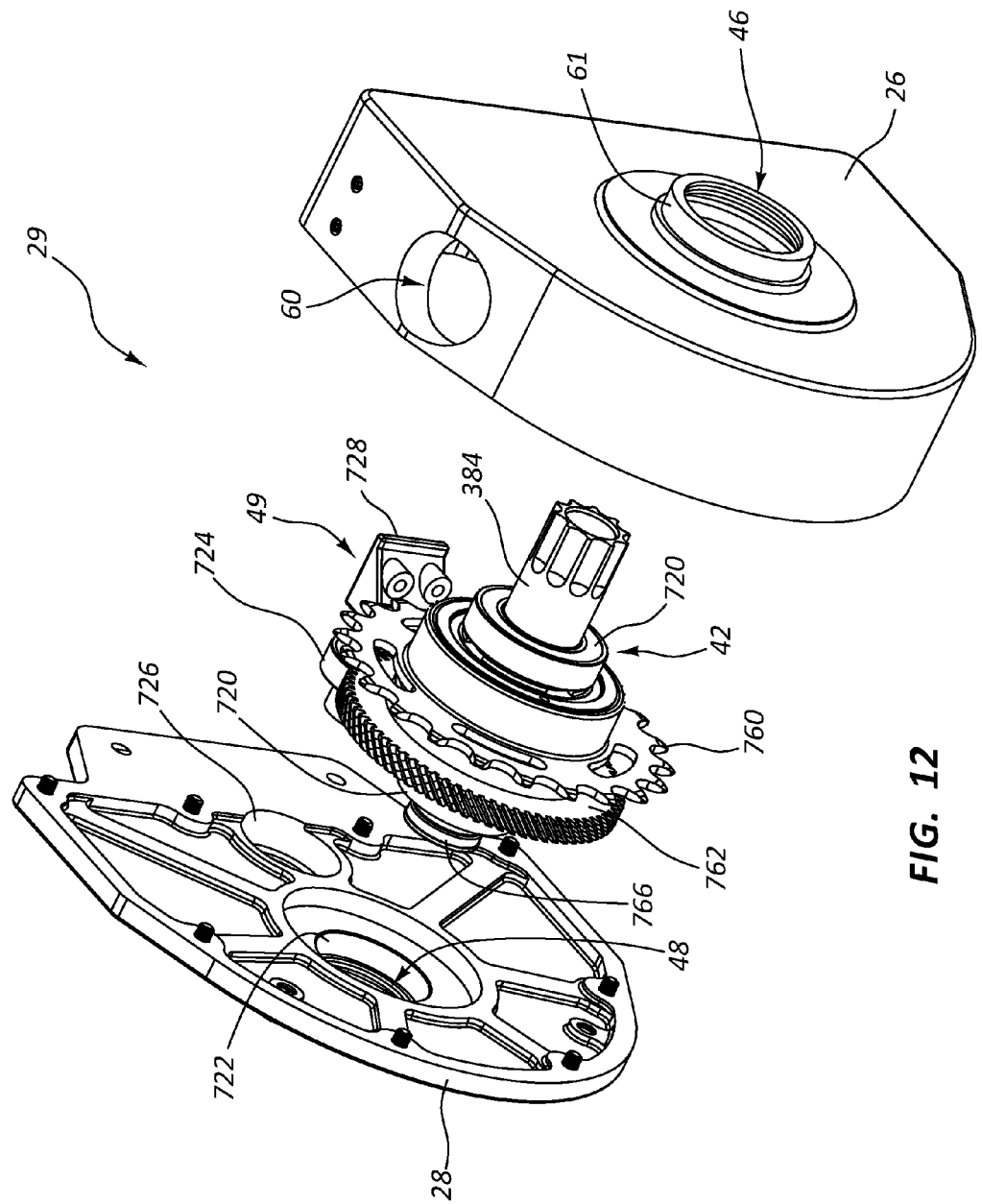

FIGS. 11-12 show the relationship of the rear axle assembly 42 and the secondary drive assembly 49 relative to each other and relative to the rear transmission case 26 and the rear transmission cover 28. The rear axle assembly 42 is supported by bearings 720 which engage bearing mounts 722 in the rear transmission case 26 and the rear transmission cover 28. The rear axle 384 passes through the internal hole of the bearings 720.

The secondary drive assembly 49 includes a bearing 724 on one end that engages a bearing mount 726 in the rear transmission cover 28. A mounting bracket 728 is positioned at the other end of the secondary drive assembly 49. The mounting bracket 728 is coupled to the front side wall of the rear transmission case 26 with fasteners 730. In this embodiment, the fasteners 730 are screws that engage corresponding threaded holes 732 in the mounting bracket 728 but any suitable fasteners can be used.

Figure 13:
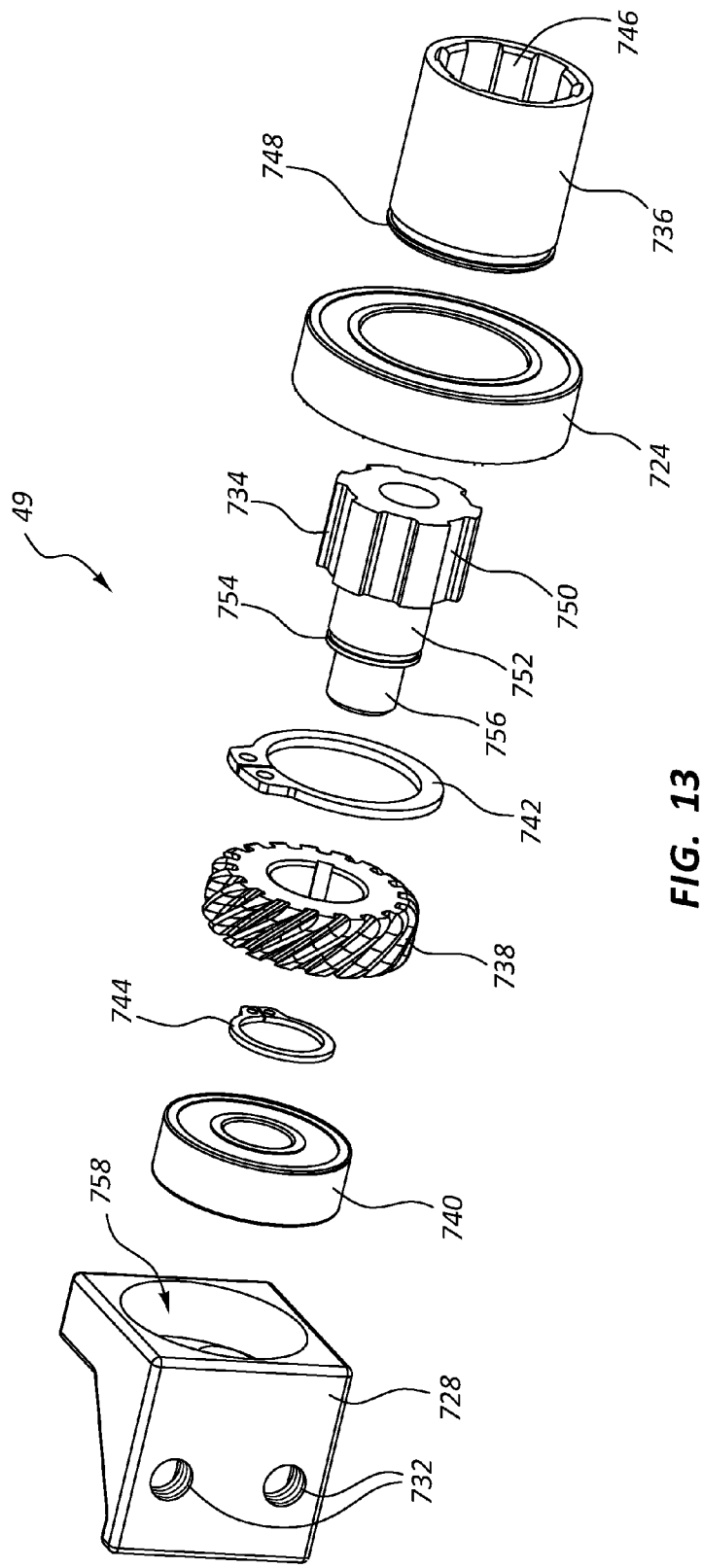
FIG. 13 shows an exploded perspective view of the secondary drive assembly of the rear transmission assembly shown in FIGS. 11-12.

FIG. 13 shows an exploded perspective view of the secondary drive assembly 49. The secondary drive assembly 49 includes a secondary drive shaft 734 (also referred to as an auxiliary drive shaft), a drive shaft coupler 736, a secondary drive ring 738 (also referred to as a gear ring), the bearings 724, 740, and retaining rings 742, 744. The drive shaft coupler 736 is cylindrically shaped and has interior splines 746.

The bearing 724 fits over the drive shaft coupler 736 and is held in place by the retaining ring 742, which engages retaining groove 748 in the drive shaft coupler 736. The drive shaft coupler 736 is configured to receive the splined end 750 of the secondary drive shaft 734. The splines mesh together so that the drive shaft coupler 736 and the secondary drive shaft 734 rotate in unison.

An intermediate portion 752 of the secondary drive shaft 734 is configured to receive the secondary drive ring 738. A shaft key (not shown) is used to couple the secondary drive shaft 734 and the secondary drive ring 738 together so that they rotate in unison. The retaining ring 744 engages retaining groove 754 to prevent the secondary drive ring 738 from moving lengthwise and coming off the secondary drive shaft 734.

The secondary drive ring 738 is shown as a helical gear. It should be appreciated, however, that the secondary drive ring 738 can have numerous other configurations. For example, the secondary drive ring 738 can be a spur gear or the like.

The other end 756 of the secondary drive shaft 734 is positioned in and supported by the bearing 740. The bearing 740 fits in and is supported by a recess 758 in the mounting bracket 728.

It should be appreciated that the drive shaft coupler 736 is the secondary power connector 40 in the tadpole tricycle 8. As already mentioned above, other embodiments are possible that use something else as the secondary power connector 40. It should also be appreciated that FIGS. 9-12 only show an exemplary embodiment of the secondary drive assembly 49 and other embodiments are possible.

Figure 14:
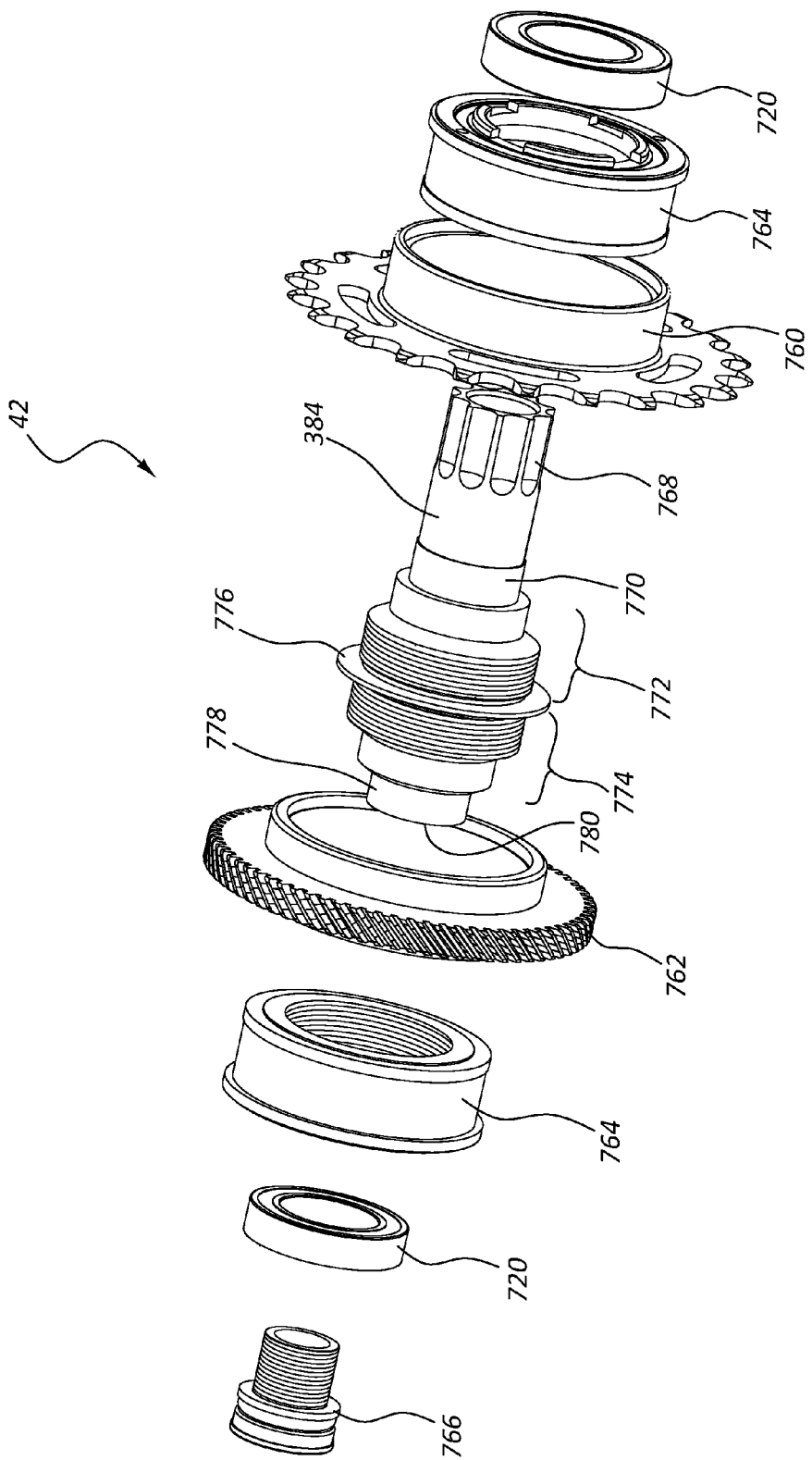
FIG. 14 shows an exploded perspective view of the rear axle assembly of the rear transmission assembly shown in FIGS. 11-12.

FIG. 14 shows an exploded perspective view of the rear axle assembly 42. The rear axle assembly 42 includes the rear axle 384, a rear gear ring 760 (also referred to as a first rear gear ring or toothed wheel), a secondary gear ring 762, freewheels 764 (also referred to as overrunning clutches), bearings 720, and a rear axle bolt 766. One end 768 of the rear axle 384 is splined. The adjacent section 770 of the rear axle 384 is configured to be inserted into and supported by the bearing 720.

The freewheel 764 is coupled to the section 772 of the rear axle 384. The freewheel 764 and the section 772 of the rear axle 384 are both threaded in a corresponding fashion so that the freewheel 764 can screw onto the section 772. The freewheel 764 is coupled to the rear gear ring 760 so that they both rotate together. The freewheel 764 can be coupled to the rear gear ring 760 using a shaft key, welding, threads, or the like.

The freewheel 764 is a device that disengages the rear gear ring 760 from the rear axle 384 when the rear axle 384 rotates faster than the rear gear ring 760. This condition occurs often with cycles when the rider stops pedaling or doesn't pedal hard enough to rotate the rear gear ring 760 faster than the rear axle 384.

Figure 47:
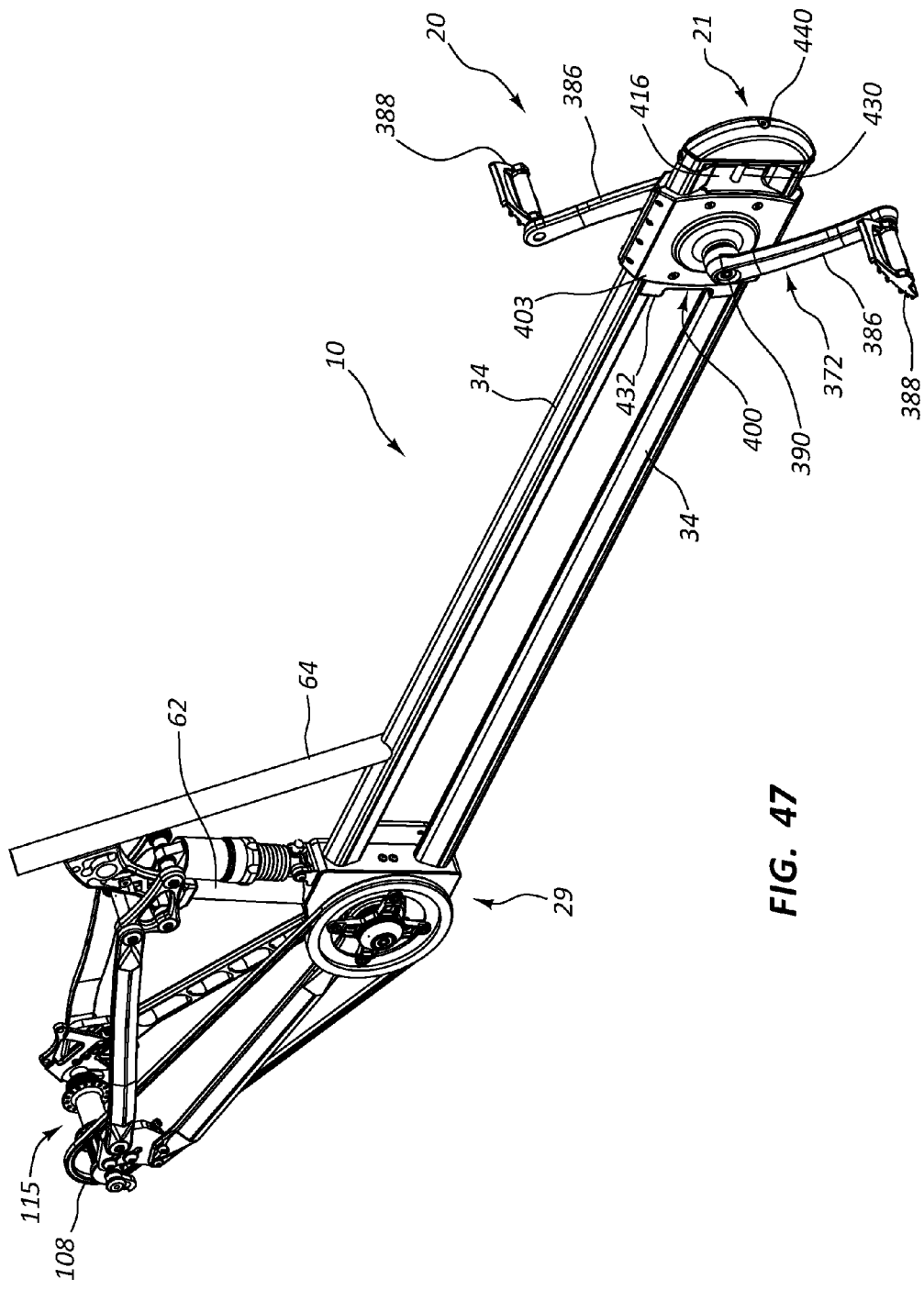
FIG. 47 shows a perspective view of the frame assembly and drivetrain of the tadpole tricycle shown in FIGS. 1-4.
Figure 48:
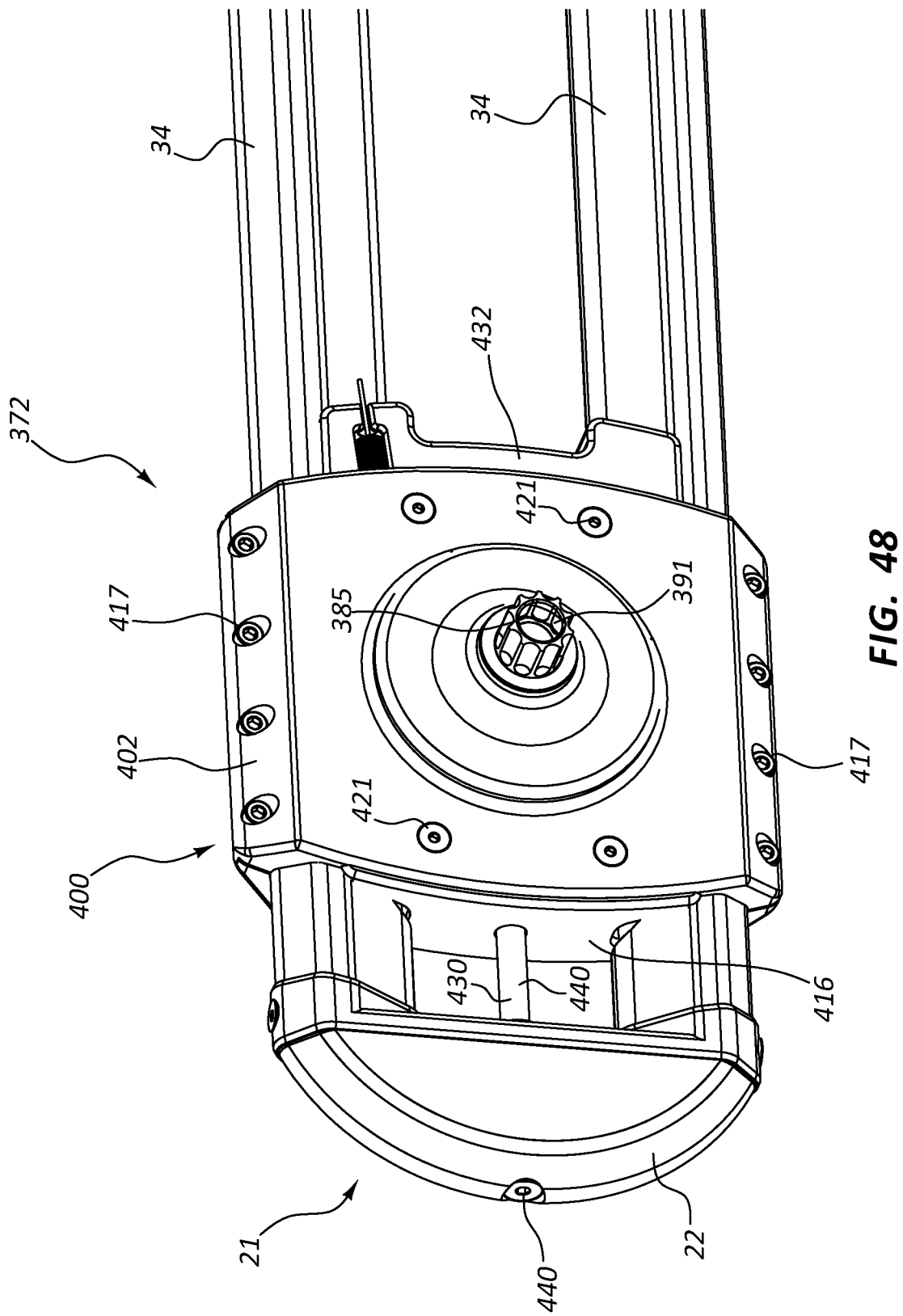
FIG. 48 shows a perspective view of the front transmission assembly of the tadpole tricycle shown in FIGS. 1-4 coupled to the frame assembly shown in FIG. 5.
Figure 49:
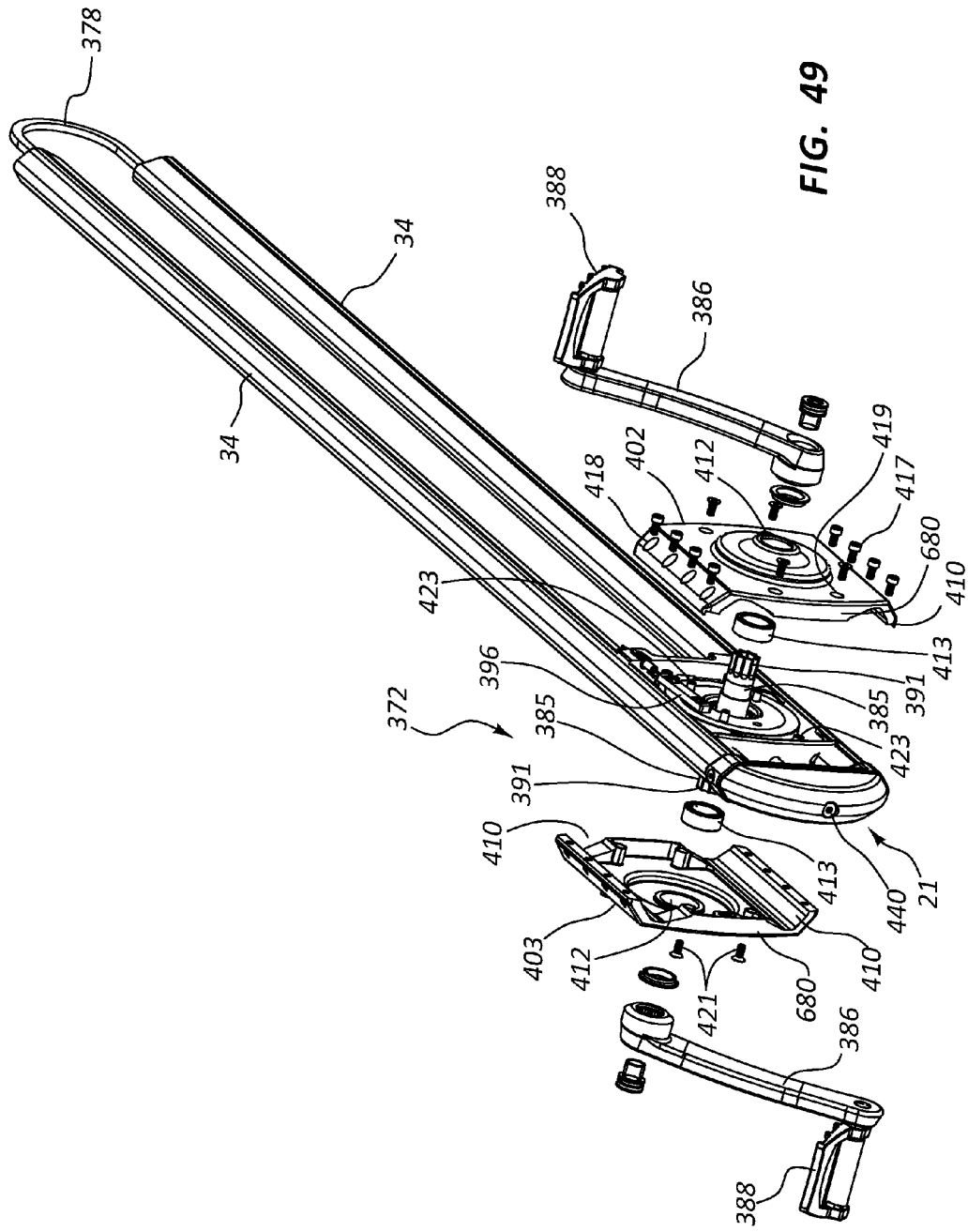
FIG. 49 shows an exploded perspective view of the front transmission assembly of the tadpole tricycle shown in FIGS. 1-4 coupled to the frame assembly shown in FIG. 5.

In this embodiment, the rear gear ring 760 is a chain sprocket. The rear gear ring 760 engages the drive chain that extends between the rear transmission assembly 29 and the front transmission assembly 372 (FIGS. 47-49). It should be appreciated that the rear gear ring 760 can have any suitable configuration and need not be a chain sprocket.

The other freewheel 764 is coupled to the section 774 of the rear axle 384, which is adjacent to the section 772 and separated by a flange 776. This freewheel 764 is coupled to the secondary gear ring 762 in a similar fashion as that described above. The freewheel 764 disengages the secondary gear ring 762 from the rear axle 384 when the rear axle 384 rotates faster than the secondary gear ring 762.

If a secondary power source is not connected to the secondary drive assembly 42 then the freewheel 764 allows the rear axle 384 to rotate while the secondary gear ring 762 remains stationary. If a secondary power source is connected, then the freewheel 764 allows the secondary power source to rotate the rear axle 384 as long as the secondary gear ring 762 is rotating faster than the rear axle 384.

The use of the freewheel 764 with both the rear gear ring 760 and the secondary gear ring 762 makes it possible to allow one of the gear rings 760, 762 to remain stationary or inactive while the other one provides power to rotate the rear axle 384. It also allows both the rear gear ring 760 and the secondary gear ring 762 to provide power to rotate the rear axle 384 at the same time.

Referring to FIGS. 11-12, power in the form of rotational motion is transferred from the secondary power source to the secondary gear ring 762 and on to the rear axle 384 as follows. First, power provided by a secondary power source in the form of rotational motion is transferred to the drive shaft coupler 736, the secondary drive shaft 734, and the secondary drive ring 738. The secondary drive ring 738 meshes with the secondary drive ring 738 from the secondary drive assembly 42 to transfer rotational motion through the freewheel 764 to the rear axle 384.

Turning back to FIG. 14, the bearing a section 778 of the rear axle 384 is positioned in and supported by the bearing 720. The rear axle bolt 766 screws into the end 780 of the rear axle 384. The rear axle bolt 766 is sized to correspond to the retainer nut 53 and create a seal that prevents debris from entering into the rear transmission assembly 29 as shown in FIG. 10.

Referring to FIGS. 9-12, the rear transmission case 26 and the rear transmission cover 28 each include mounts 55, 56, respectively, to which a portion of the rear wheel assembly 12 (FIGS. 1-4) is coupled. The mounts 55, 56 are formed by bearings 57, 59 coupled to flanges 61, 63, which extend outward from the exterior sides of the rear transmission case 26 and the rear transmission cover 28, respectively.

The rear wheel assembly 12 is coupled to the frame assembly 10 by way of the bearings 57, 59 to allow the rear wheel assembly 12 to rotate or pivot relative to the frame assembly 10. The rotational movement of the rear wheel assembly can be used to reduce the impact force transferred to a rider during use of the tadpole tricycle 8.

It should be noted that the mounts 55, 56 are centered on the axis of rotation of the rear axle 384. Therefore, the rear wheel assembly 12 rotates or pivots on the same axis as the rear axle 384. The manner in which the rear wheel assembly 12 is coupled to the frame assembly 10 is described in greater detail in connection with FIGS. 18-19 below.

Returning to FIG. 5, an upper support 62 and a seat support 64 (also referred to as a seat tube) are coupled to the second end 32 of the frame assembly 10. The upper support 62 includes a lower tube member 50 and an upper union member 65. The lower tube member 50 has a cylindrical shape and is coupled to the bottom of the upper union member 65 by welding or any other suitable method. The lower tube member 50 can be made of aluminum, carbon fiber, or any other lightweight material. It could also be made of steel but generally that is not preferred due to weight considerations.

It should be appreciated that any part of the tadpole tricycle 8, including but not limited to the frame assembly 10, can be made out of aluminum, carbon fiber, or any other lightweight material. In general, components that provide structural support or experience stress are made of these materials.

The upper union member 65 is configured to provide a mounting location for the seat assembly 14 and the rear wheel assembly 12. In this embodiment, the upper union member 65 is machined to include mounting holes for these components. The upper union member 65 can be made of any of the materials described previously but preferably is made of aluminum.

It should be appreciated that the supports 62, 64 can have any suitable design. For example, the upper support 62 can be modified to be a single tube with a corresponding bracket to which the seat and rear wheel assembly are coupled. Also, the seat support 64 can have a rectangular, tubular shape instead of the cylindrical shape shown in FIG. 5. Numerous other configurations can be used as well.

Figure 15:
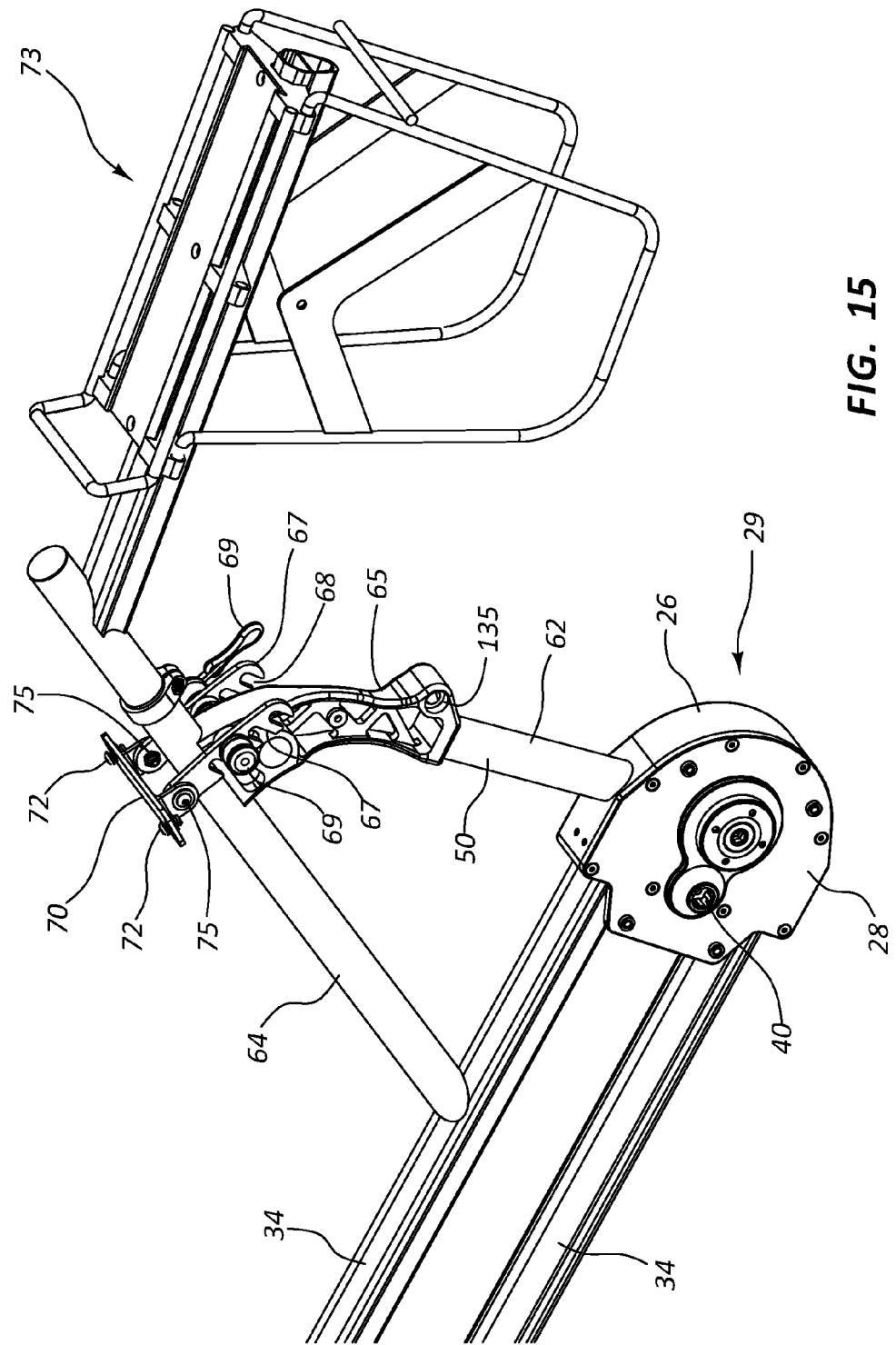
FIGS. 15-16 show perspective views of the upper seat support bracket and cargo rack from FIG. 5.
Figure 20:
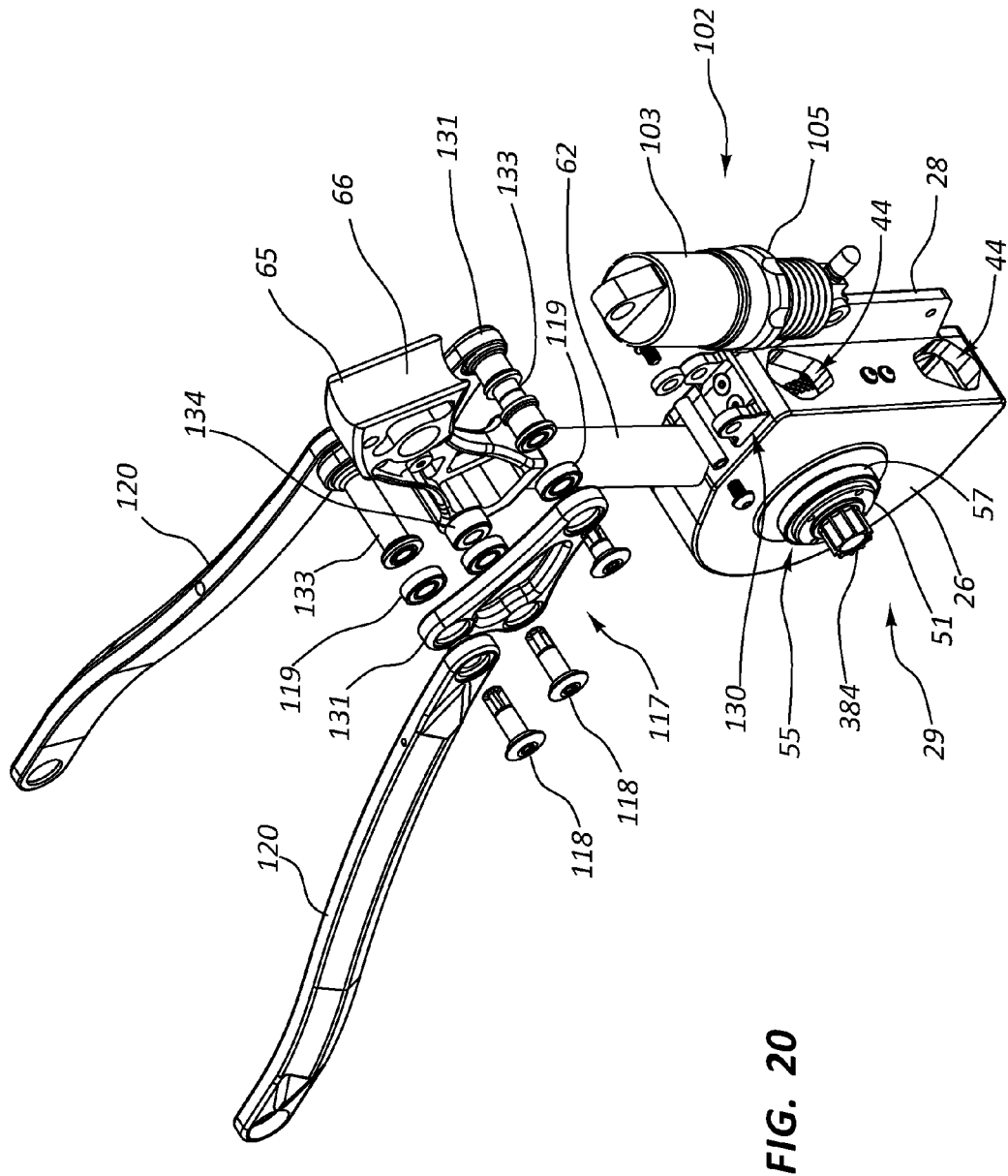
FIG. 20 shows a partially exploded perspective view of how the upper support members of the rear wheel assembly shown in FIG. 17 are coupled to the frame assembly shown in FIG. 5.

Referring to FIG. 20, the upper support 62 includes a recess 66 shaped and oriented to receive and support the seat support 64. The supports 62, 64 can be coupled together by welding, mechanical fasteners, adhesives, brackets, or any other suitable fastening method. FIG. 15 shows the supports 62, 64 coupled together.

The upper support 62 is coupled to the top of the rear transmission case 26 by way of a hole 60 (FIGS. 9-10) and the seat support 64 is coupled to the upper tubular member 34.

The supports 62, 64 may be coupled to the rear transmission case 26 or the upper tubular member 34 using any suitable technique, including, but not limited to welding, adhesives, and/or mechanical fasteners.

The upper support 62 and the seat support 64 provide structural support to the rear wheel assembly 12 (FIGS. 1-4). The combination of the upper support 62 (particularly the upper union member 65), the rear transmission assembly 29, and the rear wheel assembly mounts 55, 56 provide attachment points for the rear wheel assembly 12. The upper support 62 supports the rear wheel assembly 12 and the seat support 64 upon which mounts at least a portion of the seat assembly 14 (FIGS. 1-4) by way of an upper seat bracket 70.

Figure 2:
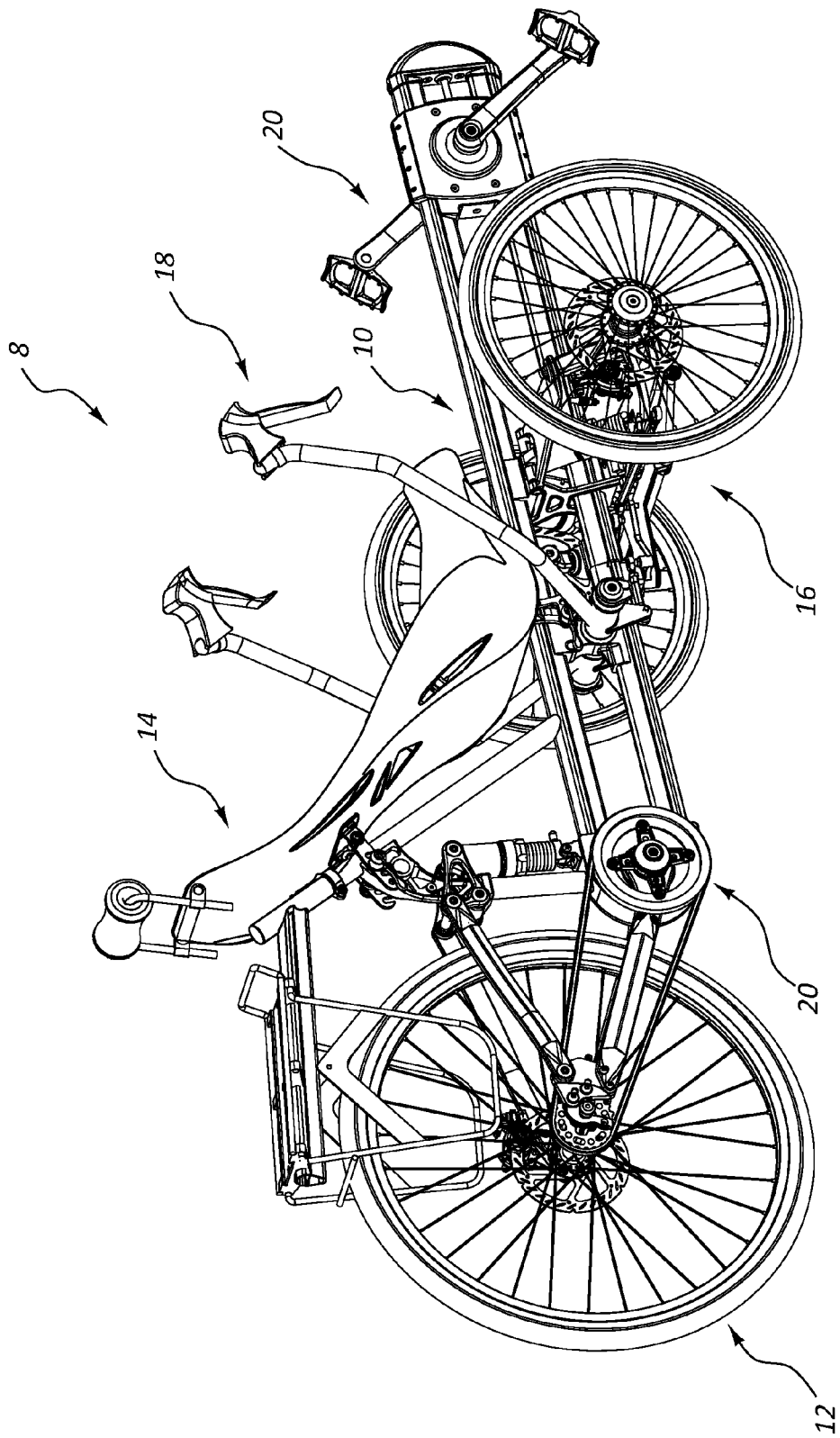
Figure 3:
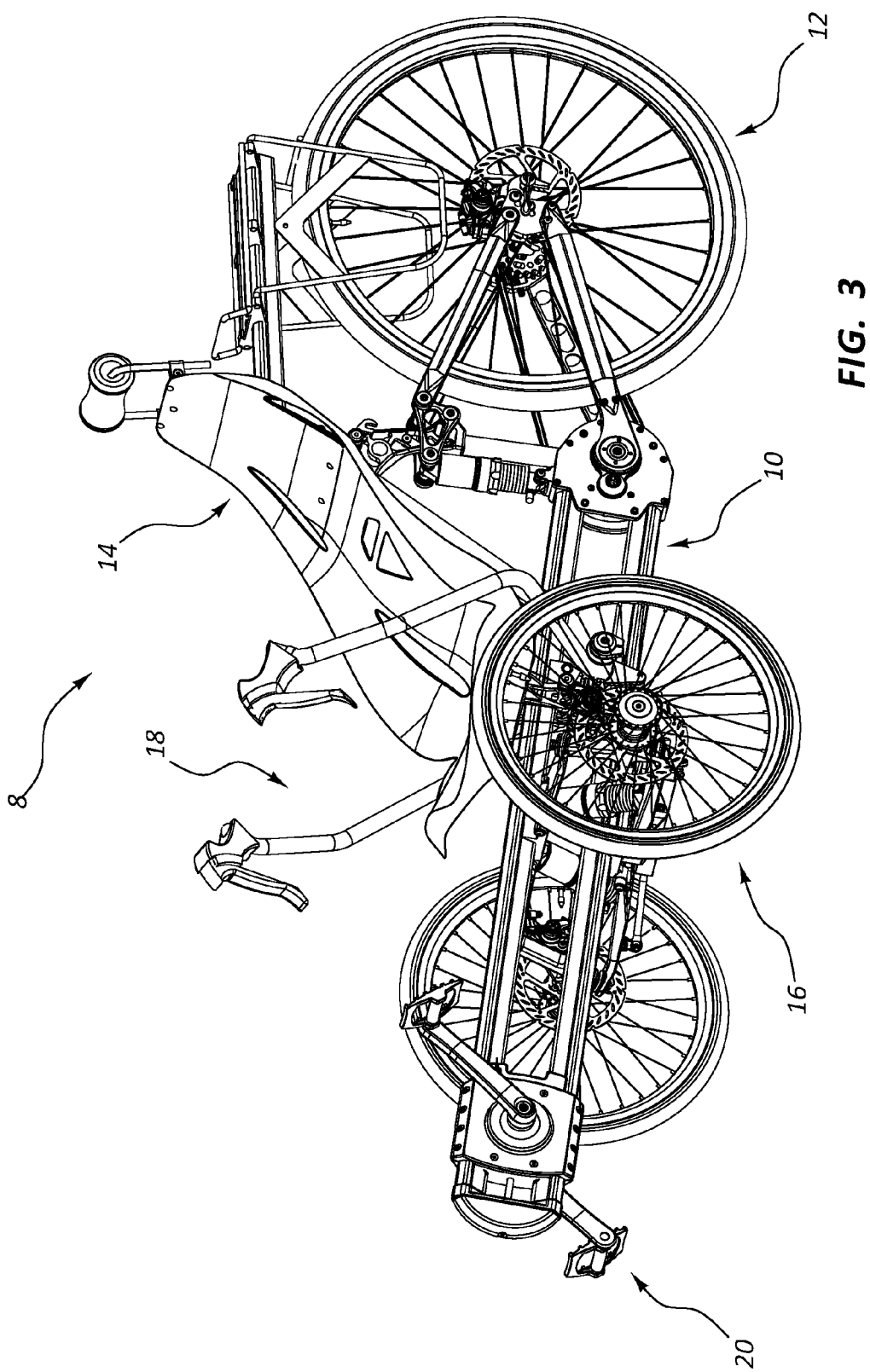
Figure 4:
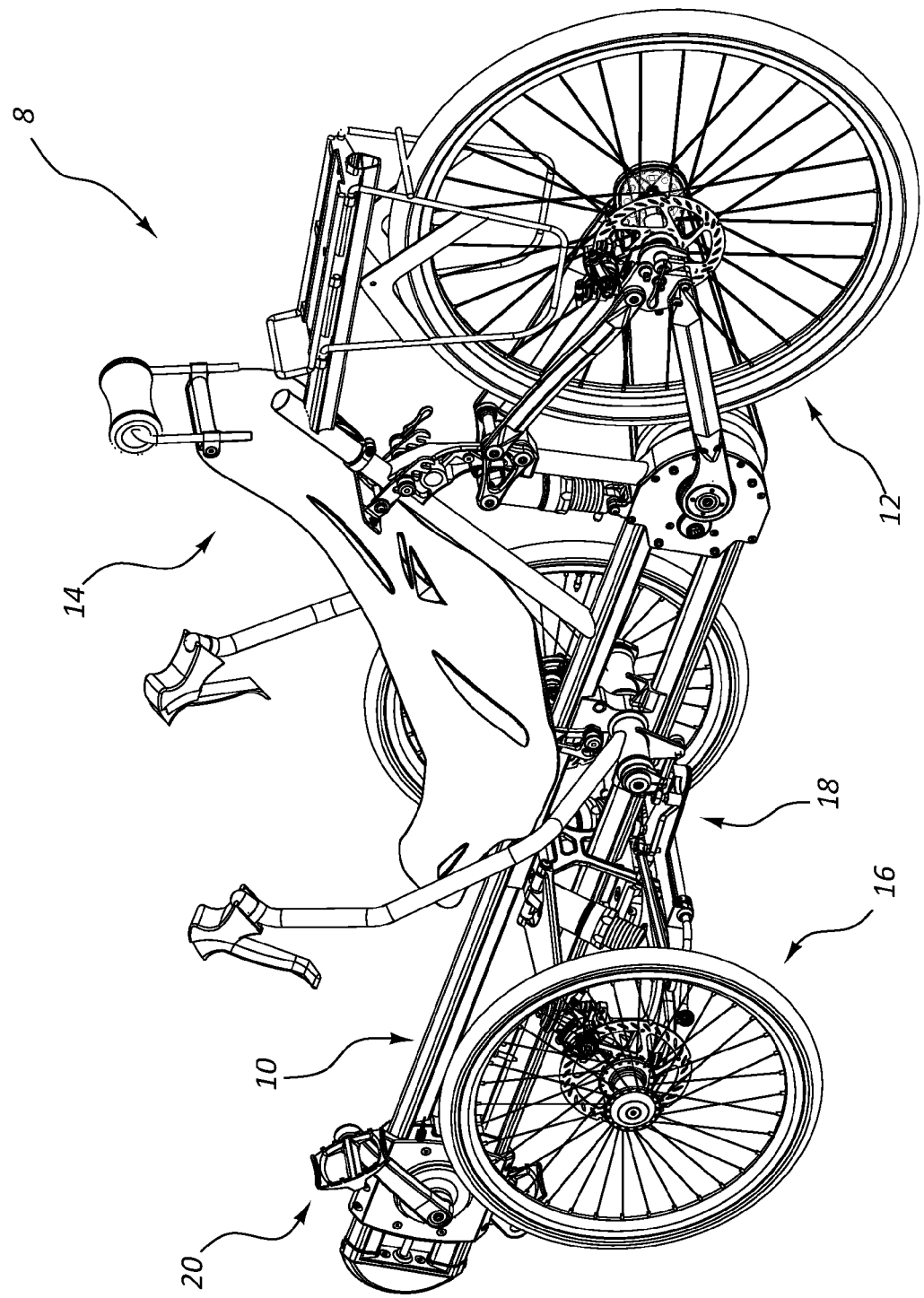

As shown in FIGS. 2 and 4, the orientation of the upper support 62 and the seat support 64 relative to the remainder of the frame assembly 10 creates a support triangle. This configuration provides structural support to both the seat assembly 14 and the rear wheel assembly 12. Additionally, the triangular configuration of a portion of the rear wheel assembly 12 further provides structural strength to the tadpole tricycle 8. In this manner, the orientation and positioning of the supports 62, 64, and the rear wheel assembly 12 provide structural support to one another.

Figure 16:
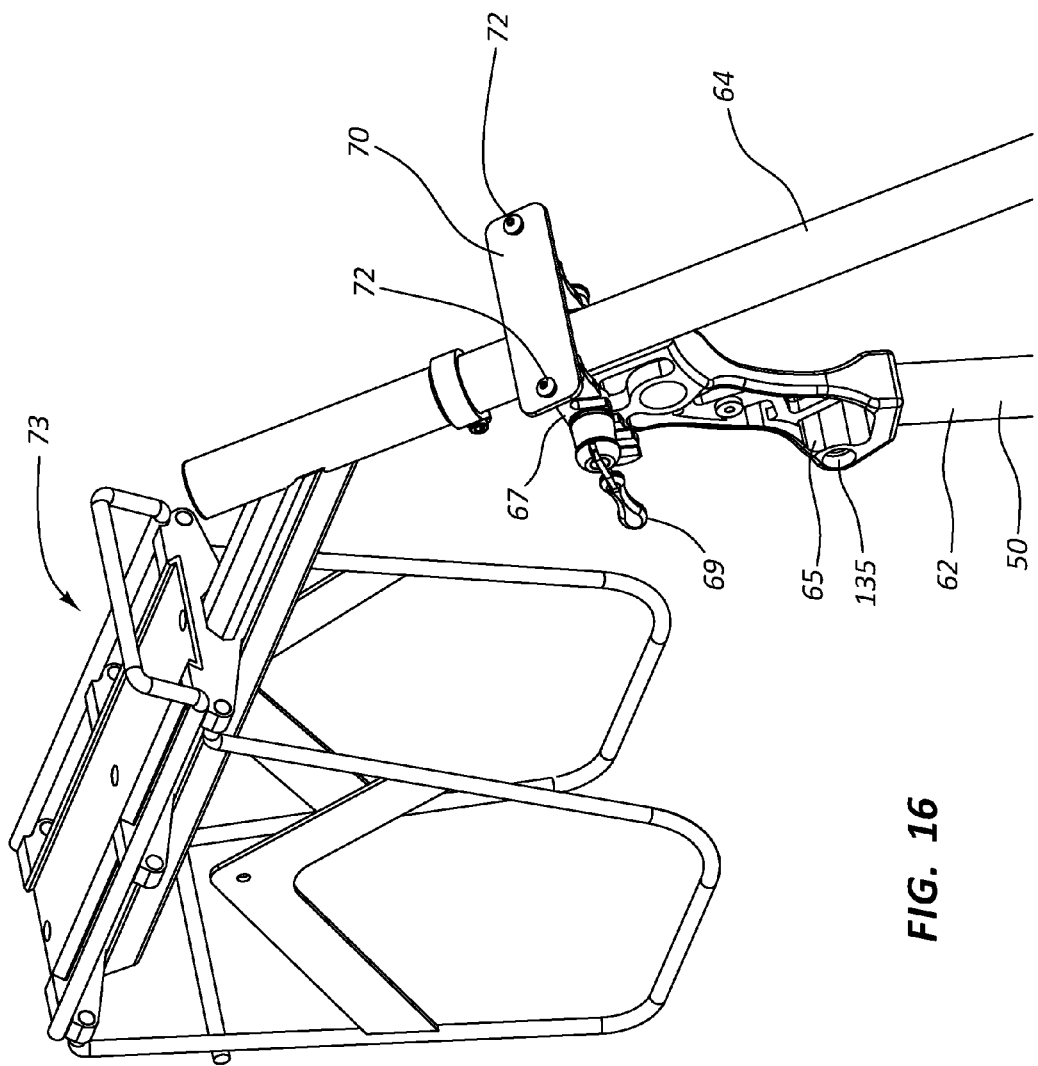

Referring to FIGS. 15-16, the tadpole tricycle 8 includes a cargo rack 73 coupled to the seat support 64. The cargo rack 73 is a saddlebag style rack because it straddles the rear wheel assembly 12. The cargo rack 73 can hold a hard or soft saddlebag style bag (not shown). The cargo rack 73 can be coupled to the seat support 64 by welding, mechanical fasteners, adhesives, or any other suitable fastening technique. It should be appreciated that the cargo rack 73 can have numerous other configurations.

The seat assembly 14 is coupled to the top of the upper support 62 by way of the upper seat bracket 70 which is coupled to brackets 67. A mechanical fastener 69 extends through one of a series of slots 68 in the brackets 67 and a hole 71 (FIG. 17) in the upper union member 65 of the upper support 62. The mechanical fastener 69 can be positioned in different notches formed by the series of slots 68 to adjust the incline of the seat assembly 14. The mechanical fastener 69 may be any suitable fastener. In one embodiment, the fastener 69 is a quick release pin commonly used with bicycles.

The seat bracket 70 is coupled to the seat 150 (FIGS. 27-29) using fasteners 72. The seat bracket 70 is coupled to the brackets 67 using fasteners 75, which are nuts and bolts. It should be appreciated, however, that any suitable fastener and/or corresponding attachment members can be used to connect the seat bracket 70 to the seat 150 and/or to the brackets 67. For example, nuts and bolts, screws, quick-release connectors, or other mechanical fasteners may be used. Alternatively, thermal bonding, chemical bonding, or adhesives can be used to connect the respective brackets or members.

It should be appreciated that this is only one of many ways to couple the seat assembly 14 to the supports 62, 64. In another configuration, a single bracket 67 can be used to connect the seat assembly 14 to the upper support 62. In still another configuration, the seat assembly 14 can be coupled to one or both the upper support 62 and the seat support 64.

Returning to FIG. 5, the frame assembly 10 includes various attachment members 80, 84, and 86, and attachment tube 88 to facilitate attaching the front wheel assembly 16 and the steering assembly 18 to the frame assembly 10. These components generally having configurations that enable attachment directly to one or both tubular members 34. These components are described in greater detail later.

Figure 17:
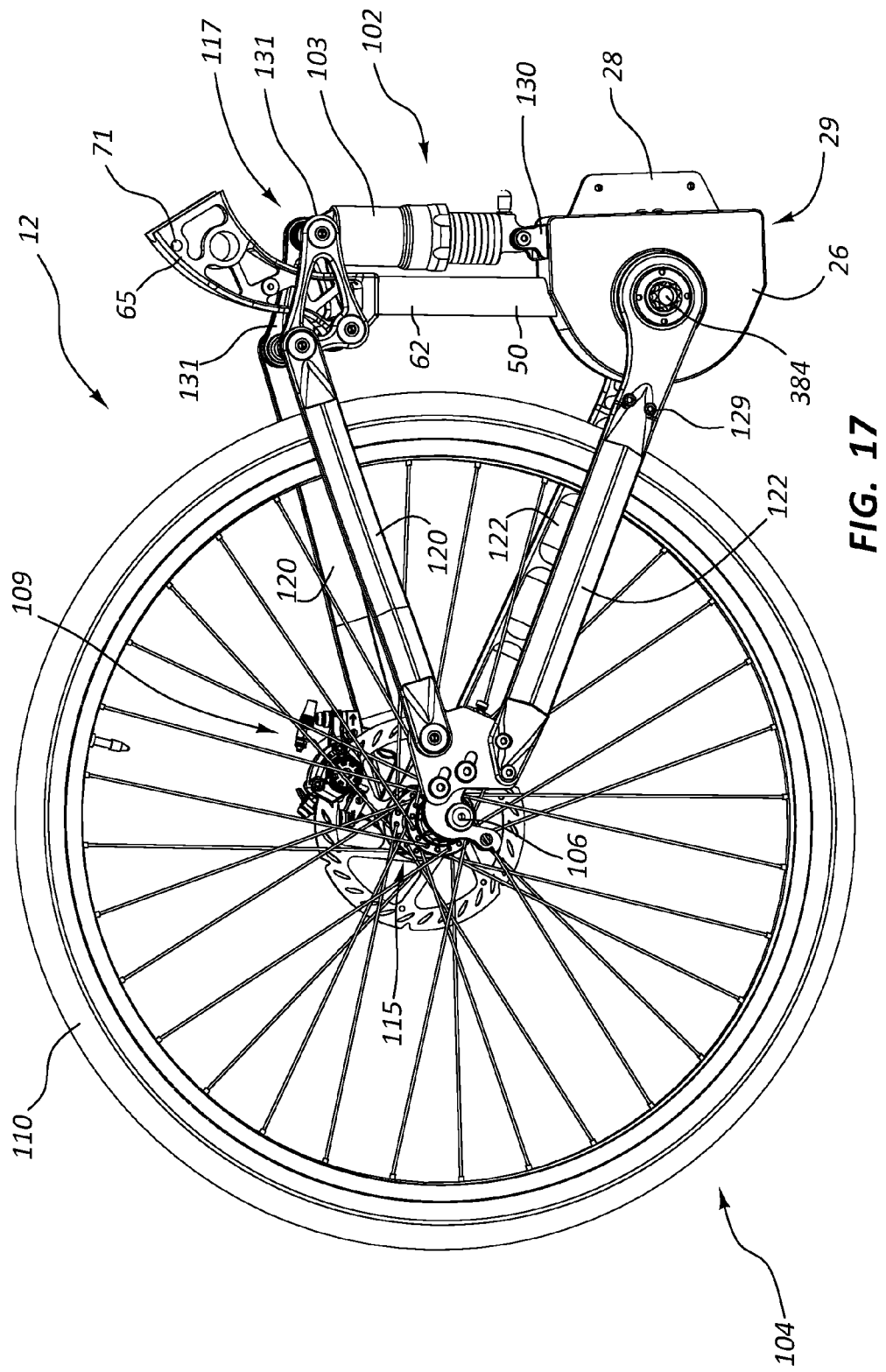
FIG. 17 shows a perspective view of the rear wheel assembly of the tadpole tricycle shown in FIGS. 1-4.

Referring to FIG. 17, one embodiment of the rear wheel assembly 12 is shown. The rear wheel assembly 12 is coupled to the frame assembly 10. The rear wheel assembly 12 includes a pair of upper support members 120, a pair of lower support members 122 (also referred to as swingarms), a rear wheel 104, a rear wheel gear ring 108 (also referred to as a toothed wheel) (FIG. 50), and a rear shock assembly 102. The rear wheel 104 includes a rear hub assembly 115 and a brake assembly 109 both of which are coupled to the upper and lower support members 120, 122 by way of a rear wheel axle 106. The brake assembly 109 may be any suitable brake assembly including, but not limited to, a disc brake assembly.

In many respects, the rear wheel assembly 12 has a similar configuration to a typical bicycle. This makes it simple and inexpensive to repair and service. In one embodiment, the rear shock assembly 102, the rear wheel 104 and associated tire 110, the rear wheel gear ring 108 (FIG. 50), the brake assembly 109, and the rear wheel axle 106 can be standard bicycle components available from any suitable bicycle manufacturer. For example, the rear wheel axle 106 can be at least partially threaded to cooperate with one or more fasteners such as a quick release fasteners commonly used with bicycles. Further, the rear shock assembly 102 can include any suitable shock such as a spring, pneumatic, hydraulic, or other shock.

Figure 18:
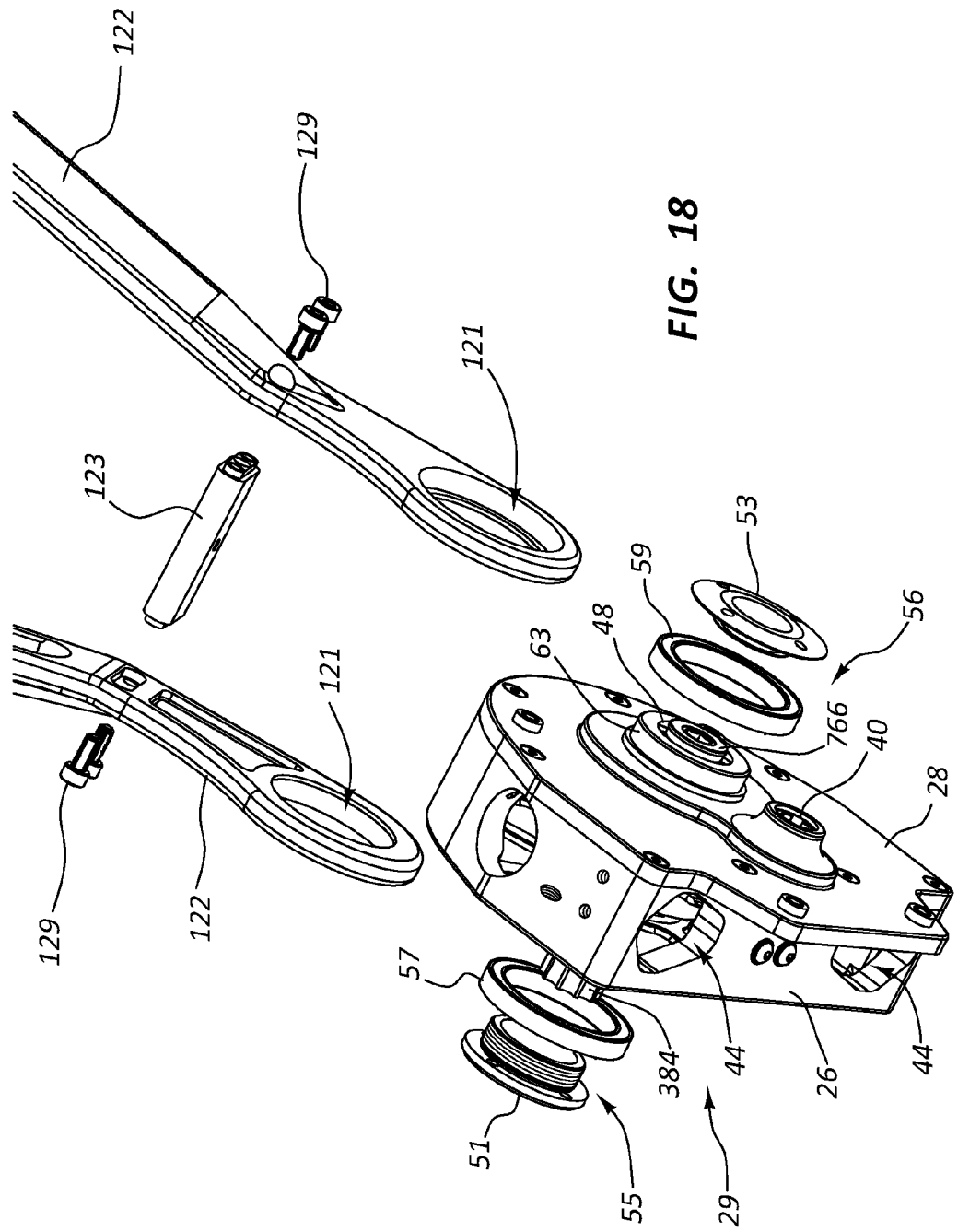
FIGS. 18-19 show exploded perspective views of how the lower support members of the rear wheel assembly shown in FIG. 17 are coupled to the rear transmission assembly shown in FIGS. 9-12.
Figure 19:
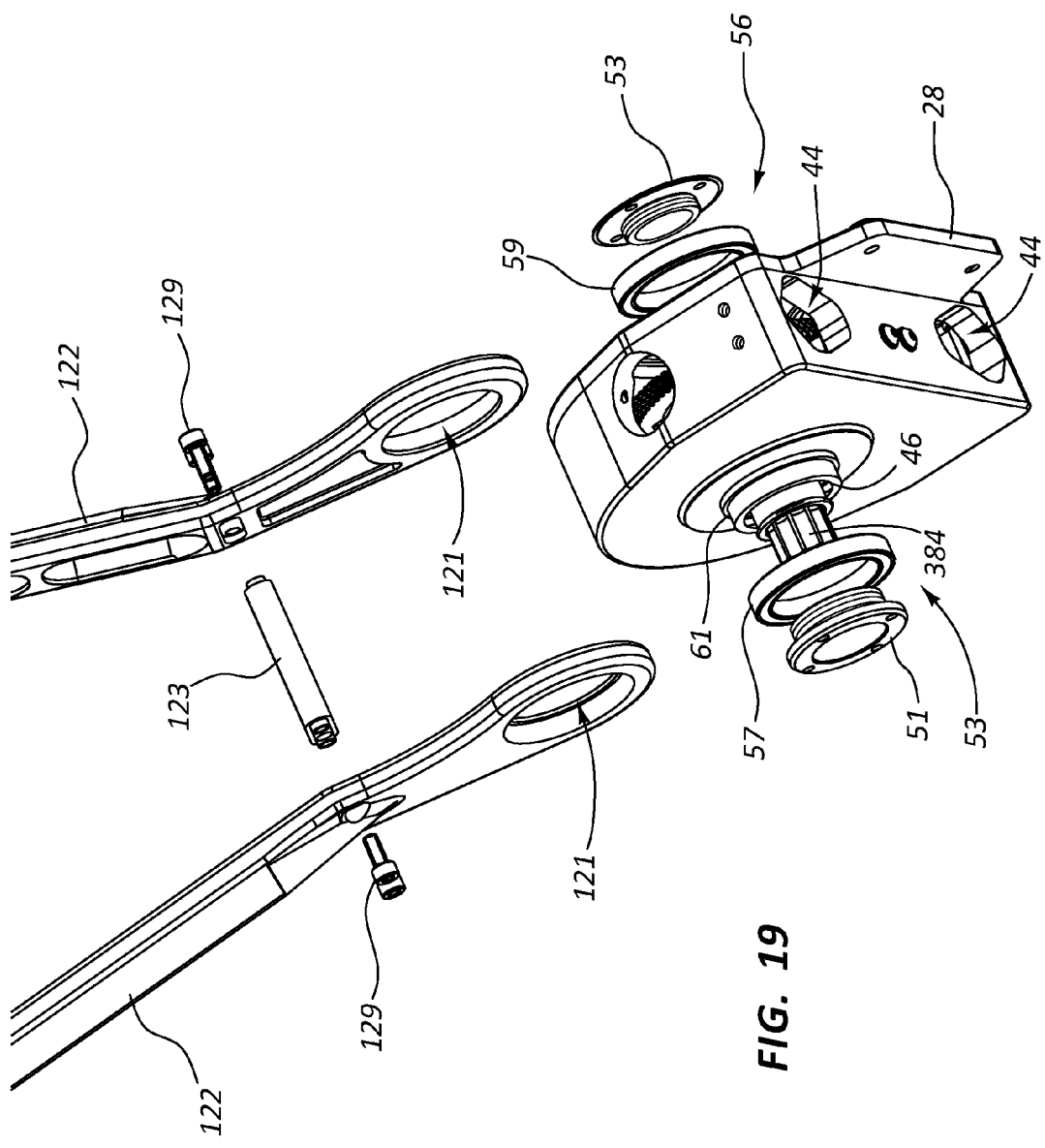

FIGS. 18-19 show how the lower support members 122 are coupled to the rear transmission assembly 29. Each support member 122 includes an opening 121 sized to receive the bearings 57, 59 coupled to the flanges 61, 63 on the rear transmission case 26 and the rear transmission cover 28. The support members 122 rotate or pivot on the bearings 57, 59 to allow the rear wheel assembly 12 to move relative to the frame assembly 10.

A brace 123 extends between the lower support members 122 to provide added rigidity and strength. The brace 123 is held in place by fasteners 129 which extend through the lower support members 122 and into the ends of the brace 123.

FIG. 20 shows how the upper support members 120 and the rear shock assembly 102 are coupled to the frame assembly 10. The rear shock assembly 102 includes a rear shock 103, a rear shock mount assembly 130, and a rear shock pivot assembly 117. The rear shock mount assembly 130 is used to pivotably couple the bottom of the rear shock 103 to the top of the rear transmission case 26. The rear shock pivot assembly 117 is configured to pivotably couple the upper support members 120 and the top of the rear shock 103 to the upper union member 65 and the upper support members 120.

The rear shock assembly 102 absorbs or dampens the shocks applied to the rear wheel assembly 12 while traveling over uneven terrain. It prevents those forces from being transferred to the rider and making him/her uncomfortable.

The rear shock pivot assembly 117 includes opposing pivot brackets 131 coupled together with fasteners 118, bearings 119, sleeves 133 as shown in FIG. 20. The bearings 119 fit within the corresponding openings in the pivot brackets 131. The fasteners 118 securely couple the pivot brackets 131 together in a spaced apart relationship. The sleeves 133 keep the pivot brackets 131 spaced apart.

The pivot brackets 131 are coupled to the upper union member 165 using a fastener 118 that passes through bushings 134 and a hole 135 (FIGS. 15-16) in the upper union member 165. It should be appreciated that the pivot brackets 131 can be coupled to the frame assembly 10 using any suitable fasteners or methods. Moreover, any of the components of the rear shock assembly 102 can be coupled together by way of mechanical fasteners, threaded complementary structures, or other coupling techniques and devices.

The operation of the rear shock assembly 117 is as follows. An upward shock on the rear wheel 104 causes the upper support members 120 to move upward. The upward movement of the upper support members 120 is transferred to the wheel side of the pivot brackets 131 as upward movement. The pivot brackets 131 pivot on the axis of the fastener 118 that passes through the hole 135 in the upper union member 165 and transfer the upper movement from the one side to downward movement on the shock side. The downward movement compresses the rear shock 103.

In one embodiment, the stiffness of the rear shock 103 is adjustable thereby allowing the rear suspension to be customized for each rider. In one embodiment, the rear shock 103 includes a resilient member positioned inside a two-part housing. The resilient member and the housing are configured so that the resilient member is compressed when the rear wheel 104 hits a bump. The stiffness of the rear shock 103 can be adjusted by rotating an adjustment ring 105, which moves the two-part housing together thereby compressing the resilient member and increasing the stiffness or moves the two-part housing apart thereby releasing the compression on the resilient member and decreasing the stiffness.

It should be appreciated that any suitable rear shock 103 may be used. In one embodiment, the rear shock 103 is an off-the-shelf shock such as any of those available from Cane Creek, DT Swiss, and the like. The rear shock 103 can also be pneumatic, hydraulic, and/or spring operated. The stiffness of most of these shocks can be adjusted as desired by the rider. For example, the rear shock 103 may include a spring and a nut that selectively compresses or decompresses the spring to adjust the stiffness.

In alternative embodiments, the tadpole tricycle 8 can be made without a rear shock assembly 102. For example, the upper support members 120 and lower support members 122 can be coupled directly to the frame assembly 10 in a manner that does not allow the rear wheel assembly 12 to rotate or pivot to absorb shocks. This may be desirable if the tadpole tricycle 8 is designed to operate on smooth roads where shocks are less of a concern to the rider. Eliminating the extra components associated with the rear shock assembly 102 reduces the weight of the tadpole tricycle 8 and thus reduces the amount of power that must be provided.

Figure 21:
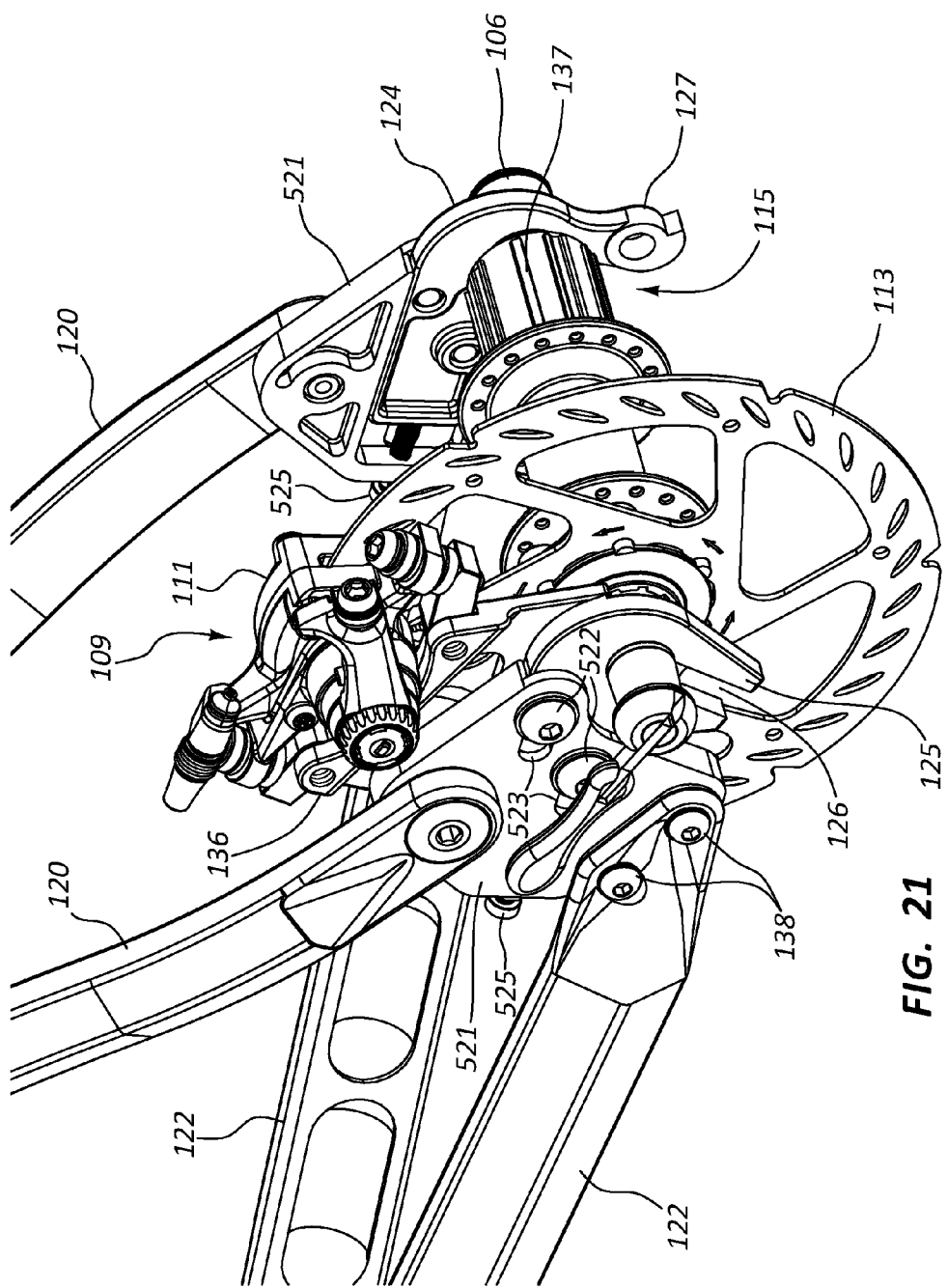
FIGS. 21-22 show perspective views of how the lower and upper support members of the rear wheel assembly shown in FIG. 17 are coupled to a rear hub assembly.
Figure 22:
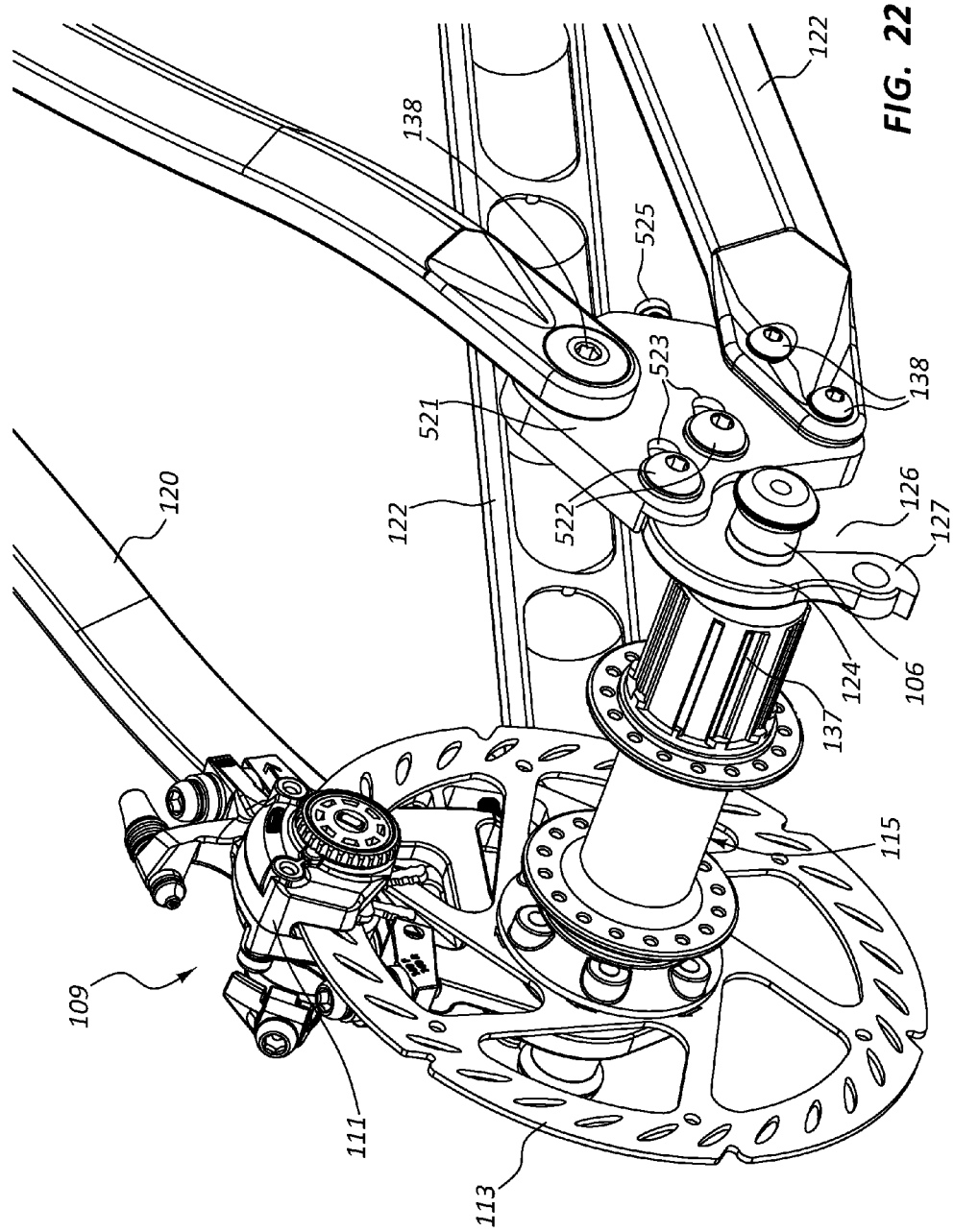
Figure 23:
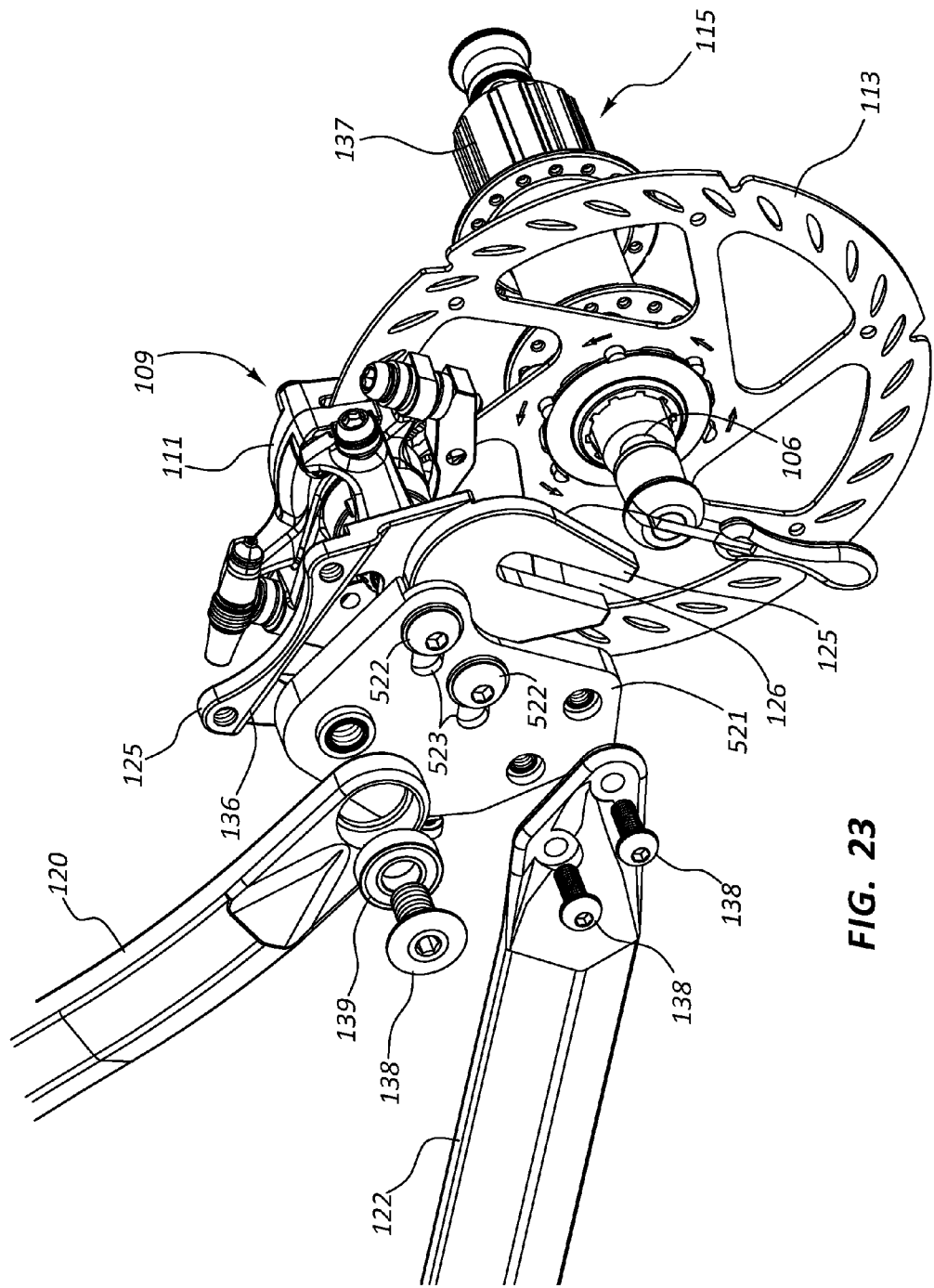
FIG. 23 shows a partially exploded perspective view of how the right rear axle mount is coupled to the rear wheel axle.
Figure 24:
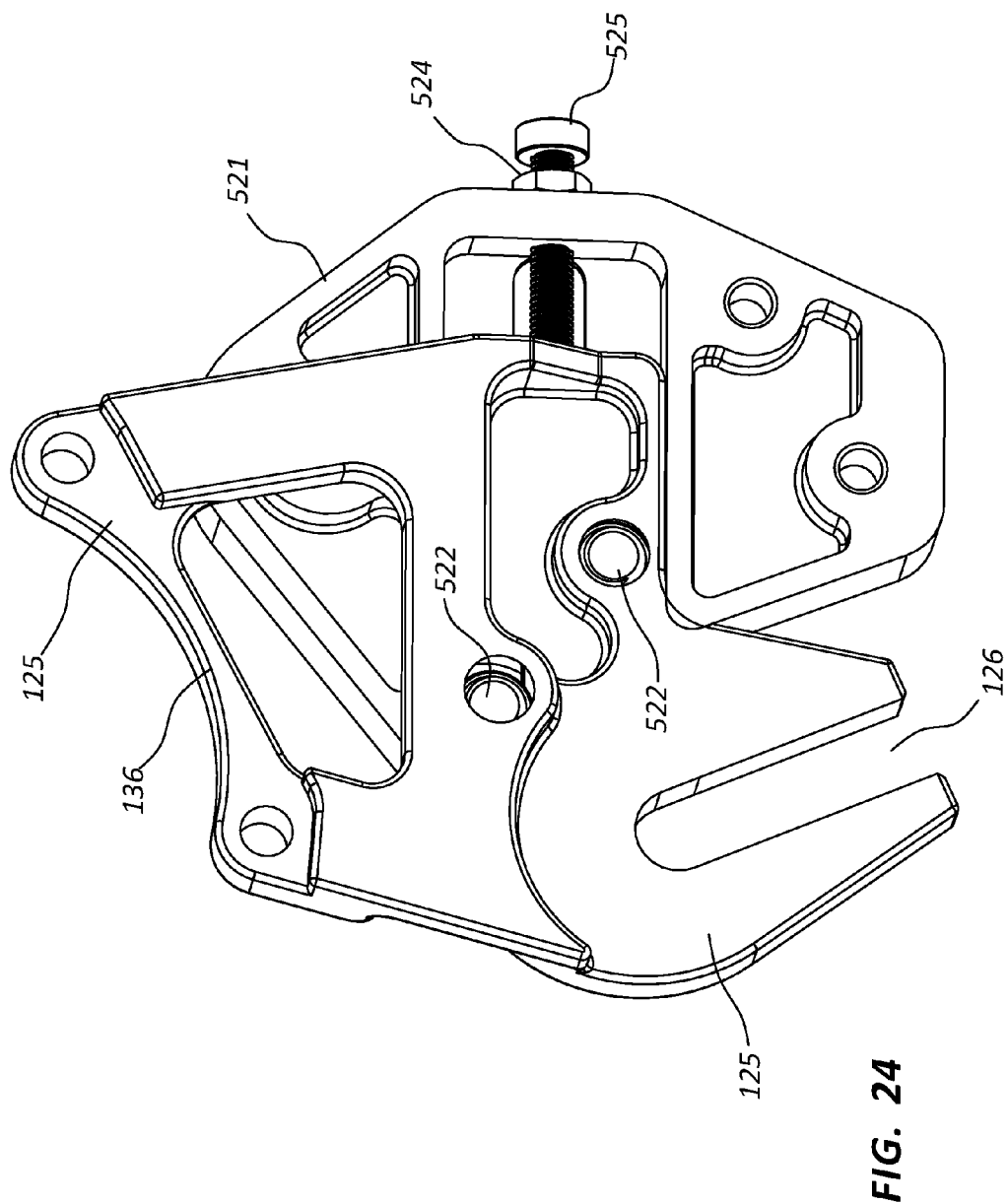
FIG. 24 shows a perspective view of how the right rear axle mount can be adjusted.

FIGS. 21-23 show how the support members 120, 122 are coupled to the rear hub assembly 115. The support members 120, 122 are coupled to a support bracket 521 and axle mounts 124, 125 using fasteners 138 and bearings 139. The axle mounts 124, 125 each include a channel 126 configured to fit on the rear wheel axle 106. Although reference is made to the support members 120, 122 being coupled to the support brackets 521 and the axle mounts 124, 125, it should be appreciated that the support brackets 521 and the axle mounts 124, 125 can be integrally formed with the support members 120, 122.

Figure 25:
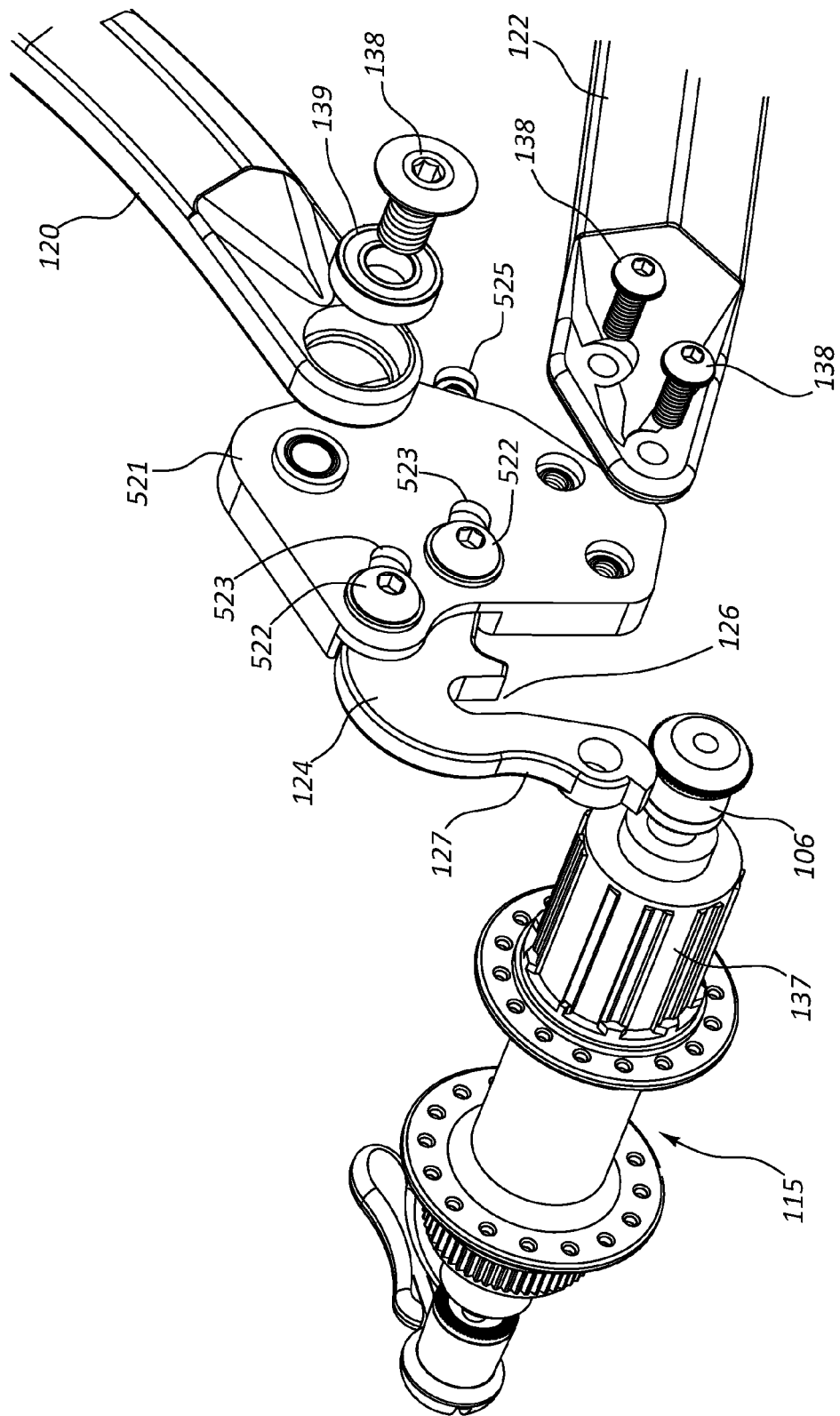
FIG. 25 shows a partially exploded perspective view of how the left rear axle mount is coupled to the rear wheel axle.
Figure 26:
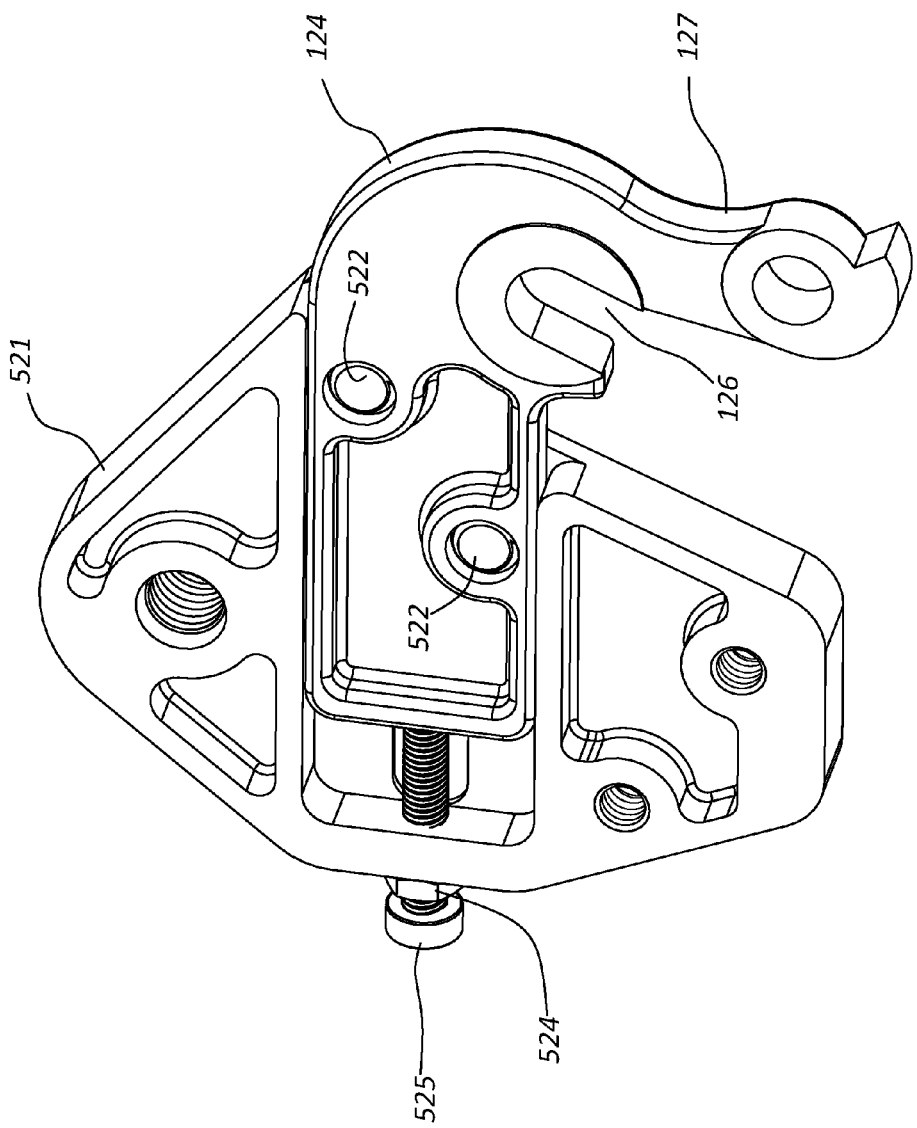
FIG. 26 shows a perspective view of how the left rear axle mount can be adjusted.

Referring to FIGS. 23 and 25, the rear wheel 104 (FIG. 17) is coupled to the axle mounts 124, 125 by positioning the rear wheel axle 106 in the channels 126 and coupling them together. The rear wheel axle 106 can be coupled to the axle mounts 124, 125 using any suitable fastener such as quick-release bicycle fasteners, nuts and bolts, or other bicycle related fasteners.

The support brackets 521 are detachably coupled to the upper support members 120. This allows the user to separate the upper support members 120 from the support bracket 521 to put a flexible drive member such as toothed belt on the rear wheel gear ring 108 (FIG. 50). Flexible drive members such as a toothed belt cannot be separated like a chain so the upper support members 120 are modified to make them separable from the support brackets 521 to allow the toothed belt to be put onto the rear wheel gear ring 108. It should be appreciated that if a chain is used then the upper support members 120 and the support brackets 521 can be integrated together into a single component. The support brackets 521 are also detachably coupled to the lower support members 122.

The axle mounts 124, 125 are coupled to the support brackets 521 in a manner that allows the axle mounts 124, 125 to extend or retract relative to the support brackets 521 to allow the user to adjust the tension of the flexible drive member. This is especially desirable for situations where a tensioner is not used—e.g., flexible drive member is a toothed belt.

The axle mounts 124, 125 can be adjustably coupled to the support brackets 521 in any suitable manner. In the embodiment shown in FIGS. 21-26, the axle mounts 124, 125 are coupled to the support brackets 521 using fasteners 522 that pass through slots 523 in the support brackets 521.

The tension of the flexible drive member can be adjusted using the adjustment members 525 on the support brackets 521. This is done by loosening the fasteners 522 and turning the adjustment member 525 to slidably extend or retract the axle mounts 124, 125 to increase or decrease the tension. Once the desired tension is reached, the fasteners 522 are tightened to securely hold the axle mounts 124, 125 in place. Also, a set nut 524 (FIGS. 24 and 26) on the adjustment members 525 is tightened to prevent the adjustment members from moving.

It should be noted that the axle mounts 124, 125 and support brackets 521 are positioned so that the axle mounts 124, 125 extend and retract in a direction that is parallel to or on a line that extends from the axis of the rear axle 384 to the axis of the rear wheel axle 106. The slots 523 in the support are also parallel to or on the same line. This is desirable because it allows the tadpole tricycle 8 to accommodate different rear wheel 104 sizes without changing the dynamics of the tricycle 8.

For example, in one embodiment, the only modification required for the tadpole tricycle 8 to switch the rear wheel 104 from a 26 inch wheel to a 29 inch wheel or a 700 C wheel is different length axle mounts 124, 125. Longer axle mounts 124, 125 can accommodate the larger diameter rear wheels 104 without changing the other characteristics of the tricycle 8 such as distance from the rear transmission assembly 29 to the ground, etc. This means that regardless of the size of the rear wheel 104, the tadpole tricycle's handling characteristics, center of gravity, etc., remain the same or substantially the same. It should be noted that if a toothed belt is used as the flexible drive member, then it may also be necessary to use a longer belt. If a chain is used as the flexible drive member, then the tensioner can compensate for the different wheel sizes.

The support brackets 521 are mirror images of each other depending on which side of the rear wheel 104 they are located. The axle mounts 124, 125, however, are each configured differently. The axle mount 124 includes an additional mounting arm 127 configured to support a derailleur in situations where a chain is used as the flexible drive member that extends from the rear gear ring 444 positioned adjacent to the rear transmission assembly 29 to the rear wheel gear ring 108.

The axle mount 125 includes a brake mount flange 136 to which a portion of the brake assembly 109 is coupled. It should be appreciated that the axle mounts 124, 125 can have a wide variety of additional configurations. For example, the axle mounts 124, 125 could both be mirror images of each other like the support brackets 521. They could both include the mounting arm 127.

Figure 41:
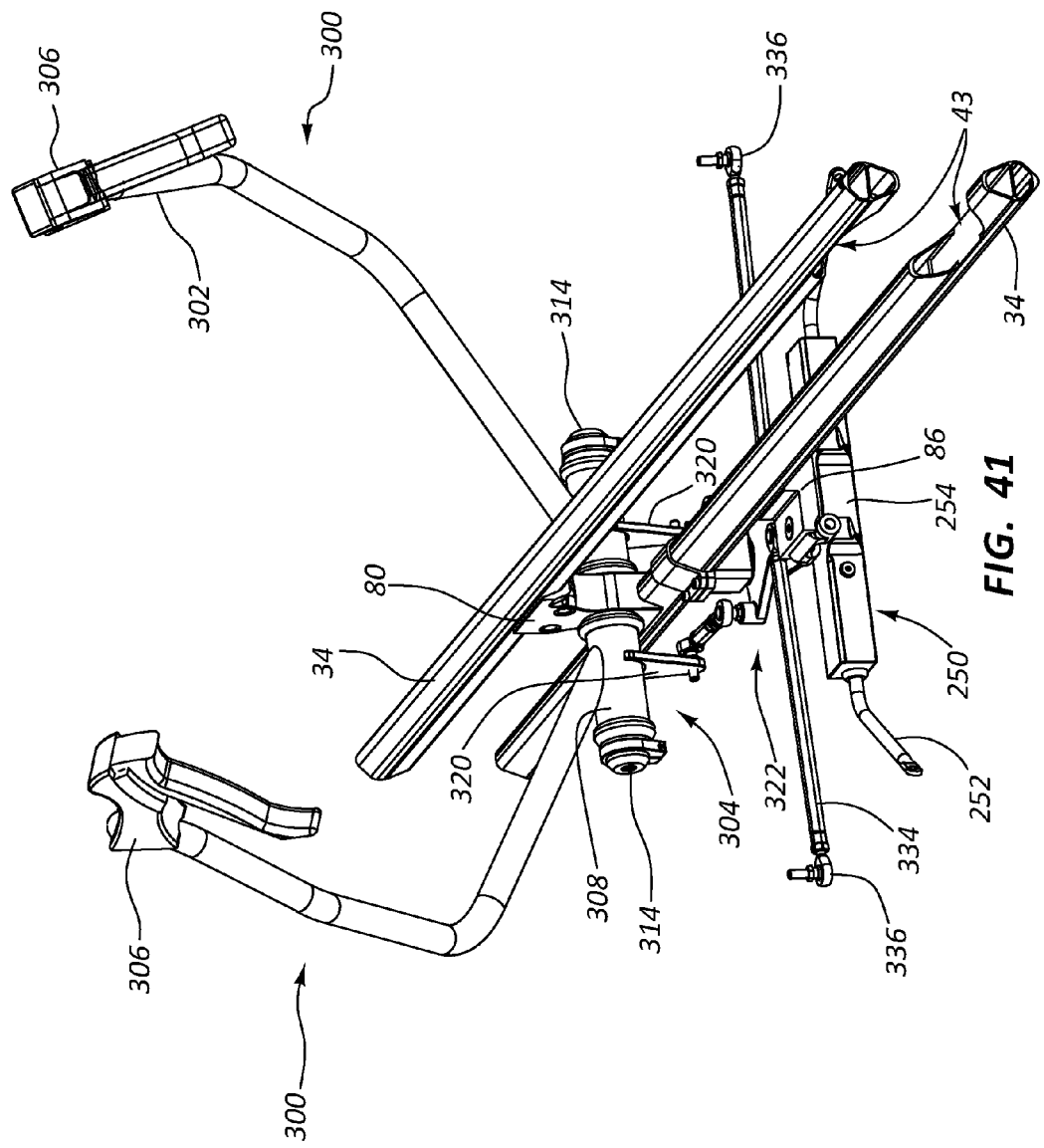
FIG. 41 shows a perspective view of the steering assembly of the tadpole tricycle shown in FIGS. 1-4 coupled to the frame assembly shown in FIG. 5.
Figure 42:
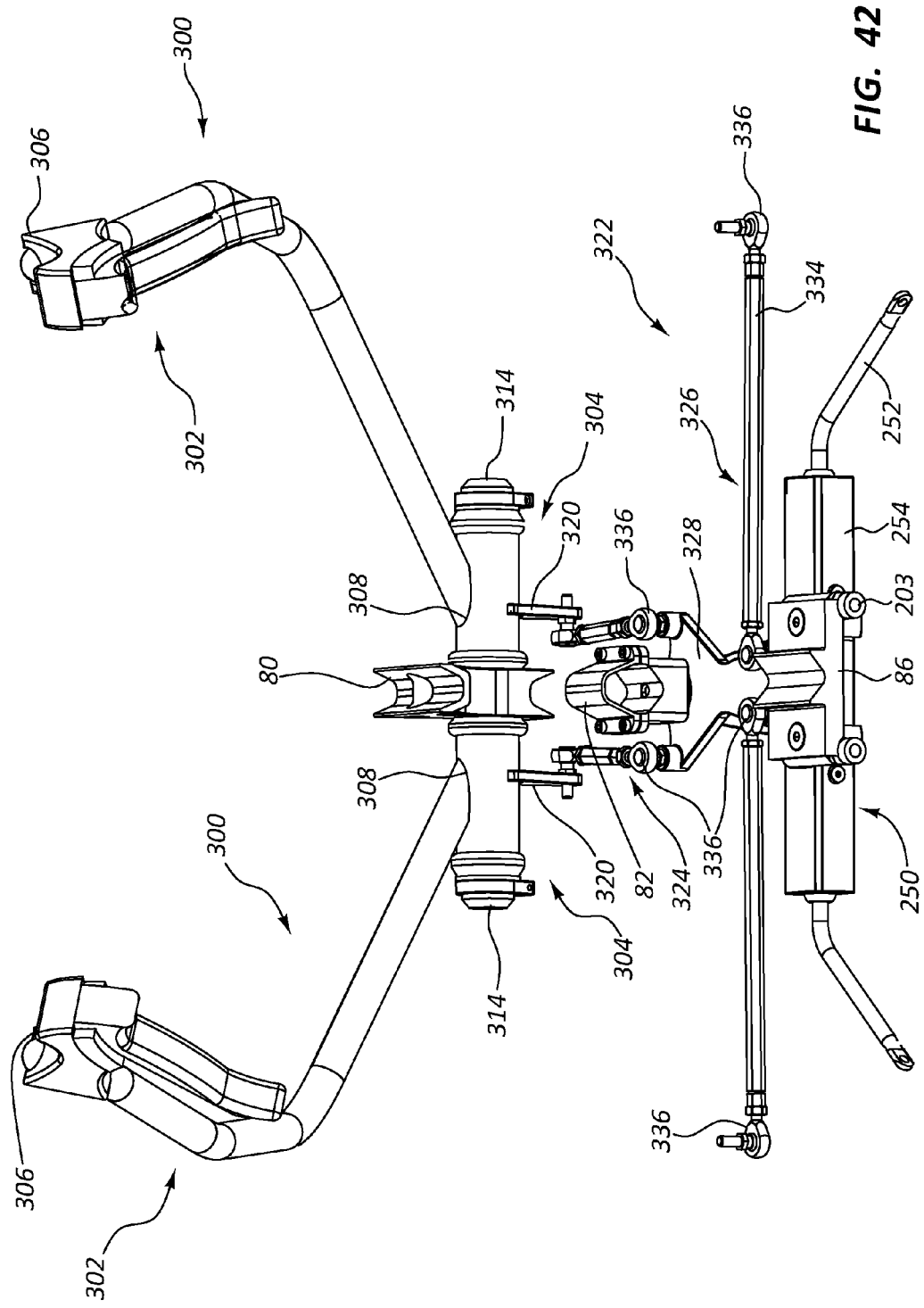
FIGS. 42-43 show front and side perspective views of the steering assembly shown in FIG. 41.

In one embodiment the brake assembly 109 includes calipers 111 and a disc 113 (FIGS. 12 and 4). The calipers are coupled to the axle mount 125. The disc 113 is coupled to the rear wheel axle 106. The calipers 111 are actuated when the rider squeezes on a corresponding lever on the handles 300 (FIG. 41). It should be appreciated that the rider can control the brake assembly 109 using any suitable technique.

The rear wheel assembly 12 can include a rear wheel gear ring 108 that is either a cassette or a single toothed wheel that is configured to engage a toothed belt. The rear wheel axle 106 includes a splined portion 137 on which the rear wheel gear ring is positioned.

If a cassette and chain are used, then a derailleur is also typically included. It should be appreciated that any suitable derailleur be used. In one embodiment, the derailleur is an off-the-shelf component to make it easier to modify, repair, and service the tadpole tricycle 8. For example, the derailleur can be any of the models made by well known manufacturers such as Shimano. The derailleur can be coupled to the mounting arm 127 on the axle mount 124 as described above. The rider can control the derailleur using grip shifts, thumb shifters, road-bicycle type controllers or the like.

Figure 27:
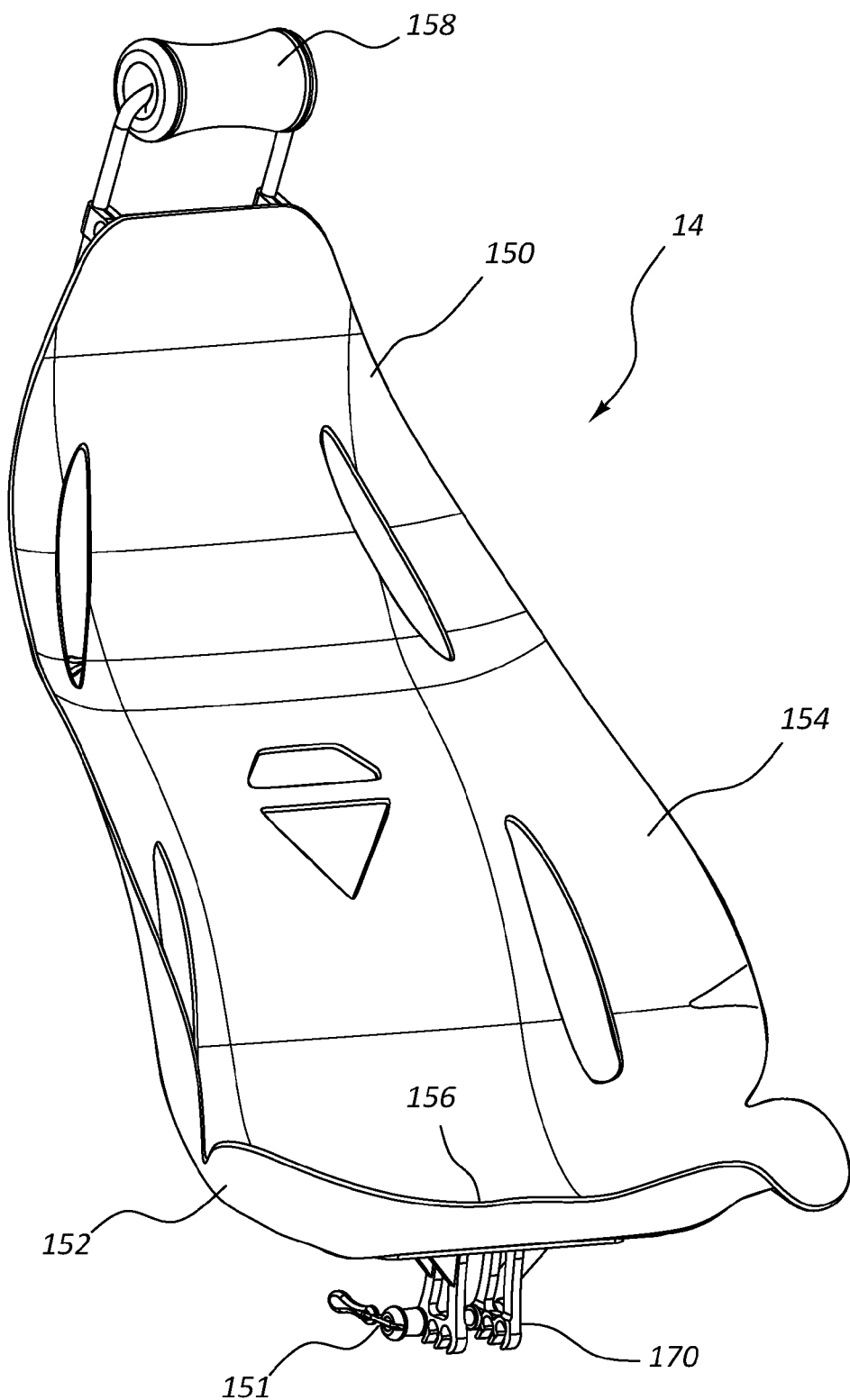
FIGS. 27-28 show front and rear perspective views, respectively, of the seat of the tadpole tricycle shown in FIGS. 1-4.
Figure 28:
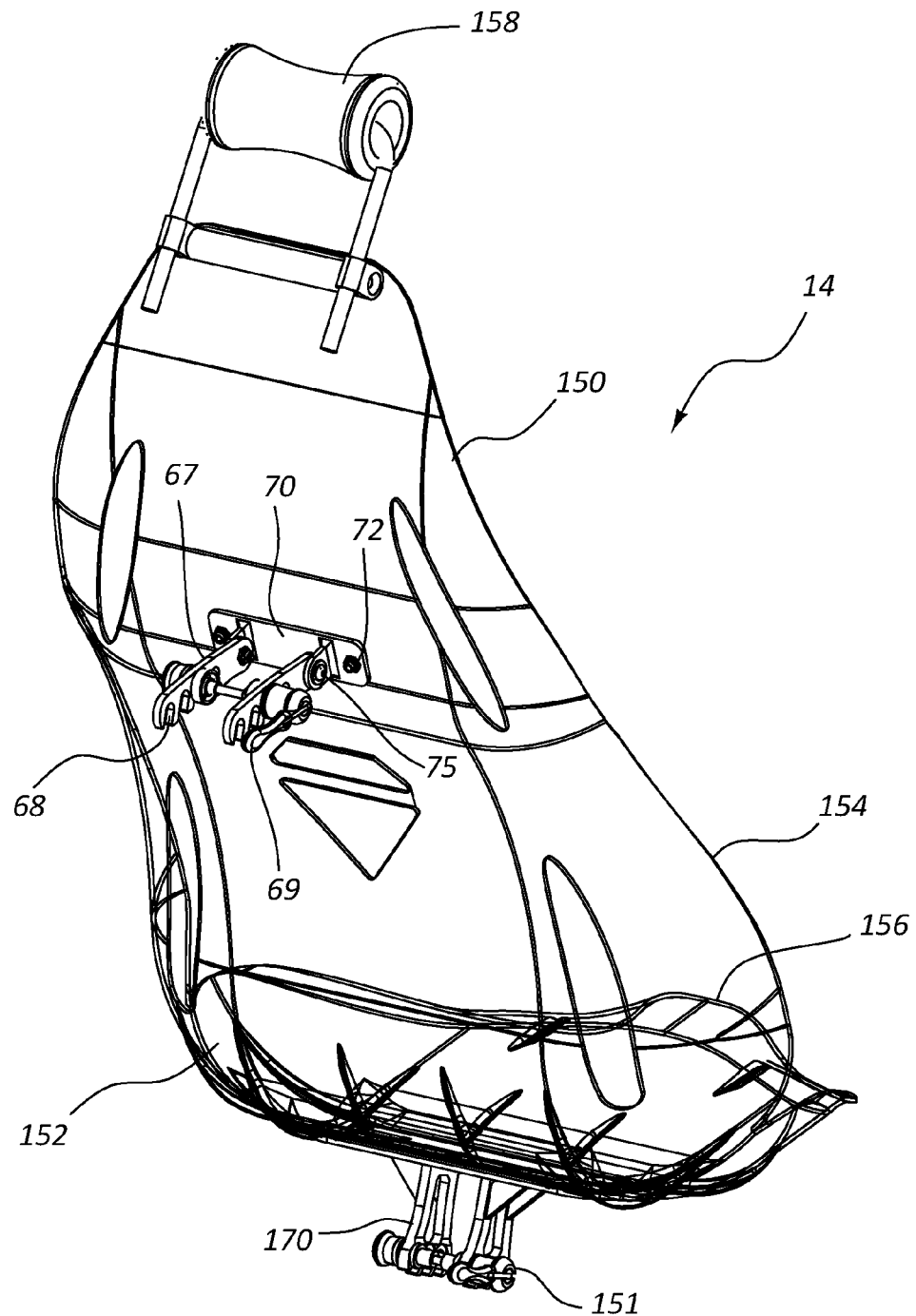

FIGS. 27-29 show front and rear perspective views of the seat assembly 14. The seat assembly 14 provides a stable seat for the rider and supports the rider's torso, buttocks, legs, and optionally head and neck. The seat bottom portion or lower seating portion of the seat assembly 14 is positioned on and supported by the frame assembly 10 to allow the rider to easily sit and rise from the seat bottom. In one configuration, the seat bottom portion is positioned at a height above the ground that is about the same as the horizontal portion of a typical chair to aid the rider in mounting and dismounting the tadpole tricycle 8.

The seat assembly 14 includes a seat 150 having lower sides 152 and upper sides 154. The seat 150 and/or the sides 152, 154 may be contoured to the shape of the rider's torso, buttocks, and a portion of the rider's legs. Although the seat 150 is contoured to hold the rider, the seat 150 and sides 152, 154 can flex as the rider turns the tadpole tricycle 8 to enable the rider to "lean-into" the turn and thereby provide the rider with greater control of the tadpole tricycle 8. Furthermore, the seat 150 can flex to accommodate larger riders and provide the desired support. It should be appreciated that the seat 150 can also be rigid and not flex.

In general, the seat 150 securely holds the rider as he or she travels on the tadpole tricycle 8. The seat 150 can be fabricated from a variety of materials, such as, but not limited to, carbon fiber, KEVLAR, composite materials, synthetic materials, polymers, plastics, or other materials having the desired strength and flexibility properties.

In addition to the above, the seat bottom portion of the seat 150 includes a lip 156 shown in FIGS. 27-29, which prevents the rider from sliding out of the seat 150. A seat back or upper seating portion of the seat 150 includes a headrest 158. The headrest 158 provides support to the rider's head while traveling and can optionally be covered with a flexible material or some other material that can cushion the rider's head and/or neck. More generally, any portion of the seat 150 can include flexible and/or cushioning material.

Referring to FIGS. 27-29, the seat assembly 12 includes a lower seat bracket 170 and an upper seat bracket 70. The lower seat bracket 170 is used to couple the seat 150 to the frame assembly 10 (FIG. 5). More specifically, the lower seat bracket 170 can mount either directly or via an intermediate bracket to the frame assembly 10.

The lower seat bracket 170 includes a series of slots 171 that allow the rider to adjust the position of the seat 150 forward or backward and thereby adjust the angular orientation of the seat 150. The seat 150 can recline about 27 degrees to about 35 degrees depending on the number of slots 171 provided in the lower seat bracket 170. It should be understood that the seat 150 can incline a greater or lesser amount than the range explicitly called out above.

A mechanical fastener 151 extends through the selected slot 171 and through a hole in the attachment member 80 to couple the seat 150 to the frame assembly 10. The mechanical fastener 151 can be positioned in different notches formed by the series of slots 171 to adjust the incline of the seat 150. The mechanical fastener 151 can be any suitable fastener. In one embodiment, the fastener 151 is a quick release pin commonly used with bicycles.

Returning to FIG. 1, the front wheel assembly 16 of the tadpole tricycle 8 is described in greater detail. The front wheel assembly 16 provides the front suspension for the tadpole tricycle 8. The front suspension aids with providing a comfortable ride and also aids with steering control.

The front suspension depicted in the Figs. is a double A-arm suspension system. This is an independent suspension system that uses two control arms coupled to each wheel. Each arm is independently coupled to the frame assembly 10 and the wheel. A shock absorber is coupled to the arm to control vertical movement of the wheel. This design controls the motion of the wheel throughout suspension travel. Although the design is commonly referred to as having "A-arms," it should be appreciated that the arms themselves can have any shape such as an a A-shape, L-shape, or even a single bar linkage.

It should be appreciated that other front suspension systems may be used as well. For example, the front suspension can include two-leaf springs, with the leaves being made of carbon fiber, a metal, an alloy, a polymer, a synthetic material, a composite material, combinations thereof, or other materials that can function as described herein. The leaf springs provide a certain level of dampening based upon the weight of the rider. A number of different leaf springs can be used with the tadpole tricycle 8 depending on the weight of the rider and the degree of dampening desired.

Figure 30:
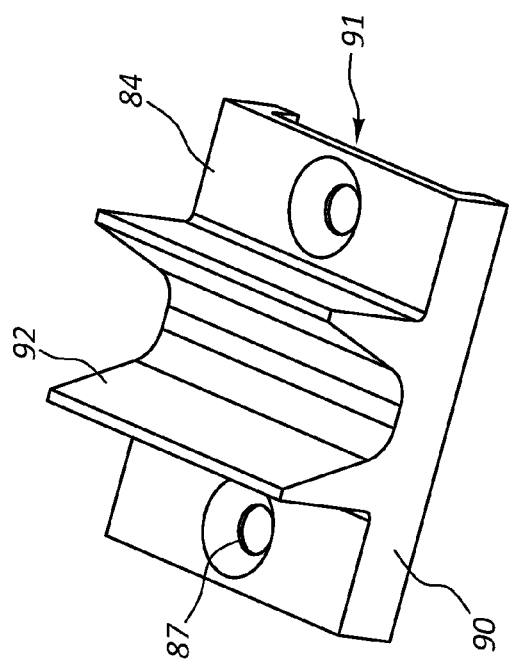
FIG. 30 shows a perspective view of the upper attachment member of the frame assembly shown in FIG. 5.
Figure 32:
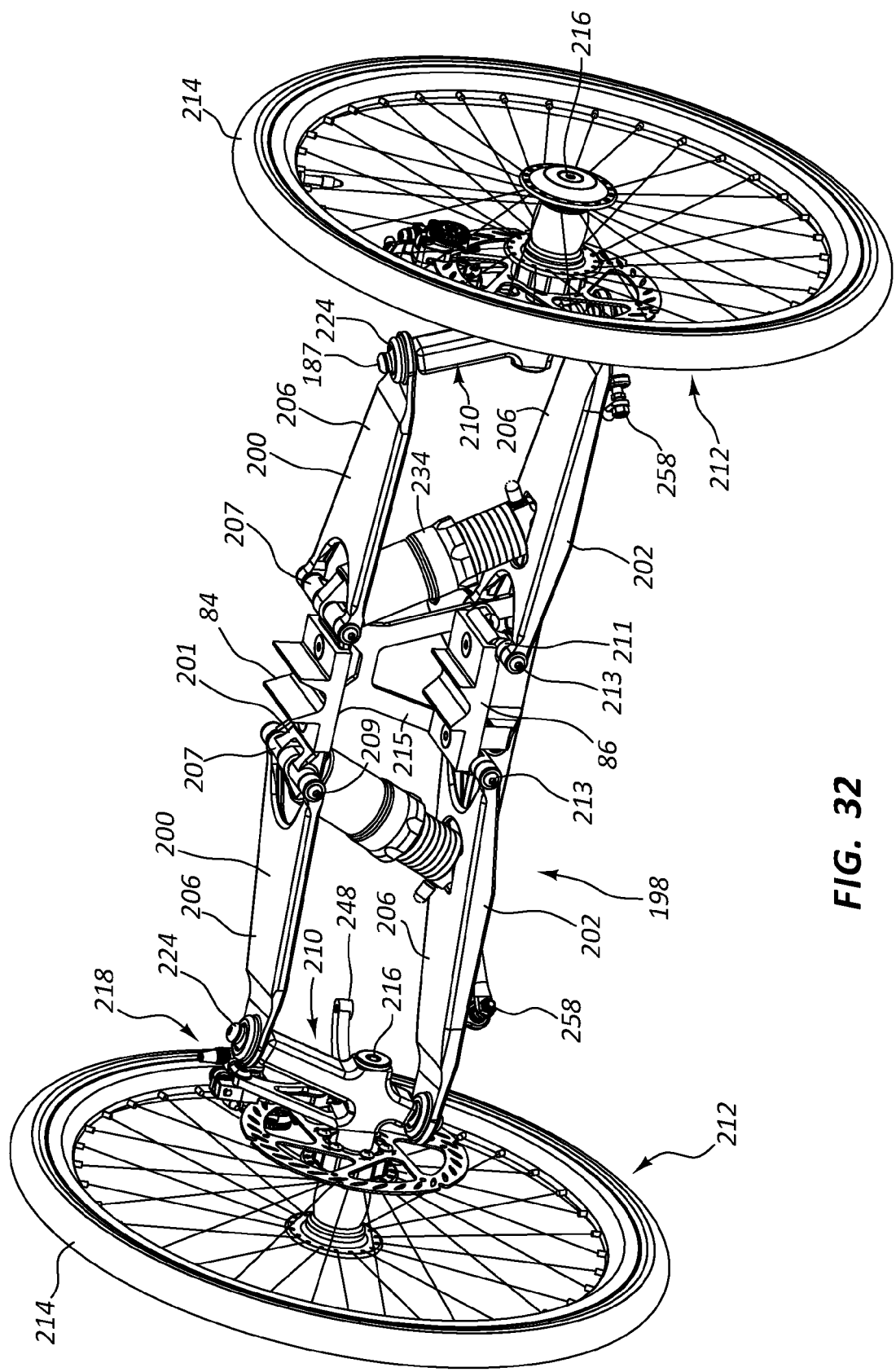
FIGS. 32-35 show upper frontal, lower frontal, upper rear, and lower rear perspective views of the front wheel assembly of the tadpole tricycle shown in FIGS. 1-4.
Figure 36:
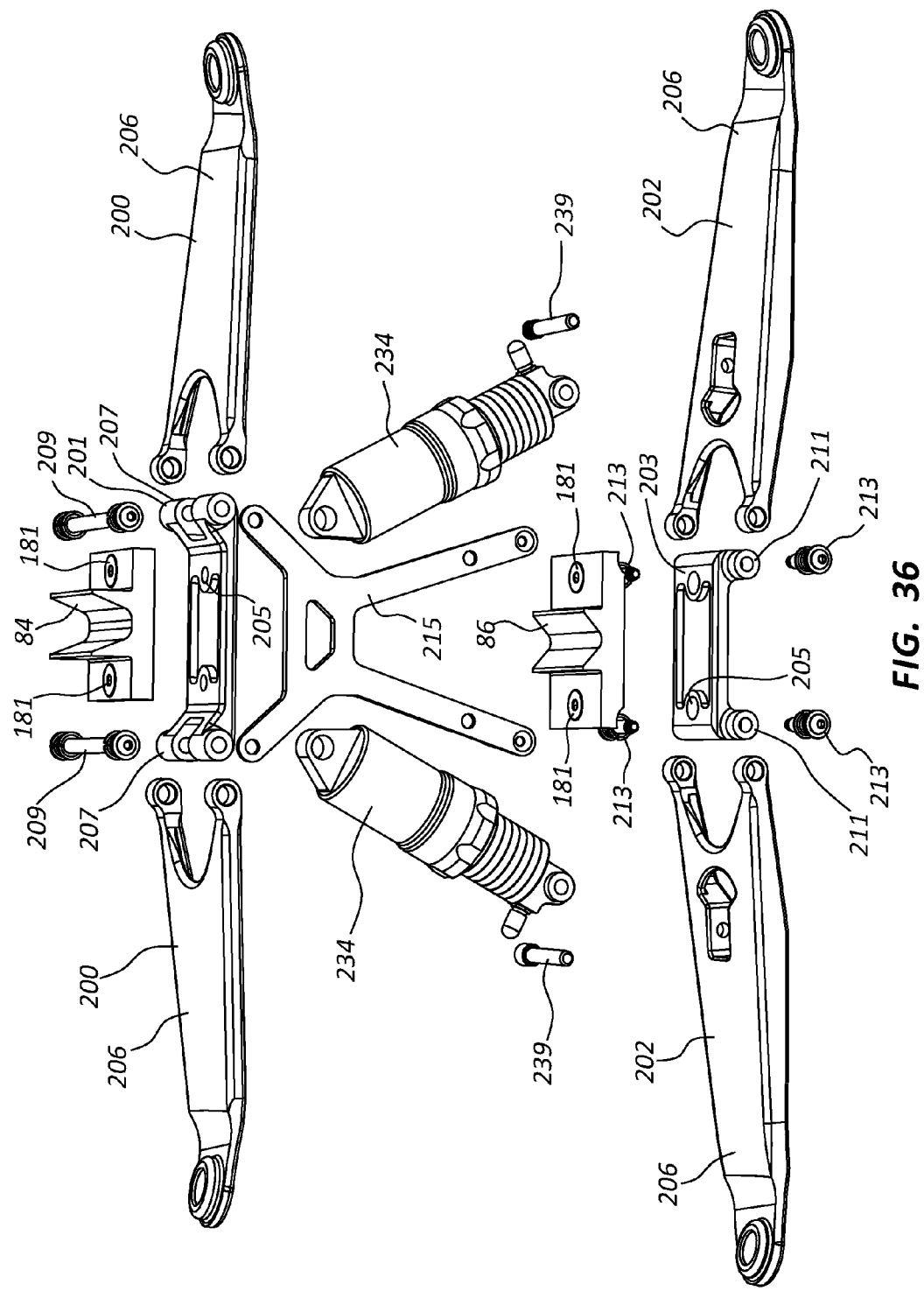
FIG. 36 shows an exploded perspective view of how the suspension system is coupled to the upper and lower attachment members shown in FIGS. 30-31.

The double A-arm suspension design is described in further detail as follows. The arms are coupled to the frame assembly 10 by way of attachment members 84, 86, as shown in FIG. 5. The upper attachment member 84, as shown in FIG. 30, includes a base 90, a connecting portion 92 extending upward from the base 90, and a channel 91 on the underside of the base 90. The connecting portion 92 engages the underside of the upper tubular member 34 and is held in place by welding, adhesives, fasteners, or the like. The base 90 is coupled to a support bracket 201, which fits in the channel 91 and is coupled to upper control arms 200 (FIG. 36).

Figure 31:
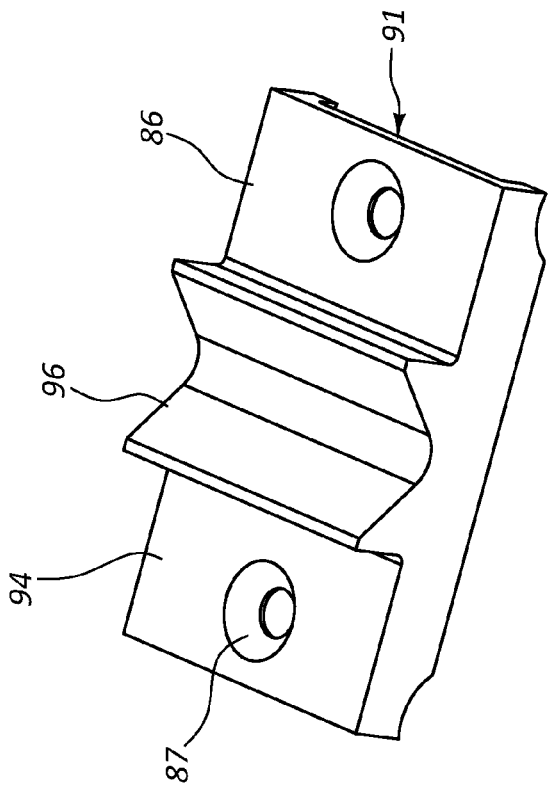
FIG. 31 shows a perspective view of the lower attachment member of the frame assembly shown in FIG. 5.

The lower attachment member 86, as shown in FIG. 31, includes a base 94, a connecting portion 96 extending upward from the base 94, and a channel 97 on the underside of the base 94. As with the base 90, the connecting portion 96 engages the underside of the lower tubular member 34 and is held in place by welding, adhesives, fasteners, or the like. The base 94 is also coupled to a support bracket 203 which fits in the channel 97 and is coupled to lower control arms 202 (FIG. 36).

Turning to FIGS. 32-35, one embodiment of the front wheel assembly 16 is shown. The front wheel assembly 16 is coupled to the frame assembly 10 (FIG. 5) using the attachment members 84, 86, shown in FIGS. 30-31. The front wheel assembly 16 includes a suspension system 198 that supports wheels 212 and connects the front wheel assembly 16 to the frame assembly 10. The suspension system 198 includes a pair of upper arms 200 and a pair of lower arms 202. The arms 200, 202 have generally similar configurations, however, the upper arms 200 are slightly shorter than the lower arms 202.

The attachment members 84, 86 are coupled to an upper support bracket 201 and a lower support bracket 203, respectively. As mentioned above, the support brackets 201, 203, fit in and extend out of the end of the channels 91, 97 of the attachment members 84, 86, respectively. The attachment members 84, 86 and the support brackets 201, 203 each include holes 87 (FIGS. 30-31), 205 (FIG. 36), respectively, that enable them to be coupled together.

In one embodiment, the holes 205 in the support brackets 201, 203 are threaded to receive a fastener 181 such as bolt or screw and hold the attachment members 84, 86 and the support brackets 201, 203 together. FIG. 36 shows how the attachment members 84, 86 are coupled to the support brackets 201, 203.

The upper support bracket 201 has opposing ends 207, which extend outward from the attachment member 84 and include spaced apart holes oriented transversely to the longitudinal direction of the upper support bracket 201. A pivot 209 (otherwise referred to as a fastener or pin) extends through the holes in the ends 207 to form an axis on which the upper arms 200 pivot.

Figure 37:
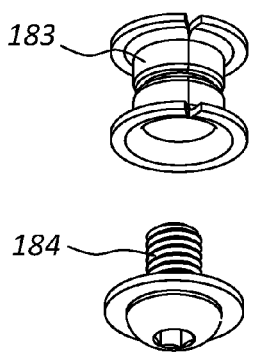

FIG. 37 shows the pivot 209 in greater detail. The pivot includes a sleeve 182, bushings 183, and fasteners 184. The bushings 183 are positioned on the sleeve 182 and the fasteners 184 prevent the sleeve 182 from coming out of the holes in the ends 207 of the upper support bracket 201. The upper arms 200 pivot on the bushing 183.

Likewise, the lower support bracket 203 has opposing ends 211, which extend outward from the attachment member 86 and include spaced apart holes oriented transversely to the longitudinal direction of the lower support bracket 203. A pivot 213 (otherwise referred to as a fastener or pin) extends through the holes in the ends 211 to form an axis on which the lower arms 202 pivot.

Figure 38:
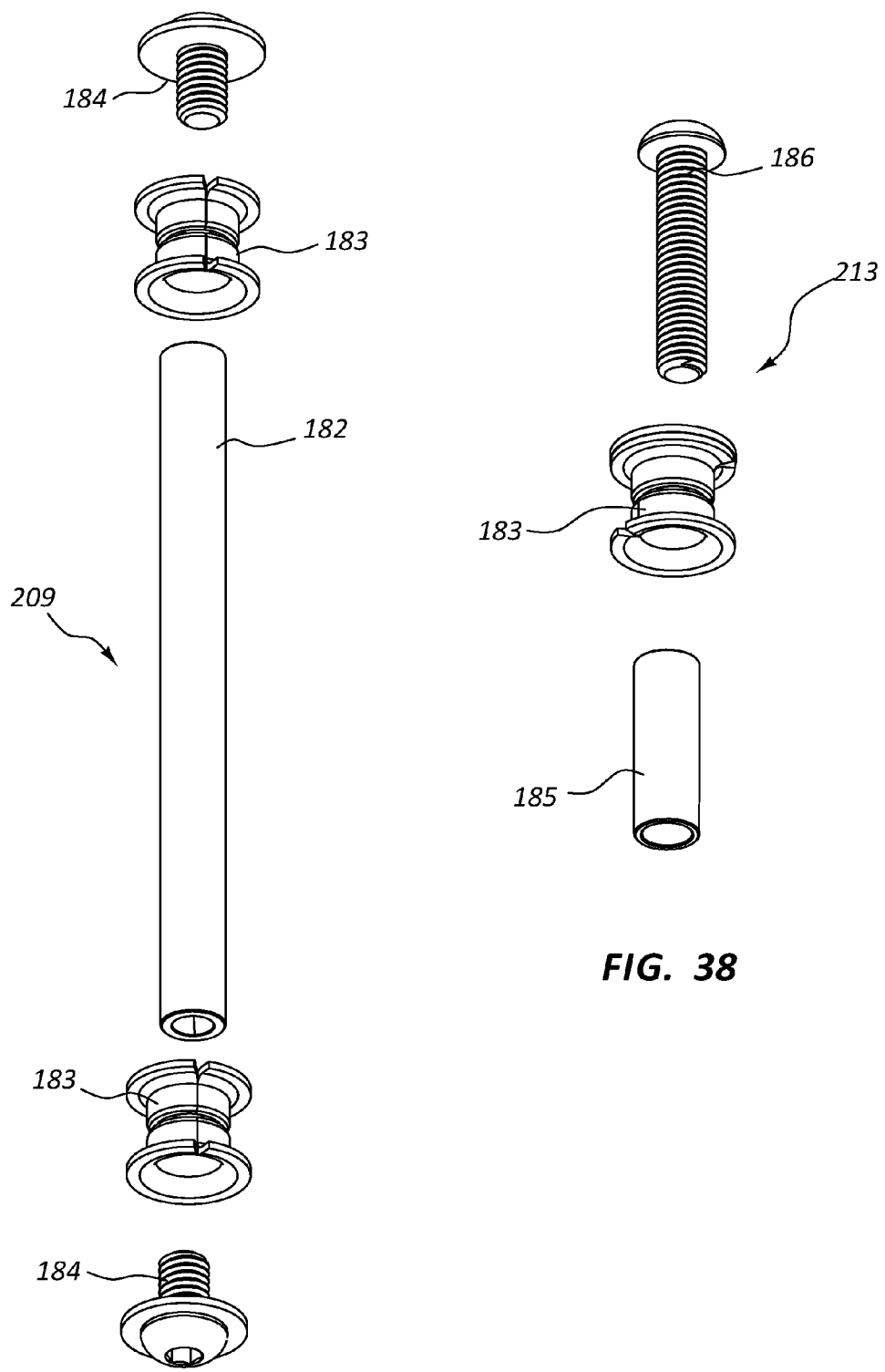
FIGS. 37-38 show exploded perspective views of the upper and lower control arm axles, respectively, of the suspension system shown in FIG. 36.

FIG. 38 shows the pivot 213 in greater detail. The pivot includes a sleeve 185, a bushing 183, and a fastener 186. Unlike the pivot 209, the pivots 213 do not extend across the entire lower support bracket 203 so there are four pivots 213, two for each end 211. The bushing 183 is positioned on the sleeve 185 and the fastener 186 screws into the hole in the lower support bracket 203 to hold the pivot 213 in place. The lower arms 202 pivot on the bushing 183.

The inner ends of the arms 200, 202 include corresponding spaced apart holes that are configured to align with the holes in the ends 207, 211 of the support brackets 201, 203, respectively. The pivots 209, 213 extend through the aligned holes to couple the arms 200, 202 to the support brackets 201, 203, respectively. The pivots 209, 213 allow the arms 200, 202 to pivot relative to the support brackets 201, 203, respectively.

Figure 34:
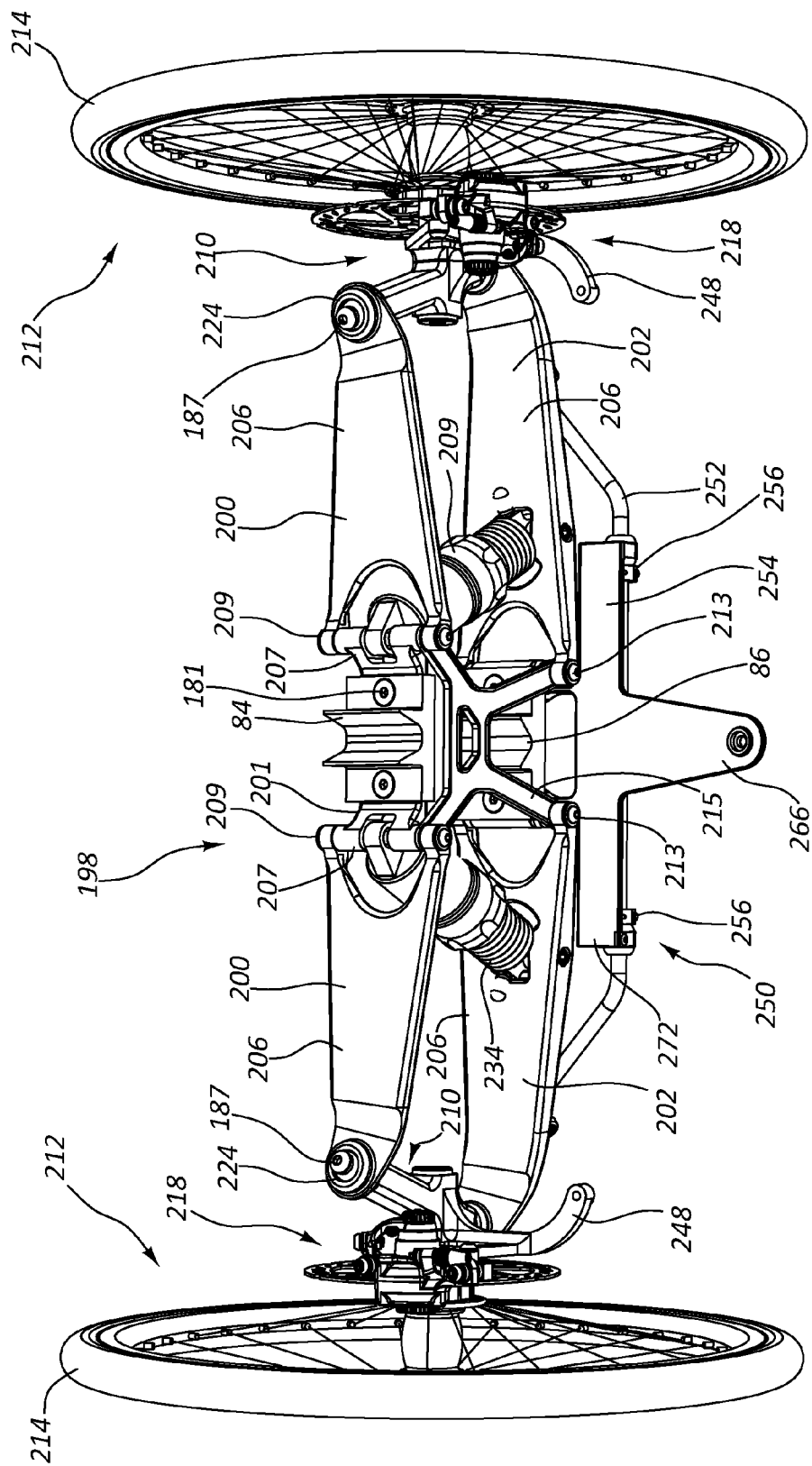
Figure 35:
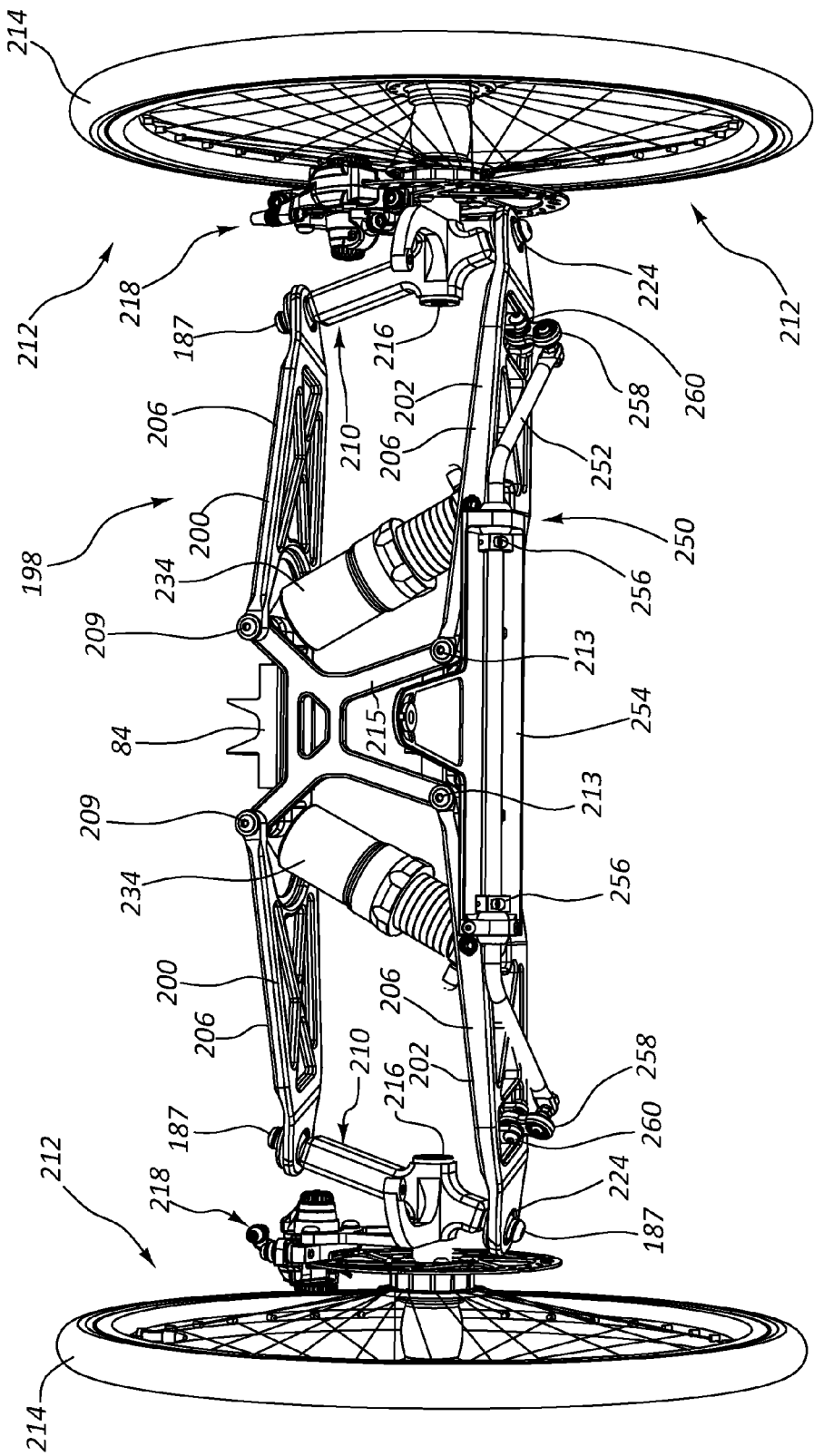

A support brace 215 (also referred to as a cross brace) is positioned between and coupled to the support brackets 201, 203 by way of the pivots 209, 213. The support brace 215 holds the upper and lower tubular members 34 in a fixed spaced apart relationship. The support brace 215 is best shown in FIGS. 34-36.

Referring to FIGS. 32-35, the upper and lower tubular members 34 allow the arms 200, 202 to be securely coupled to the frame assembly 10 in a vertically spaced apart fashion to facilitate formation of the double A-arm suspension. The tubular members 34 not only conceal the flexible drive member (e.g., chain), but also provide a strong, rigid frame to couple the front suspension to. The arms 200, 202 raise the position of the crank arms and pedals of the transmission assembly 20 (FIGS. 1-4) to a higher, more comfortable height for the rider. The arms 200, 202 form part of the suspension system 198 or a system that supports the frame assembly 10 on the axles of wheels 212.

Figure 39:
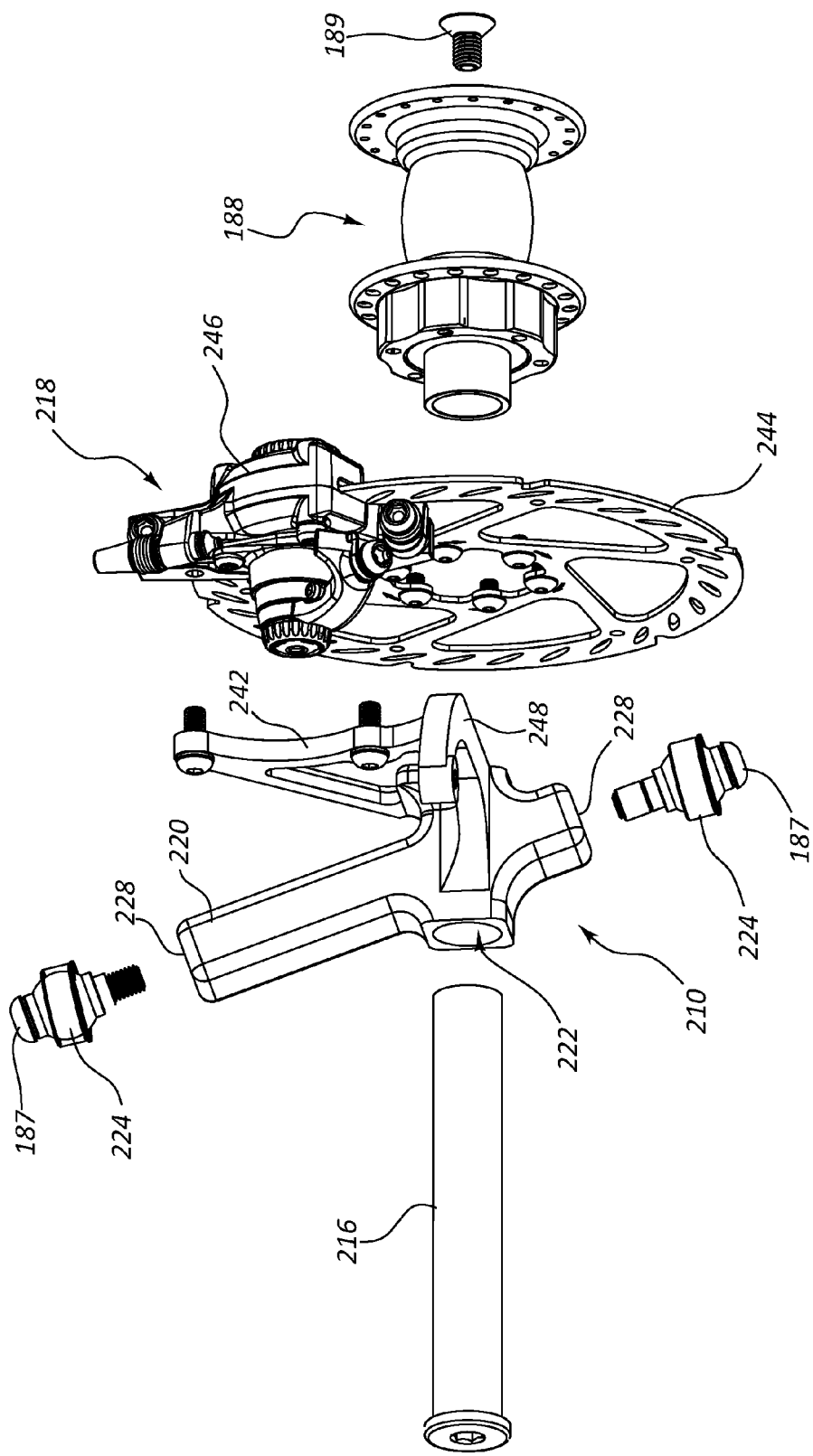
FIGS. 39-40 show front and rear exploded perspective views of how the kingpin assembly, brake, axle, and hub are coupled together to form the left front wheel assembly.
Figure 40:
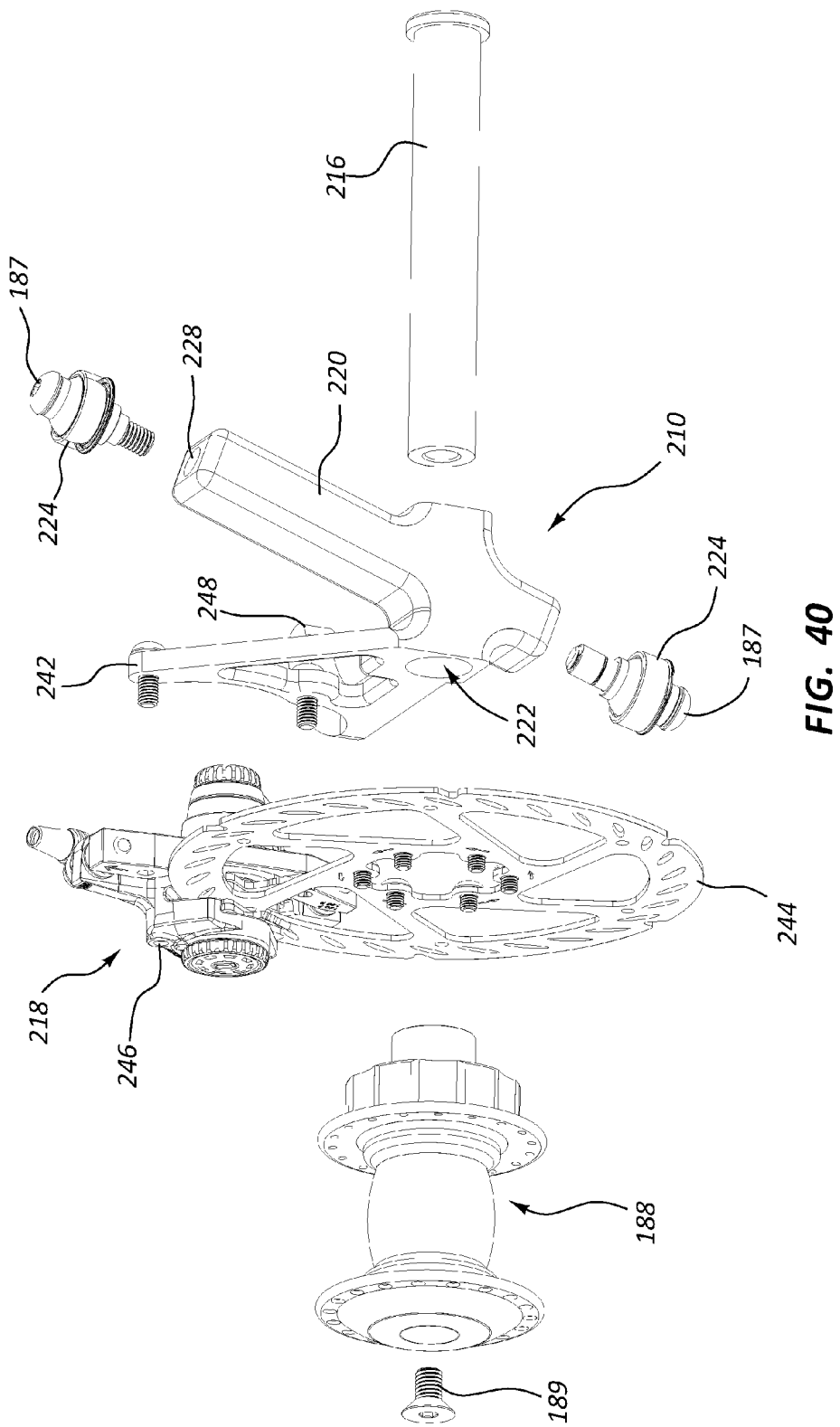

Each arm 200, 202, includes a main plate 206, the inner end of which is coupled to the support brackets 201, 203, respectively, and an outer end which is coupled to the kingpin assemblies 210 (FIGS. 39-40). It should be appreciated that although the main plate 206 is shown as a single integral component, it could be configured to include multiple components coupled together. For example, each arm 200, 202 could include a main plate and an extension plate coupled together using fasteners such as bolts and nuts.

Referring to FIGS. 32-35, a pair of kingpin assemblies 210 are coupled to the arms 200, 202. The kingpin assemblies 210 facilitate coupling the front wheels 212 to the arms 200, 202 by accommodating a wheel axle 216. Additionally, each kingpin assembly 210 provides a structure for supporting or to which can be coupled a disc brake assembly 218. The kingpin assembly 210 has a specific angular orientation relative to the center of each tire 214 of each wheel 212 due to the difference in length between the upper arms 200 and the lower arms 202.

The angular orientation of the kingpin assembly 210 makes it easy to steer the tadpole tricycle 8. The longitudinal axis of each kingpin assembly 210 points downward to where the center of the tire 214 contacts the ground, thereby causing the tires 214 to turn on a small contact point and decreasing the steering system's sensitivity to bumps in the road. Bump sensitivity can also be changed by optionally inclining each kingpin assembly 210 relative to the tadpole tricycle's 8 forward direction of travel, i.e., each kingpin assembly 210 is inclined away from the tadpole tricycle's 8 forward direction of travel.

It should be appreciated that the kingpin assemblies 210 may have any suitable inclination angle. In one embodiment, the angular inclination of the kingpin assemblies 210 is about 12 degrees. An angular inclination of about 12 degrees results in the wheels 212 returning to the straight-ahead position in the absence of steering input and allows the rider to lean into a corner during a turn. Additionally, such an inclination dampens the forward and backward rocking motion of the tadpole tricycle 8 that may occur after the rider engages the brakes 109, 218.

In addition to varying the angular orientation of each kingpin assembly 210 to which the wheels 212 are coupled, it is possible to incline the wheels 212 relative to each kingpin assembly 210. Stated another way, the wheels 212 can be coupled to each kingpin assembly 210 to have a neutral, positive, or negative camber depending upon the amount of slippage prevention required and the steering desired. In one embodiment, the front wheels 212 point slightly inward to aid with lateral stability.

FIGS. 39-40 shows the kingpin assembly 210 from the left front wheel in greater detail. The following discussion is directed towards the specific kingpin assembly 210 shown in FIGS. 39-40, however, a similar discussion also applies to the other kingpin assembly 210.

The kingpin assembly 210 includes a body 220 having a hole 222 that extends through the body 220 at an angle. The orientation of the body 220 and the hole 222 arises due to the different lengths of the arms 200, 202 (FIGS. 32-35). When coupled to the arms 200, 202, the kingpin assembly 210 extends upward at an angle but the wheel axle 216 (FIGS. 32-35) is generally horizontal. Varying the length of the arms 200, 202 (FIGS. 32-35) and/or the orientation of the hole 222 relative to the body 220, changes the camber of the wheels 212, i.e., neutral, positive, or negative camber, and thus changes the riding and handling characteristics of tadpole tricycle 8 (FIGS. 1-4).

The body 220 is positioned between and maintains a desired separation of the upper arms 200 and the lower arms 202. The top and bottom of the body 220 each include a hole 228, optionally threaded, which receives a mechanical fastener 187 to attach each kingpin assembly 210 to the arms 200, 202.

Various configurations of the hole 228 and fastener 187 are possible. In one embodiment, the arms 200, 202 are coupled to the body using an articulating joint 224 such as a rod end bearing or heim joint. The articulating joint 224 includes a ball swivel with an opening through which the fastener 187 can pass. The fastener 187 may be a bolt that is received by the hole 228 in the body 220.

The kingpin assembly 210 includes a steering arm 248 that extends from the body 220 and cooperates with the steering assembly 18 (FIGS. 1-4) so that movement of the steering assembly 18 translates to movement of the kingpin assemblies 210 and, consequently, the wheels 212 (FIGS. 32-35).

In the embodiment shown in FIGS. 39-40, the steering arm 248 is an integral part of the kingpin assembly 210. However, it should be appreciated that the steering arm 248 may be a separate component that is coupled to the remainder of the kingpin assembly 210 in any suitable way. Also, the steering arm 248 may be coupled to the steering assembly 18 in any suitable manner including with an articulating joint such as the one used to couple the arms 200, 202 to the body 220.

The hole 222 extends through the kingpin assembly 210 and is configured to receive the wheel axle 216. The hole 222 may have any suitable configuration so long as it can receive and support the wheel axle 216 (FIGS. 32-35). The wheel axle 216 and wheel hub 188 can be coupled to the kingpin assembly 210 using conventional techniques common to bicycles. In one embodiment, the wheel axle 216 has a head on one end and the other end is secured to the wheel hub 188 with a fastener 189 (e.g., bolt) as shown in FIGS. 39-40.

The kingpin assembly 210 includes a mounting flange 242 that is configured to support the disc brake assembly 218. The mounting flange 242 can have various configurations so long as it is capable of supporting the disc brake assembly 218. The disc brake assembly 218 can include a disc 244 and a caliper 246. The caliper 246 may be operated by wire controls typically used with bicycles and which are mounted to a portion of the steering assembly 18 (FIGS. 1-4). Any suitable disc brake assembly 218 may be used. Various types of bicycle levers, shifters, and controller can be used to operate the disc brake assembly 218.

Returning to FIGS. 32-36, the suspension system 198 includes a shock absorbers 234 to smooth out or damp shock forces produced by uneven and bumpy riding surfaces. The top of each shock absorber 234 is coupled to the pivot 209 on which the upper arm 200 pivots. Since the position of the pivot 209 is fixed, the top of the shock absorber 234 is also fixed.

The bottom of each shock absorber 234 is coupled to the main plate 206 of the lower arm 202 about ⅓ of the distance from the pivot 213 to the outer end of the extension plate 208. The bottom of the shock absorber 234 is coupled to the lower arm 202 in a manner that allows the shock absorber 234 to pivot when the lower arm 202 moves up and down. In one embodiment, the lower arm 202 and the bottom of the shock absorber 234 both include mounting holes that when aligned can receive a bolt or pin 239 (FIG. 36).

It should be appreciated that any suitable shock absorber 234 may be used. In one embodiment, the shock absorber 234 is an off-the-shelf shock such as any of those available from Cane Creek, DT Swiss, and the like. The shock absorber 234 can be biased pneumatically, hydraulically, and/or by a spring. Preferably, the stiffness of the shock absorber 234 is adjustable as desired to suit different riders and terrain.

Turning to FIGS. 33-35 and 41-44, the suspension system 198 also includes a sway bar assembly 250, which is provided to increase the tadpole tricycle's 8 resistance to body roll motion when turning. The resistance to roll is independent of the suspension's spring rate in the vertical direction. The sway bar assembly 250 enhances the handling and maneuverability of the tadpole tricycle 8.

The sway bar assembly 250 includes a sway bar 252 that is coupled to the frame assembly 10 at two points and to the left and right sides of the suspension. The sway bar is coupled to the frame assembly 10 by way of the mounting bracket 254. The sway bar 252 passes through openings in each end of the mounting bracket 254 and is held in place by clamps 256. The clamps 256 prevent the sway bar 252 from moving back and forth through the openings in the ends of the mounting bracket 254. Grommets made of resilient material are positioned in the openings in the mounting bracket 254 to cushion movement between the sway bar 252 and the mounting bracket 254.

Figure 33:
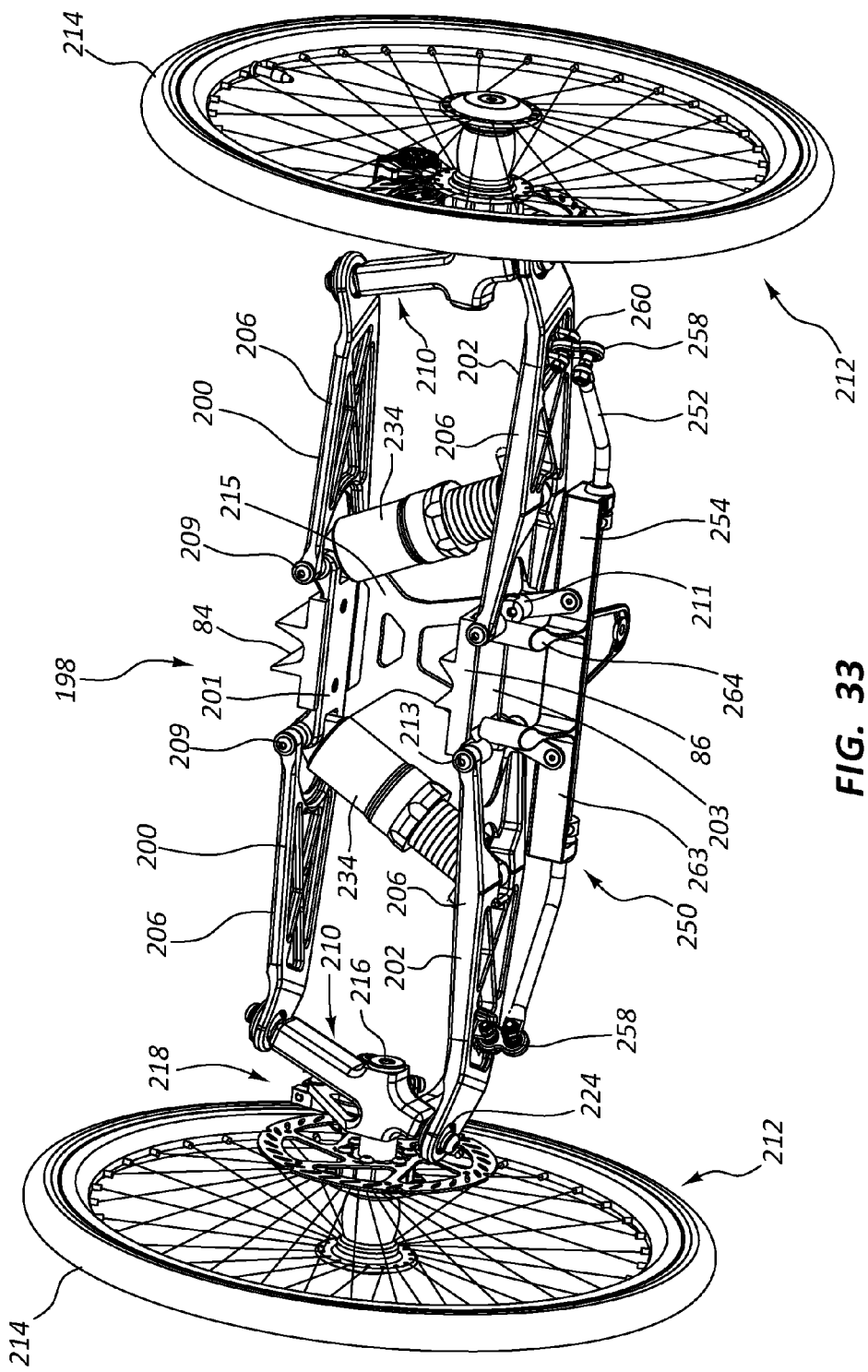

The distal ends of the sway bar 252 are coupled to the underside of the lower arms 202 using an articulating linkage 258. As shown in FIGS. 33 and 35, a bracket 260 is coupled to and extends downward from the underside of the lower arms 202. The bracket 260 includes a pin or bolt that extends through the upper hole 262 in the articulating linkage 258.

The sway bar assembly 250 works as follows. If both of the wheels 212 move up and down together, then the sway bar 252 rotates around its mounting points, i.e., the ends of the mounting bracket 254. If one of the wheels moves relative to the other—e.g., one wheel 212 dives when cornering—then the sway bar 252 is subjected to torsion and forced to twist. The sway bar 252 resists this motion through its stiffness, thus preventing or reducing body roll.

Figure 43:
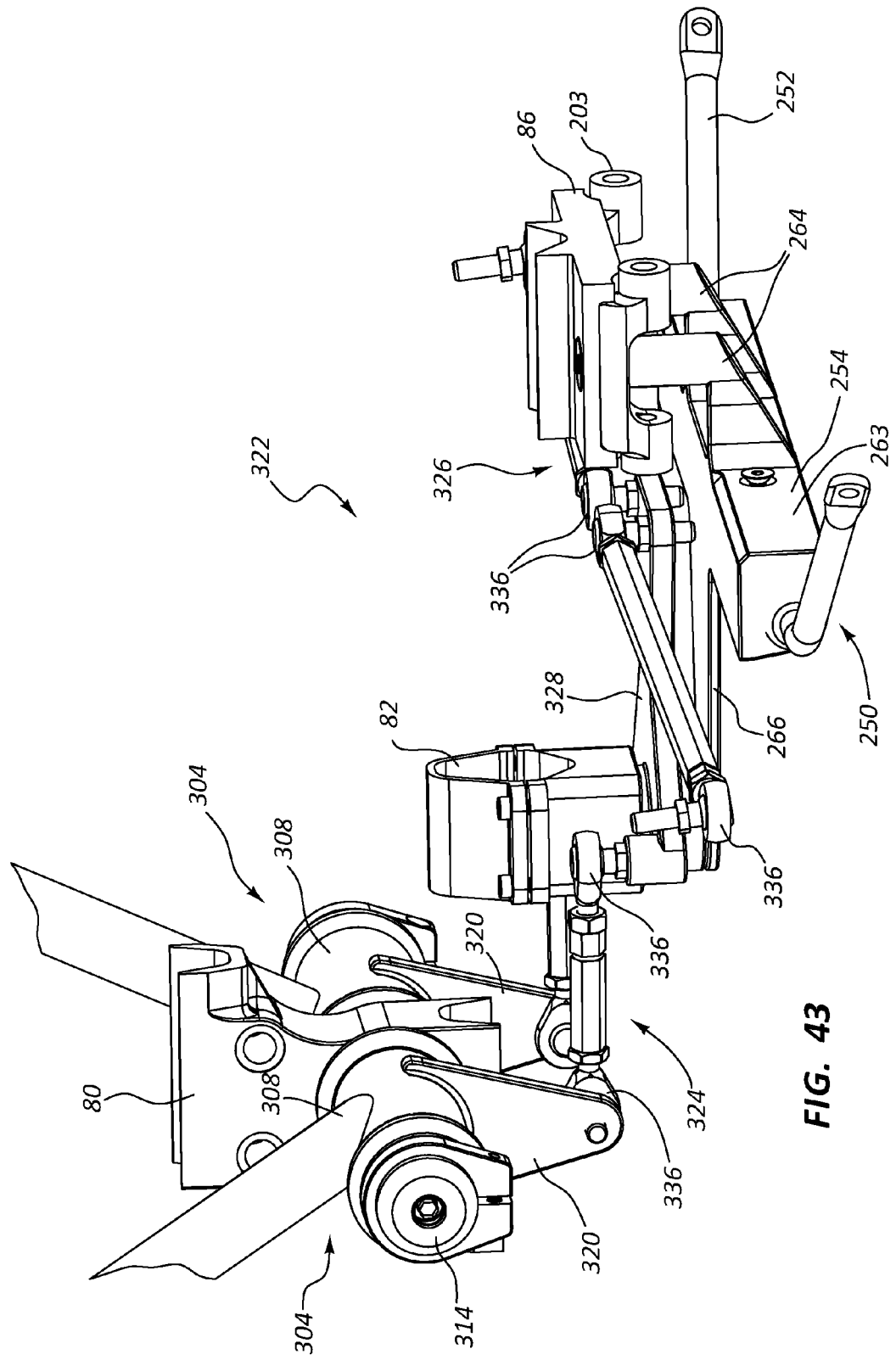
Figure 44:
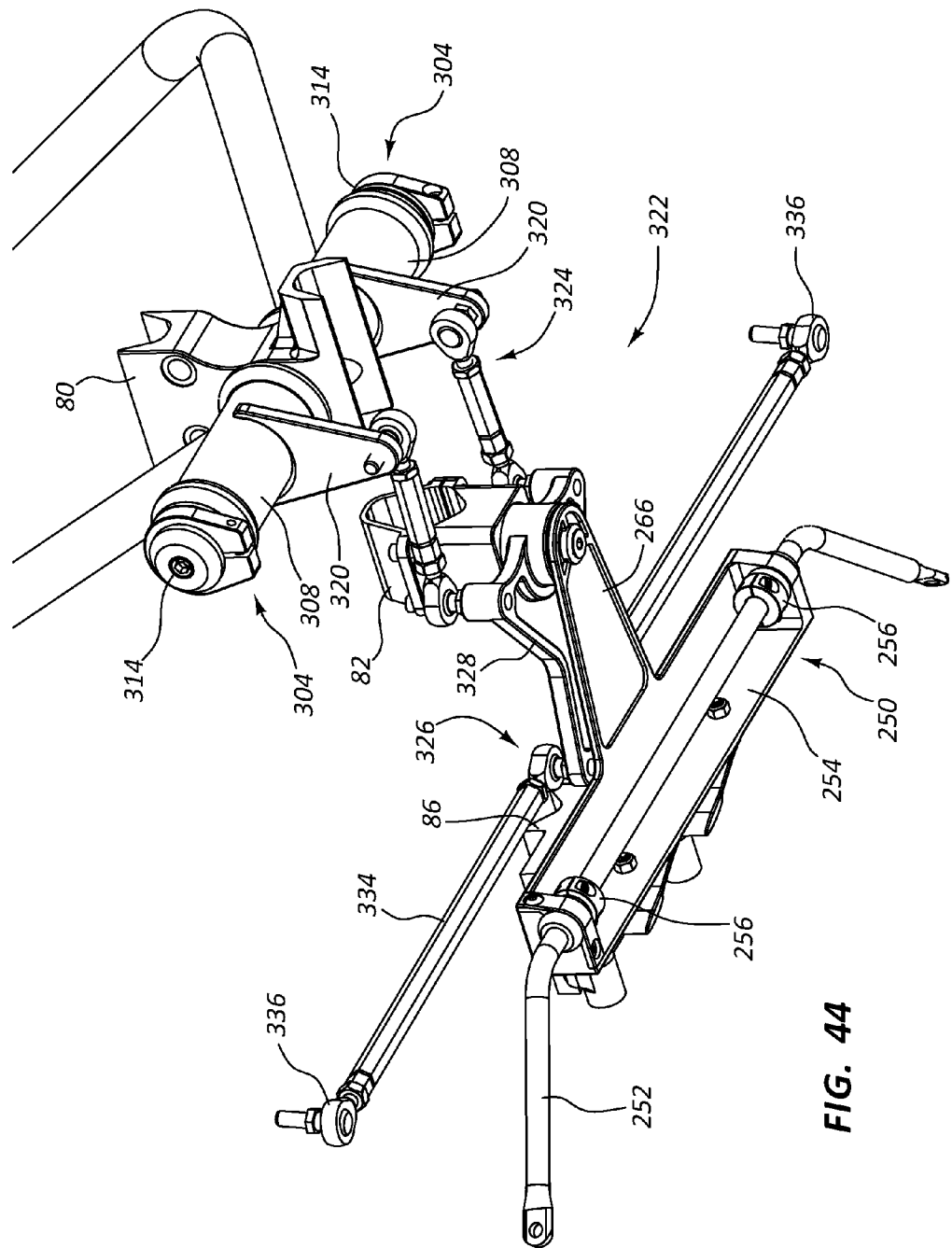
FIG. 44 shows a bottom perspective view of the steering assembly shown in FIG. 41 and the sway bar assembly of the front wheel assembly shown in FIGS. 32-35.

Turning to FIGS. 33 and 43, the mounting bracket 254 is coupled to the frame assembly 10 by way of the support bracket 203 and the support brace 215. The support brace 215 extends downward below the support bracket 203 and is coupled to the back 263 of the mounting bracket 254. The back 263 of the mounting bracket 254 is also coupled to the support bracket 203 by way of the supports 264.

Figure 45:
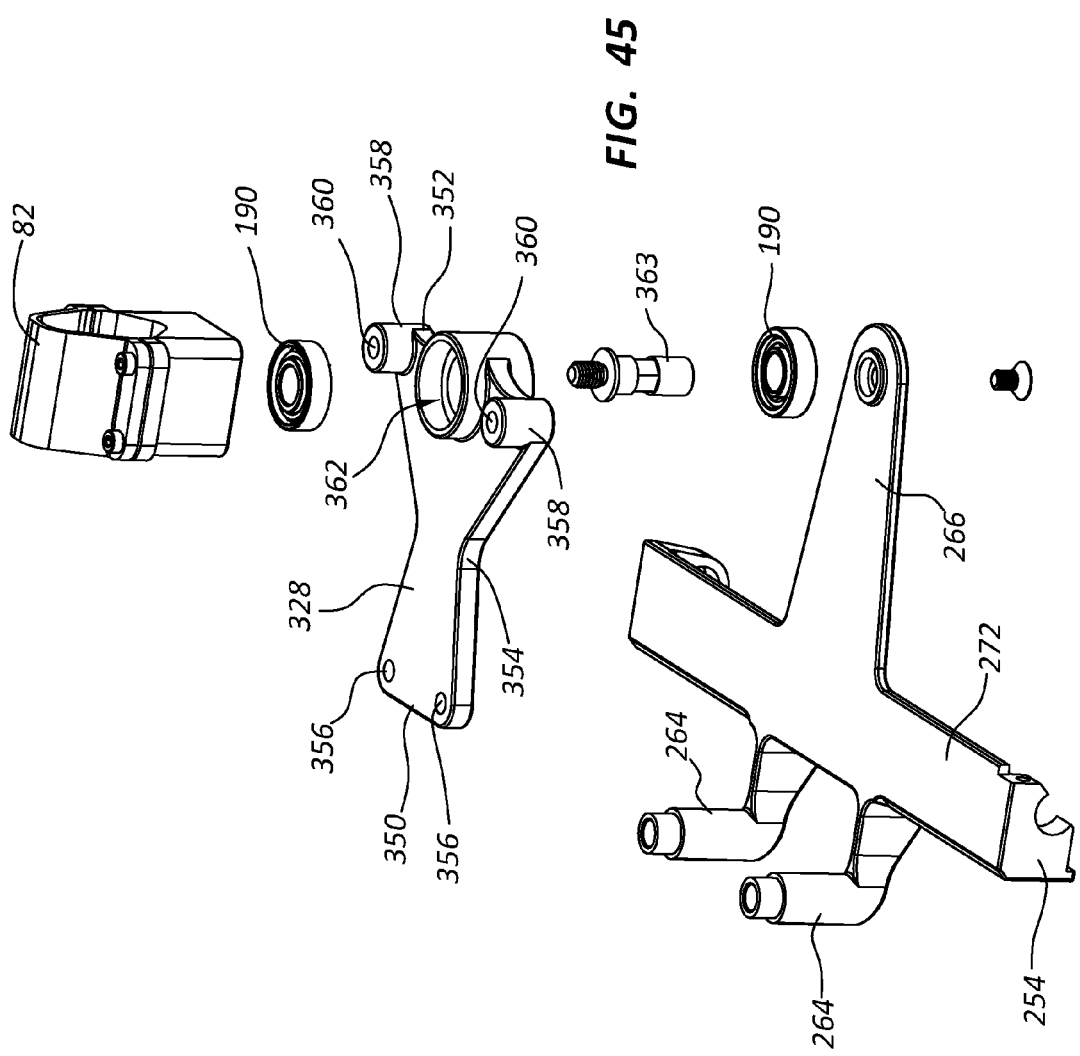
FIG. 45 shows an exploded perspective view of the steering pivot assembly of the steering assembly shown in FIG. 41.

The fasteners 181 extend downward through holes in the attachment member 86, the support bracket 203, and into the supports 264. The fasteners 181, which may be bolts or the like, are tightened to hold all of these components together as shown in FIG. 43. The top 272 of the mounting bracket 254 extends outward and forms a steering support plate 266 as shown in FIG. 45.

A steering assembly 18 is provided to control movement of the front wheel assembly 16 (FIGS. 1-4) and thereby control movement of the tadpole tricycle 8. The frame assembly 10 supports the steering assembly 18 and provides attachment structures or members to facilitate mounting of the steering assembly 18. For example, the frame assembly 10 includes an attachment member 80 and an attachment tube 88 disposed transversely through an opening in the attachment member 80 (FIG. 5).

FIG. 41 shows one embodiment of the steering assembly 18. Generally, the steering assembly 18 provides steering handles that are located to the sides of the seat 150. The rider can access the seat 150 from the front without interference from the handles since they are off to the side and nothing is directly in front of the seat 150 that would hamper access. The curvature of the handles, in addition to adding aesthetic appeal, provides clearance for the wheels to turn. It can also provide a convenient armrest for the rider, aid the rider when lifting himself/herself out of the seat, and a secure support that can be gripped during a tight turn.

The rider turns the tadpole tricycle 8 using the steering assembly 18 by moving one handle forward and the other handle backward. For example, the rider extends his left arm forward and his right arm backward to turn left; and vice versa to turn right. This motion is transferred to the motion of the wheels using a linkage system. The linkages are selected so that the steering assembly 18 also utilizes the benefits of Ackerman steering, i.e., the inside wheel turns more sharply than the outside wheel during a turn.

This type of steering also allows the rider to lock the orientation of the wheels in the direction of travel by holding or moving both handles together and not moving one forward or rearward of the other. This is useful when dismounting the tadpole tricycle 8 or obtaining leverage to apply greater force to the transmission assembly 20 (FIG. 1). When stationary, pulling back on the arms aids the rider to exit the seat. When moving, pulling back on the arms aids the rider to apply a greater force to transmission assembly 20 (FIG. 1), such as may be needed when traveling up an incline. It also allows the rider to shift his or her body weight to apply a greater amount of weight to the front wheels during hill climbing.

In addition to the above, the controls can be used to control the amount a rider leans when cornering or turning. As discussed above, the seat can flex to enable the rider to lean into a corner. The amount of lean can be controlled by pulling or pushing on the handles. This allows a rider to eliminate many of the problems associated with riding existing recumbent tricycles.

With continued reference to FIG. 41, the steering assembly 18 includes handles 300, with the left handle being a mirror image of right handle. Each handle 300 includes a first end 302 and a second end 304. The handles 300 have a generally bent upright configuration with a hand grip portion 306 at the first end 302 for the rider to grasp, and a headset mount 308 at the second end 304. The handles 300 can support various hand controls near the first end 302. For example, hand controls such as brake levers, grip shifters, thumb shifters, road-bicycle shifters, and the like may be positioned near the first end 302.

Figure 46:
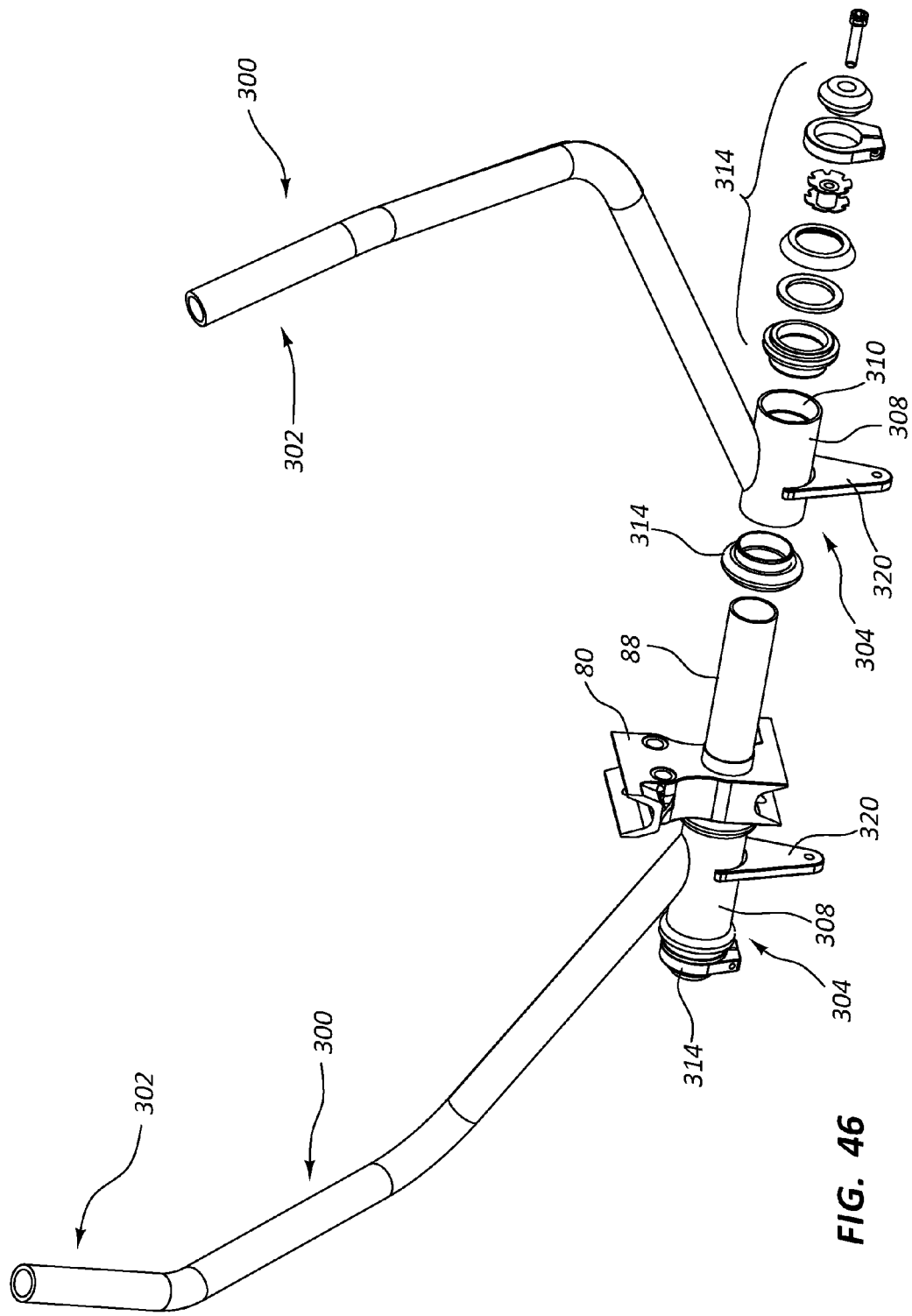
FIG. 46 shows a partially exploded perspective view of how the handles are pivotably coupled to the frame assembly shown in FIG. 5.

Turning to FIG. 46, the headset mount 308 can have a generally cylindrical configuration with a hole 310 disposed therethrough. The hole 310 is configured to receive a headset 314 that in turn receives the attachment tube 88 (FIG. 5). The headset 314 (also referred to as a bearing assembly) is coupled to and can rotate around the attachment tube 88 (FIG. 5) to allow the backward and forward motion of the handles 300.

The headset 314 can be a sealed, nonadjustable headset or an adjustable headset with associated optional bearing, bearing cup or cone, adjustable bearing cup or cone, and lock nut. Any suitable headset can be used as long as the handles 300 can rotate. It should be appreciated that the headset 314 can be an off-the-shelf item to ease the difficulty of repairing the tadpole tricycle 8.

A lever arm 320 is coupled to the headset mount 308 and connects to a linkage assembly 322 so that rotational movement of the handles 300 translates to movement of the linkages 324, 326 and hence movement of the wheels 212 (FIGS. 1-4). The lever arm 320 includes a generally polygonal configuration with a hole that receives a portion of the linkage 324. The hole can optionally include threads to provide a secure coupling to the linkage assembly 322.

In another configuration, the linkage assembly 322 may connect to the lever arm 320 by way of a slip fit, friction fit, or interference fit connection. In still another configuration, the linkage assembly 322 may be coupled to the headset 308 by welding, thermal bonding, chemical bonding, or using other suitable techniques.

The linkage assembly 322 includes a number of linkages 324, 326 that are separated by a steering pivot 328. Each linkage 324, 326 includes a rod 334 and one or more ball joints 336. In the illustrated configuration, the linkage 324 extends from the lever arm 320 to the steering pivot 328 and the linkage 326 extends from the steering pivot 328 to the kingpin assembly 210 (FIGS. 32-35 and 39-40).

The ball joints 336 allow rotational movement of the handles 300 around the longitudinal axis of the headset 314 to be translated into lateral motion of the linkage 324. The lateral motion of the linkage 324 is translated into rotational motion of the steering pivot 328 around an axis perpendicular to the longitudinal axis of the headset 314. The rotational motion of the steering pivot 328 is translated back into lateral motion of the linkage 326, which turns the wheels 212 (FIGS. 1-4).

The configuration of the steering pivot 328 helps translate the lateral motion of the linkage 324 into the desired movement of the linkage 326 so that the inside wheel of the tadpole tricycle 8 (FIGS. 1-4) turns more sharply than the outside wheel, i.e., to provide Ackerman steering. The steering pivot 328 is coupled to the lower tubular member 34 using an attachment member 82 (FIG. 43), which includes a clamp that surrounds and couples to the lower tubular member 34. The top portion of the clamp can be removed from the remainder of the clamp using fasteners and then put back in place once it is in position around the lower tubular member 34. The steering pivot 328 is also supported by the steering support plate 266, which is coupled to the frame assembly 10.

Turning to FIG. 45, the steering pivot 328 includes a first end 350, a second end 352, and an intermediate portion 354. Holes 356 are positioned at the first end 350 and cooperate with the ball joints 336 (FIGS. 43-44) of the linkage 326 so that the linkage 326 can be attached to the first end 350. One or more fasteners, such as but not limited to, nuts, can be used to releasably couple the ball joints 336, which can have a threaded portion, to the first end 350. Other fasteners or techniques for mounting the ball joint 336 to the first end 350 are possible. For example, and not by way of limitation, a split pin may be disposed through a hole in a portion of the ball joint 336.

The steering pivot 328 tapers from the first end 350 to the intermediate portion 354 and then flares back out and terminates at tip portions 358 at the second end 352. The tip portions 358 includes holes 360 that cooperate with the ball joints 336 of the linkage 324. The linkage 324 can be coupled to the holes 360 in a similar manner as the linkage 326 is coupled to the holes 356.

A pivot hole 362 and corresponding pivot shaft 363 are positioned between the holes 360 at the second end 352. The pivot shaft 363 cooperates with bearings 190 positioned above and below the pivot shaft 363 to allow the steering pivot 328 to rotate relative to the attachment member 82 and the steering support plate 266. The steering pivot 328 rotates in unison with and on the axis of the pivot shaft 363.

The holes 356 are farther away from the axis of rotation, i.e., the pivot shaft 363, than the holes 360. This means that rotational movement of the second end 352 of the steering pivot 328 produces a proportionally greater amount of movement at the first end 350 of the steering pivot 328 than at the second end 352. This also means that rotational movement of the linkage 324, which moves with the second end 352, produces proportionally greater movement of the linkage 326, which moves with the first end 350.

Another feature of this configuration is that rotational movement of the second end 352 around the longitudinal axis provided by the pivot shaft 363 results in greater movement of one of the rods 334 in the linkage 326 relative to the other rod 334 due to the rotational motion of the holes 356.

Referring back to FIGS. 42-43, when the linkage 324 that is coupled to the left handle 300, for example, is moved forward, the relative movement of the rod 334 that is part of the linkage 326 and is coupled to the left wheel 212 is less than the movement of the rod 334 that is part of the linkage 326 and is coupled to the right wheel 212 resulting in the right wheel 212 moving more sharply than the left wheel 212. The reverse is also true for movement of right handle 300.

The components and structures described thus far focus on steering the tadpole tricycle 8 and providing a comfortable ride for the rider. In the following, the transmission assembly 20 is described in greater detail. The transmission assembly 20 includes the components and structures that enable a rider to translate movement of the rider's legs or movement of a secondary power source into movement of the tadpole tricycle 8.

Turning to FIG. 47, the transmission assembly 20 is used to transfer energy from the rider and/or the secondary power source to the rear wheel 104. In general, power from pedaling is input into a front transmission assembly 372 and transferred to a rear transmission assembly 29 using a first flexible drive member. Power provided from the secondary power source is input into the rear transmission assembly 29 as described above in connection with the frame assembly 10. Power is transferred from the rear transmission assembly 29 to the rear wheel gear ring 108 and on to the rear wheel 104 using a second flexible drive member. The power transfer can be accomplished using a number of configurations.

In the embodiment shown in the Figs., the transmission assembly 20 uses a chain system to transfer power from the front transmission assembly 372 to the rear transmission assembly 29 and a toothed belt to transfer power from the rear transmission assembly 29 to the rear wheel 104. In an alternative embodiment, two interconnected chain systems can be used to transfer power. One chain system is used to transfer power from the front transmission assembly 372 to the rear transmission assembly 29 and another chain system is used to transfer power from the rear transmission assembly 29 to the rear wheel 104. In yet another embodiment, two interconnected toothed belt systems can be used to transfer power to the rear wheel 104.

FIGS. 48-49 show one embodiment of the front transmission assembly 372. It includes pedals 388 coupled to a pair of crank arms 386, which is coupled to a front axle 385. The front axle 385, the crank arms 386, and the pedals 388 can be off-the-shelf components to make it easy to repair and upgrade. In other words, the front transmission assembly 372 can include an off-the-shelf crankset commonly used in cycling.

The front axle 385 has a first end 390 and a second end 391. Each of the ends have a splined configuration that is complementary to the crank arms 386 so that when they are coupled together they move in unison. Force applied to the crank arms 386 causes the front axle 385 to rotate.

A crankset gear ring 396 is positioned between the first end 390 and the second end 392 of the front axle 385 and drives movement of the chain. The crankset gear ring 396 is part of a crankset that can allow the single gear ring 396 to rotate at multiple speeds relative to the pedals 388. The crankset includes an adjustable planetary gear mechanism that makes this possible. For example, at one speed, everything is locked and spins together so that every rotation of the pedals 388 results in one rotation of the gear ring 396. At another speed, the ratio is increased so that every rotation of the pedals 388 results in more than one rotation of the gear ring 396.

In one embodiment, the ratio of the rotation between the pedals 388 and the gear ring 396 is approximately 1:0.7 to 1:2 and preferably approximately 1:1 to 1:1.6. When the ratio is 1:1, the gear ring 396 is the equivalent of a 22 tooth bicycle chain sprocket. The rider can change the speed using a switch, lever or the like located on the handles 300. An example of a suitable crankset that may be used in the front transmission assembly 372 to achieve this is the Truvativ HammerSchmidt Crankset available from SRAM LLC, in Chicago, Ill.

It should be appreciated that the gear ring 396 can have any suitable configuration. In another embodiment, the gear ring 396 includes a single gear ring (also referred to as a toothed wheel) that rotates at a speed that is the same as the rotational speed of the pedals 388 and crank arms 386. In this embodiment, the front transmission assembly 372 has a single speed.

In another embodiment, the front transmission assembly 372 includes two or three gear rings having different sizes. The rider can shift between the different gear rings using a conventional derailleur. In this embodiment, the front transmission assembly 372 can operate at different speeds depending on the size of the gear ring selected.

With continued reference to FIGS. 47-49, the front transmission assembly 372 includes a transmission case 400 that supports the front axle 385. The transmission case 400 includes a right cover plate 402 (also referred to as a first half), a left cover plate 403 (also referred to as a second half), a front cover plate 416, and a rear cover plate 432. The cover plates 402, 403, 416, 432 can be coupled to the tubular members 34 and the front axle 385 at different longitudinal positions along the length of tubular members 34. This allows a rider to vary the stride length of the tadpole tricycle 8 to accommodate riders having different leg lengths.

The top and bottom of each cover plate 402, 403 of the transmission case 400 includes a groove 410. The grooves 410 are configured to engage with a portion of the tubular members 34 to prevent longitudinal movement of the transmission case 400 during use. The cover plates 402, 403 also include an axle hole 412 that is configured to support bearings 413 which in turn support the front axle 385. The bearings 413 can be ball bearings, spherical bearings or some other type of bearing that is capable of supporting the front axle 385 and reducing the effects of friction as the front axle 385 rotates. The axle hole 412 may also include a flange to hold the bearings 413 in place.

The cover plates 402, 403, 416, 432 can be coupled together in any suitable manner. For example, each cover plate 402, 403 includes holes 418 configured to receive a fastener 417. When the cover plates 402, 403 are positioned opposite each other and aligned, the fastener 417 passes through the holes 418 to couple the cover plates 402, 403 together. In this example, the fastener 417 may be a bolt of other similar device. It should be appreciated that the holes 418 on one half may be threaded to receive a threaded end of the fastener 417. It may also be suitable for none of the holes 418 to be threaded so that the fastener 417 includes both a bolt and a corresponding nut.

The cover plates 416, 432 are configured to cover the recessed portions 43 in the tubular members 40 and are not necessarily intended to provide structural support. It is desirable to cover the recessed portions 43 to prevent water from entering and running down the tubular members to the rear transmission assembly 29. The cover plates 402, 403, 416, 432 can be made of any suitable material such as metal or plastic.

Each cover plate 402, 403 also includes holes 419 and corresponding fasteners 421 that are used to couple the transmission case 400 to the cover plates 416, 432. The fasteners 421 extend through the holes 419 and engage holes 423 provided in the support structure on the internal side of the cover plates 416, 432. This provides additional stability and structural strength to the front transmission case 400.

The front transmission 372 also includes a tension device 430 coupled to the front of the cover plates 402, 403 of the transmission case 400. The tension device 430 includes a tension bolt 440. The tension bolt 440 passes through the hole 27 in the nose member 22 and hole 24 in the nose plate 31. The tension bolt 440 is a T-bolt and the T-shaped end is big enough to engage the edges 680 of the cover plates 402, 403. The tension bolt 440 is used to make incremental changes to the tension of the flexible drive member 378.

For example, the tension bolt 440 can be used to move the transmission case 400 longitudinally along the tubular members 34 until the flexible drive member 378 reaches the desired tension. It should be appreciated that the cover plates 402, 403 should be loosened before moving the transmission case 400 and tightened afterwards.

The length of the flexible drive member 378 (e.g., roller chain) can be adjusted to position the front transmission assembly 372 the desired distance from the seat 150 depending on the size of the rider. Once the length of the flexible drive member 378 has been set but before the transmission case 400 has been clamped tightly to the tubular members 34, the tensioner bolt 440 can be rotated to move the transmission case 400 and set the appropriate tension on the chain 378.

Since the head of the tensioner bolt 440 cannot pass through the hole 27 in the nose member 22, rotating the tensioner bolt 440 in one direction draws the transmission case 400 towards the nose member 22. Similarly, rotating the tensioner bolt 440 in the other direction allows the transmission case 400 to move away from the nose member 22. In this manner, incremental changes in the tension of the flexible drive member 378 can be made.

Referring to FIG. 50, the transmission assembly 20 includes a first drive system 370 that transfers power from the front transmission assembly 372 to the rear transmission assembly 29, and a second drive system 376 that transfers power from the rear transmission assembly 29 to the rear wheel gear ring 108 and on to the rear wheel 104 (FIG. 17). In this embodiment, the flexible drive member 378 is a chain and the flexible drive member 380 is a toothed belt.

The configuration of the rear transmission assembly 29 has already been described extensively above in connection with the frame assembly 10. One thing that should be noted here, however, is that the rear transmission assembly 29 includes a rear gear ring 444 (also referred to as a toothed wheel) coupled to the rear axle 384. In this embodiment, the rear gear ring 444 is configured to engage a toothed belt. The rear gear 444 can be any of those supplied by Gates Corporation in Denver, Colo.

In another embodiment, the rear gear ring 444 can have a similar configuration to standard gear rings used with conventional bicycles. For instance, the rear gear ring 444 can include one or more individual gear rings that can be used to provide different gear ratios. In another embodiment, the rear gear ring 444 can also be replaced with planetary gear system such as the one described in connection with the front transmission assembly 372. A chain or toothed belt can be used with the planetary gear system.

The rear wheel gear ring 108 can also have any suitable configuration. In the embodiment shown in FIG. 50, the rear wheel gear ring 108 includes a single gear ring that is configured to engage a toothed belt. Since the toothed belt is not wrapped around a tensioner, it cannot move from one size of toothed wheel to a different size like a chain. The rear wheel gear ring 108 can be any of those supplied by Gates Corporation in Denver, Colo.

In another embodiment, the rear wheel gear ring 108 can be any of those that are standard for conventional chain driven bicycles (e.g., anything from 11 to 36 tooth sprockets including cassettes that include these sprockets). In one embodiment, the rear gear ring 444 includes three chainrings (22-33-44 tooth) and the rear cassette includes 7 sprockets (14-16-18-21-24-28-32 tooth).

It should be appreciated that the second drive system 376 can use "off-the-shelf" components to simplify repair and increase usability of the tadpole tricycle 8. For instance, the distance between the rear wheel gear ring 108 and the rear gear ring 444 can be similar to a standard distance so that the flexible drive member 380 can be of a standard length.

In an alternative embodiment, the rear wheel gear ring 108 can be replaced by an internal gearing system where the gears are hidden in the wheel hub. The internal gearing system is typically used with a single rear wheel gear ring 108 like that shown in FIG. 50. It can have any suitable system of gears to alter the speed of the rear wheel relative to the speed of the rear wheel gear ring 108 including planetary or epicyclic gearing. The speed of the internal gearing system can be controlled using a shifter operated by the rider.

In one embodiment, the internal gearing system is a continuously variable planetary hub. Since it is continuously variable there are no fixed gear ratios and no upper limit on the gear ratio (theoretical limit is infinite). Also, it uses a set of rotating and tilting balls positioned between the input and output components to vary the speed of the tadpole tricycle 8. The rider can control the drive ratio of the hub using a rotatable hand grip, lever, or the like. An example of a suitable device is the NuVinci N360 hub available from Fallbrook Technologies in San Diego, Calif. It should be appreciated that the rear gear ring 444, the rear gear ring 760, and/or the secondary gear ring 762 in the rear transmission assembly 29 can also be replaced with an internal gearing system.

A preferred embodiment uses the planetary gear crankset in the front transmission assembly 372, a single rear gear ring 444 configured to engage a toothed belt, and a single rear wheel gear ring 108 coupled to continuously variable planetary rear hub. This configuration provides a wide variation of gear ratios to allow the rider to cover a wide variety of terrain. The rider can navigate up steep inclines with the lower gear ratios and traverse long, flat stretches with the higher gear ratios.

As mentioned above, the flexible drive members 378, 380 can be chains, toothed belts, or any other suitable material. Chain drives are the most economical way to transmit power. They also convey the greatest percentage of input power. This is why chain drives are by far the most popular drive mechanism for cycles in the world. On the other hand, chains require the most maintenance, are dirty, and not as smooth as a toothed belt drive. Toothed belts require less frequent adjustments than a chain and last longer so the required maintenance is reduced. Belt drives are cleaner since there is no chain lube flying around to mess up the cycle or the rider's clothes.

In one embodiment, the flexible drive member 380 is a toothed belt. Examples of suitable toothed belts include the Carbon Drive line of belts available from Gates Corporation in Denver, Colo. Any of the internal hubs, etc., described above can be used as part of the toothed belt drive system.

Figure 51:
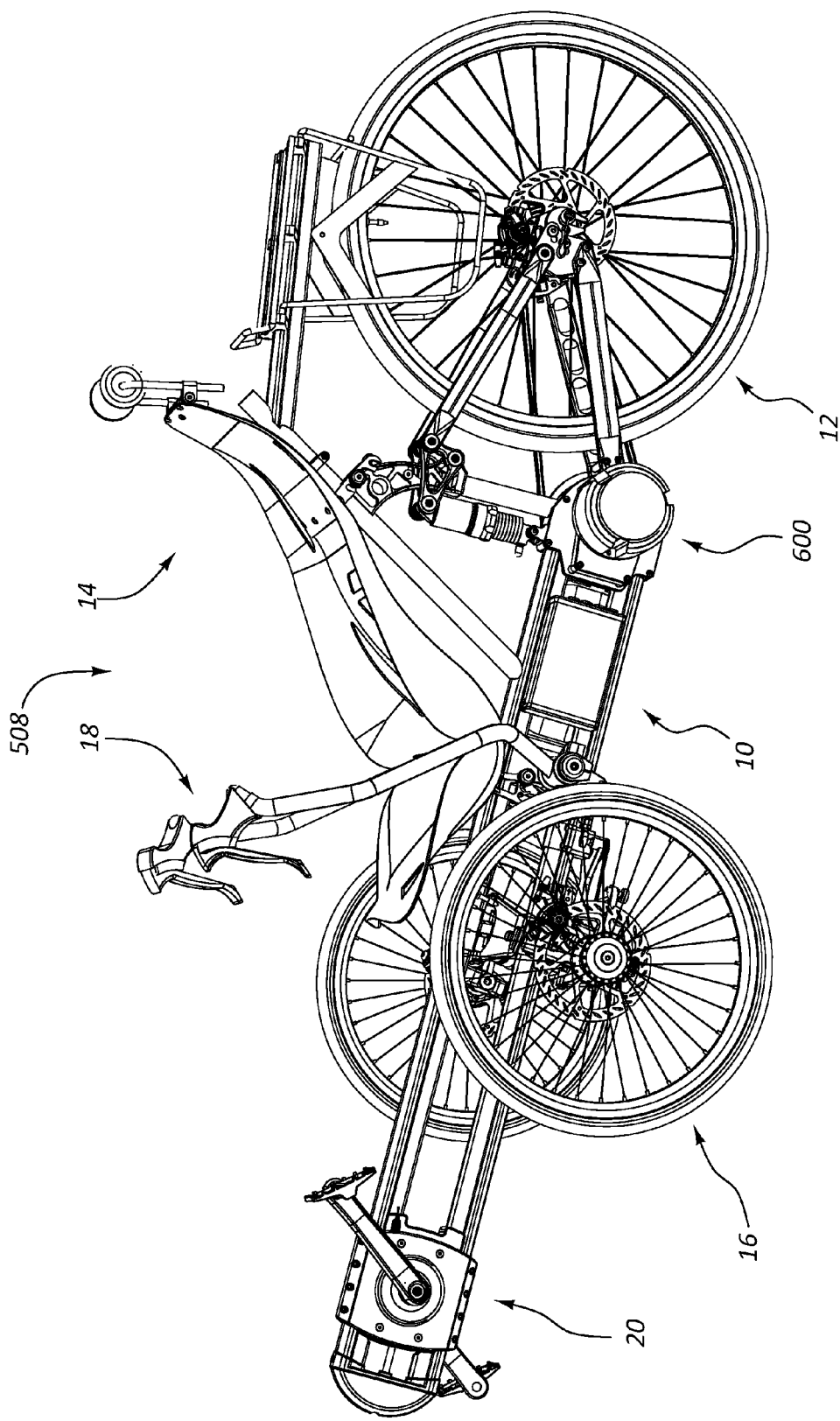
FIGS. 51-52 show perspective views of an electric powered tadpole tricycle.
Figure 52:
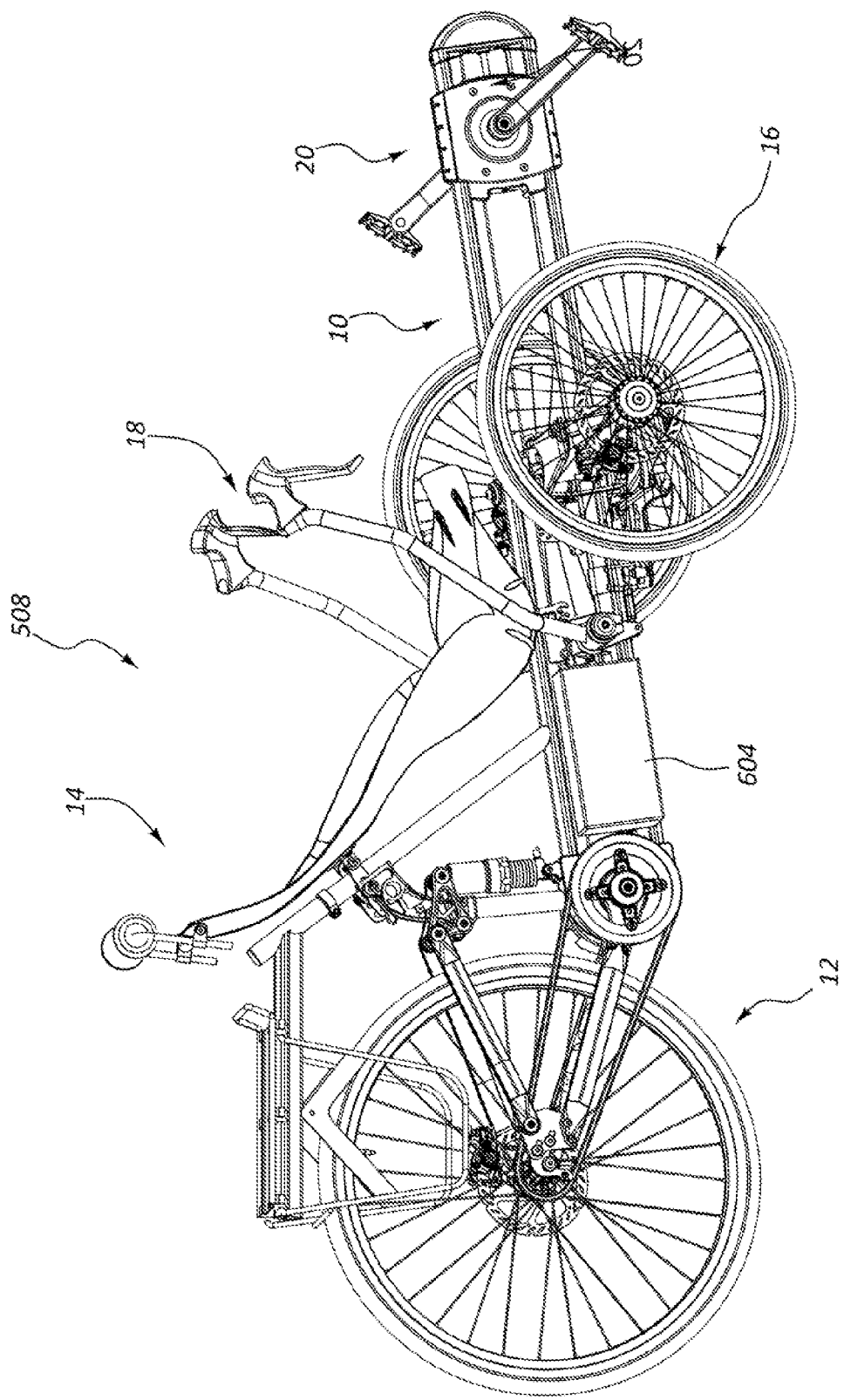

FIGS. 51-52 show another embodiment of a tadpole tricycle 508 that can be powered by a secondary power source. In this embodiment, the tadpole tricycle 508 is the same as the tadpole tricycle 8 except for the addition of the secondary power source. The secondary power source can be added without making significant changes to the tadpole tricycle 8.

In the embodiment shown in FIGS. 51-52, the tadpole tricycle includes an electric motor assembly 600, controller 602, and a battery 604. The electric motor assembly 600 is coupled to the rear transmission cover plate 28. The controller 602 and the battery 604 are coupled to opposite sides of the tubular members 34 adjacent to the rear transmission assembly 29. The battery 604 and the motor assembly 600 are coupled to opposite sides of the tubular members 34 to balance the weight.

The motor assembly 600 engages and provides power to the rear transmission assembly 29 by way of the secondary power connector 40. This configuration eliminates the need for chains and sprockets to connect the motor assembly 600 to the rear transmission assembly 29.

In this embodiment, the motor assembly 600 is included in addition to the front transmission assembly 372. It should be appreciated, however, that the motor assembly 600 can replace the front transmission assembly 372 and operate as the sole source of power. When both are included, the rider can selectively activate the motor 600 to provide additional power or driving force at any time—e.g., riding up hills or when the rider wants to rest.

The motor assembly 600 can be controlled by the controller 602 to provide enough additional power to completely drive the tadpole tricycle 508 or just enough to provide the rider with some assistance but not enough to drive the tadpole tricycle 508 alone. The motor assembly can be throttle controlled, torque sensing (senses the amount of torque—i.e., how hard the rider is pedaling—and provides power accordingly) or pedal assist (motor provides a set level of additional power above what the rider provides; may include an electronic controller that adjusts the cadence; does not provide any assistance unless the rider is pedaling).

Figure 53:
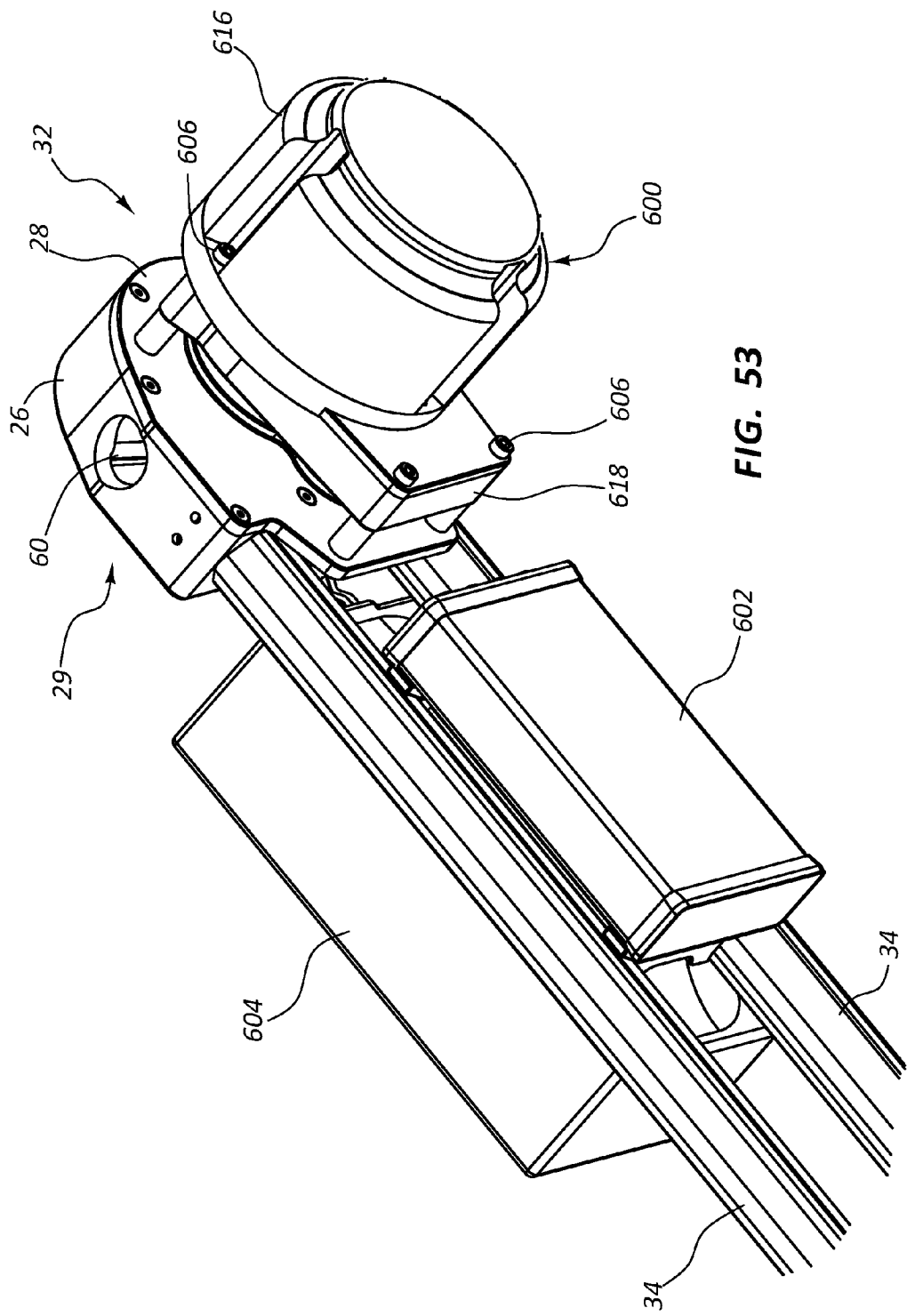
FIG. 53 shows a perspective view of the motor assembly, battery, and controller coupled to the frame assembly of the tadpole tricycle shown in FIGS. 51-52.
Figure 54:
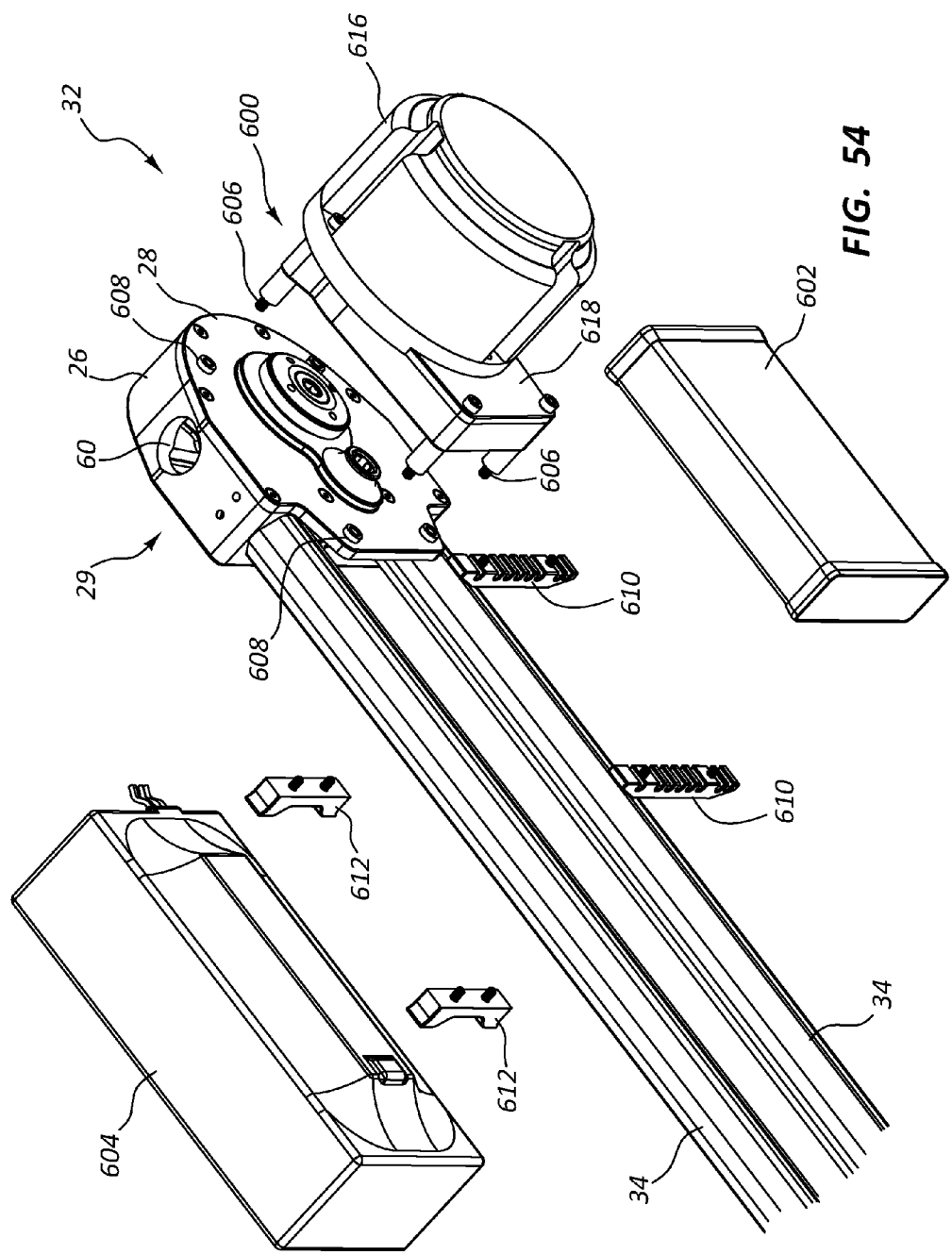
FIG. 54 shows an exploded perspective view of how the motor assembly, battery, and controller are coupled to the frame assembly of the tadpole tricycle shown in FIGS. 51-52.

FIGS. 53-54 show how the motor assembly 600, controller 602, and battery 604 are coupled to the frame assembly 10 in greater detail. The motor assembly 600 includes fasteners 606 that engage corresponding holes 608 in the rear transmission cover plate 28 using, for example, threads.

The controller 602 and the battery 604 are coupled to the tubular members 34 using complementary attachment members 610, 612, respectively. The attachment members 610, 612 are coupled together so that the tubular members 34 are compressed between top and bottom ends of the attachment members 610, 612.

In one embodiment, the battery 604 and the attachment members 612 are configured to allow the battery to be easily removed and replaced without using tools. For example, the battery 604 and the attachment members 612 can include clips and corresponding catches that the user can easily release. A quick-release configuration may be desirable in situations where the user runs out of power and needs to switch out the battery 604.

The battery 604 can be any suitable battery but preferably it is rechargeable. In one embodiment, the battery 605 is a Li-ion rechargeable battery. It should be noted that both the battery 604 and the motor assembly 600 are coupled to the frame assembly 10 near its low point. This lowers the center of gravity of the tadpole tricycle and helps make it more stable.

Figure 56:
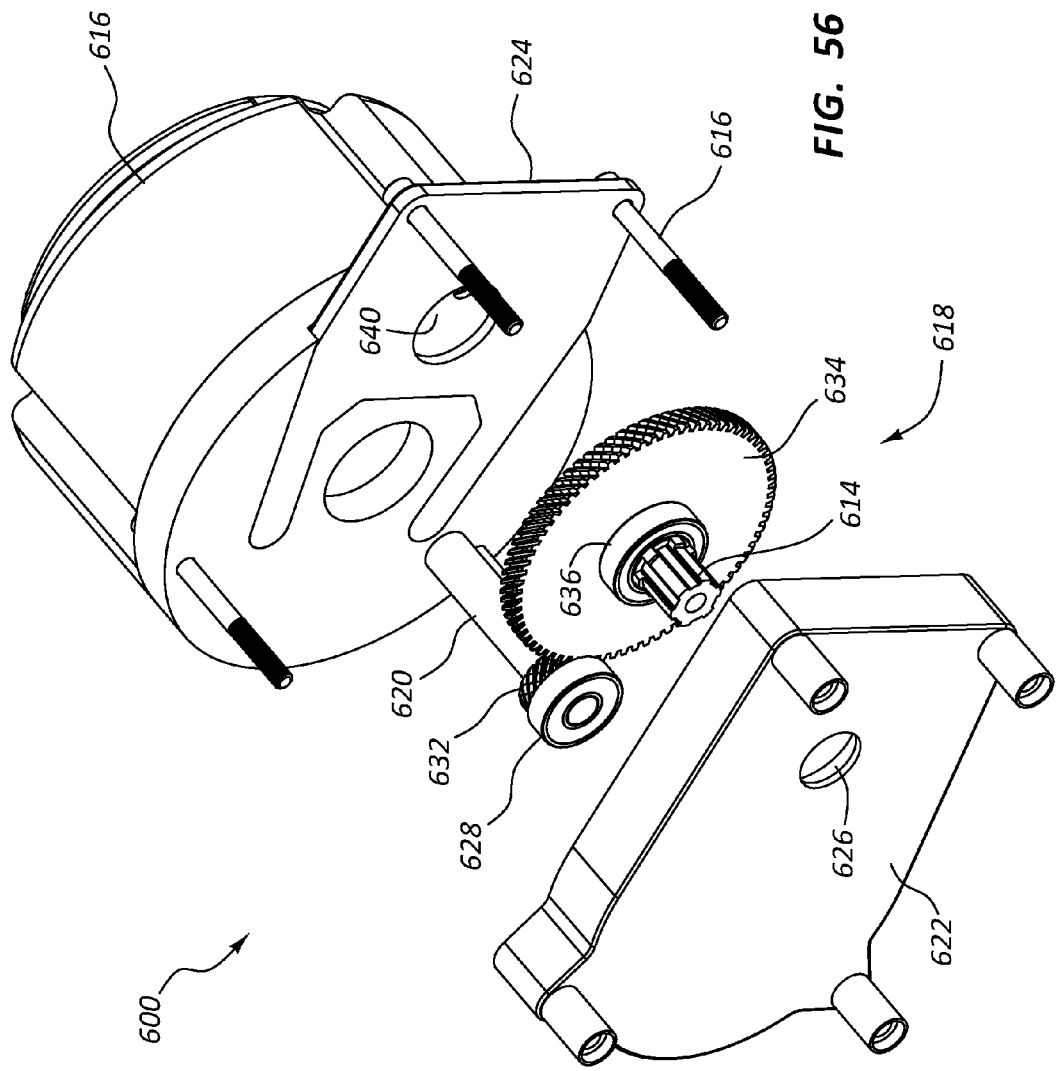

Referring to FIGS. 54 and 56, the motor assembly 600 includes an output drive shaft 614 that corresponds to and engages the hole that is the secondary power connector 40. Power from the motor assembly 600 is transferred from the output drive shaft 614 through the secondary power connector 40 into the rear transmission assembly 29.

Figure 55:
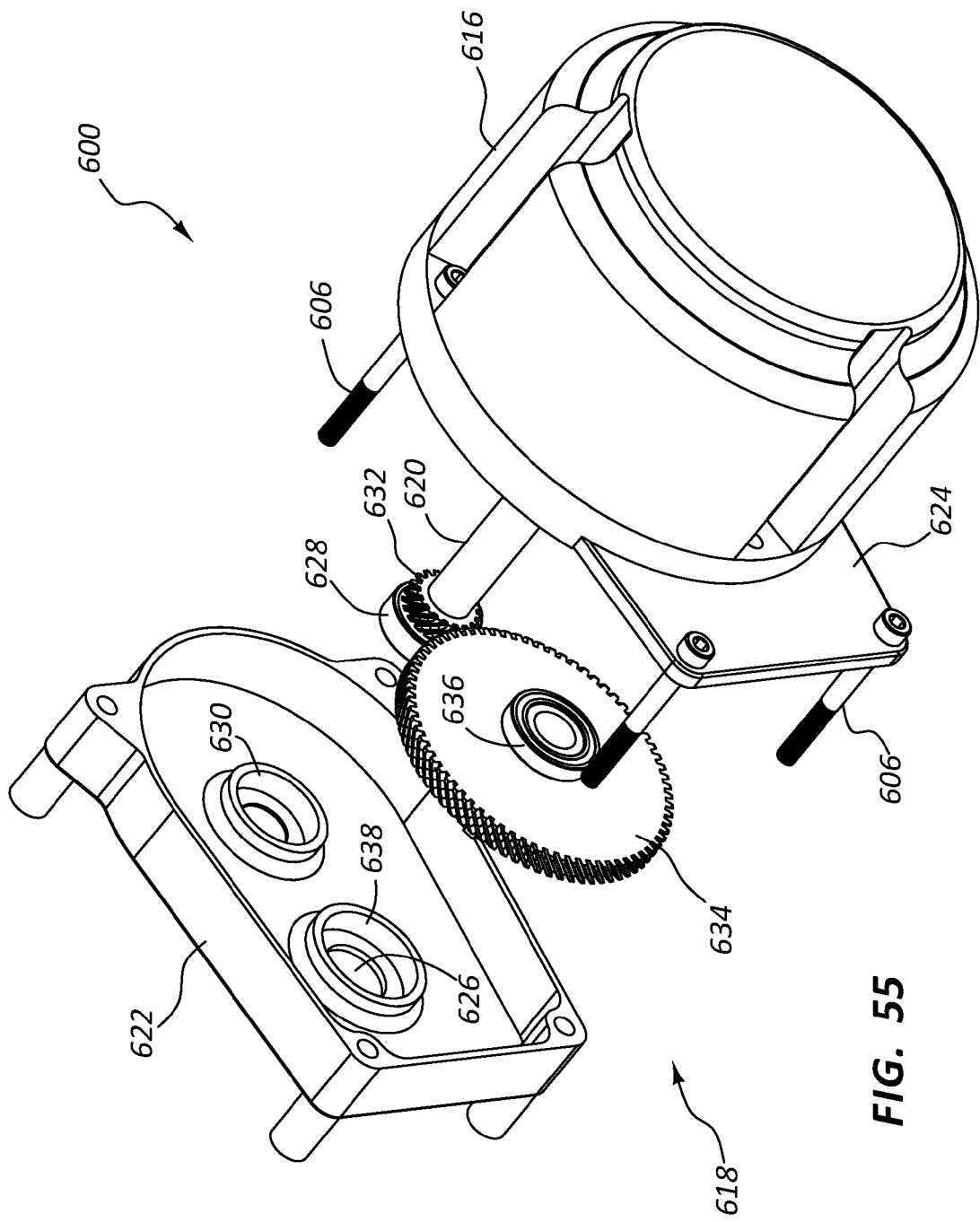
FIGS. 55-56 show exploded views of the motor assembly of the tadpole tricycle shown in FIGS. 51-52.

FIGS. 55-56 show exploded views of the electric motor assembly 600. The motor assembly 600 includes an electric motor 616 coupled to a gearbox 618. The gearbox 618 includes a base 622 and a cover 624. The output drive shaft 614 extends through a hole 626 in the base 622. It should be appreciated that the electric motor 616 and the cover 624 can be combined into an integral piece. Other changes can also be made.

The motor 616 turns a motor shaft 620 that extends out of the motor 616 and is supported on the far end by a bearing 628 that fits in a recess 630 in the base 622. Note that the recess 630 does not extend all the way through the base 622. A first gear ring 632 is coupled to and rotates with the motor shaft 620.

The first gear ring 632 engages or meshes with a second gear ring 634 coupled to the output drive shaft 614. Rotary motion of the motor shaft 620 is transferred from the first gear ring 632 to the second gear ring 634 and on to the output drive shaft 614. The gear rings 632, 634 can have any suitable configuration. In one embodiment, the gear rings 632, 634 are helical gears.

The output drive shaft 614 is supported by bearings 636 that fit within recesses 638, 640 in the base 622 and the cover 624, respectively. It should be noted that the first gear ring 632 has a significantly smaller diameter than the second gear ring 634. This makes it so the output drive shaft 614 rotates significantly slower than the motor shaft 620.

One advantage of the motor assembly 600 is that it can be added or removed from the tadpole tricycle 508 without making major modifications. This allows the user to purchase the tadpole tricycle 8 without a motor assembly 600 and then easily add it later if the user desires.

In another embodiment, the motor assembly 600 may be configured to be coupled directly to the rear axle 384. In this situation, the secondary drive assembly 49 is unnecessary. The secondary power connection 40 is a direct connection to the rear axle 384.

In this embodiment, the gearbox 618 includes one or two planetary gears that are directly in line with the motor shaft 620. The planetary gears provide the same gear reduction as the series of gears in the gearbox 618 and the secondary drive assembly 49. The output shaft engages a coupler that is part of the rear axle 384. In one embodiment, a one way gear is provided between the output shaft and the rear axle 384 and functions as the freewheel.

In addition to the above, the tadpole tricycles 8, 508 can include various shrouds to protect the rider from weather elements. For instance, a water proof or resistant and/or wind proof or resistant canopy or shroud can extend from the back of the seat 150 over the rider and surround the rider's legs. In another configuration, the shroud or canopy can extend below the legs of the rider and prevent debris from hitting the rider.

In one embodiment, a shroud is pivotably coupled to the first end 30 of the frame assembly 10. For example, the shroud may be pivotably coupled to the nose member 22 or to an area near the nose member 22. The shroud can pivot between a lowered position where it protects the rider from the wind and other elements and a raised position where the rider can easily get in and out of the seat assembly 14. The shroud can pivot at least 45 degrees, at least 60 degrees, at least 90 degrees, or more when moving between the lowered and the raised positions.

The rear portion of the shroud can be supported in the lowered position by resting it on or affirmatively coupling it to one or more supports on the frame assembly 10, the seat assembly 14, or some other structural member. For example, the rear portion of the shroud may engage pins coupled to one or more of the supports 62, 64 when in the lowered position. Other configurations of the canopy or shroud may be possible, such as, but not limited to, doors, etc.

In another embodiment, a two-wheeled bicycle can be created by modifying the design of the tadpole tricycle 8. This can be done by moving the front transmission assembly 372 back so that it is near the rear transmission assembly 29 (below and behind the seat assembly 14). The practical consequence of making this change is that the tubular members 34 are shortened.

The front wheel assembly 16 is removed and replaced with a set of handlebars and a single wheel. These components can be designed similarly to conventional, existing handlebars and front wheels used on bicycles. One or more support brackets are provided to connect the first end 30 of the shortened frame assembly 10 to another support tube that supports the handlebars. The support brackets generally extend upward from the frame assembly 10.

The seat assembly 14 is replaced with a conventional set for a bicycle, which can be mounted to the seat support 64. The seat can have any suitable configuration. In one embodiment, the seat is a banana seat. The user operates the bicycle be pedaling the front transmission assembly 372 while sitting on the seat. The front transmission assembly 372 is roughly below and slightly to the front of the seat so that it is similar to the position of the seat and pedals on a conventional bicycle. The rear wheel assembly 12 remains largely the same.

The terms used herein should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure the term shall mean," etc.).

References to specific examples, use of "i.e.," use of the word "invention," etc., are not meant to invoke exception (b) or otherwise restrict the scope of the recited terms. Other than situations where exception (b) applies, nothing contained herein should be considered a disclaimer or disavowal of claim scope.

The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the claims should be given their broadest interpretation in view of the prior art and the meaning of the terms.

As used herein, spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A tadpole tricycle comprising:
   pedals;
   a frame assembly;
   two front wheels coupled to the frame assembly;
   a rear wheel coupled to the frame assembly;
   a seat coupled to the frame assembly;
   a suspension system that allows the rear wheel to pivot relative to the frame assembly;
   a front transmission assembly, the pedals being coupled to the front transmission assembly;
   a rear transmission assembly including a gear ring; and
   a chain extending between the front transmission assembly and the rear transmission assembly and transferring motion between the front transmission assembly and the rear transmission assembly;
   wherein rotation of the rear wheel is driven by a toothed belt; and
   wherein the gear ring rotates on the same axis that rear wheel pivots on relative to the frame assembly.

2. The tadpole tricycle of claim 1 wherein the suspension system includes a shock absorber.

3. The tadpole tricycle of claim 1 wherein the toothed belt drives rotation of the rear wheel through a planetary gear.

4. The tadpole tricycle of claim 3 wherein the planetary gear is infinitely variable.

5. The tadpole tricycle of claim 1 comprising a secondary power connector configured to connect to a secondary power source.

6. The tadpole tricycle of claim 5 wherein the secondary power connector includes a hole configured to receive a shaft from an electric motor.

7. The tadpole tricycle of claim 5 wherein the rear transmission assembly includes the secondary power connector.

8. The tadpole tricycle of claim 1 comprising a front suspension system for the two front wheels.

9. The tadpole tricycle of claim 8 wherein the front suspension system is a double A-arm type suspension system.

10. The tadpole tricycle of claim 8 wherein the front suspension system includes a sway bar.

11. The tadpole tricycle of claim 1 comprising a variable speed crankset.

12. The tadpole tricycle of claim 11 wherein the crankset includes a planetary gear.

13. The tadpole tricycle of claim 11 wherein the crankset includes a single gear ring.

14. The tadpole tricycle of claim 1 wherein the chain is positioned inside tubular members.

15. The tadpole tricycle of claim 1 wherein the gear ring is enclosed in a housing.

16. The tadpole tricycle of claim 1 comprising an electric motor coupled to the rear transmission assembly, the electric motor being configured to drive rotation of the rear wheel.

17. A tadpole tricycle comprising:
pedals;
a frame assembly;
two front wheels coupled to the frame assembly;
a rear wheel coupled to the frame assembly;
a seat coupled to the frame assembly;
a suspension system that allows the rear wheel to pivot relative to the frame assembly;
a gear ring coupled to the frame assembly, the gear ring driving rotation of the rear wheel using a toothed belt;
a front transmission assembly, the pedals being coupled to the front transmission assembly;
a rear transmission assembly including the gear ring; and
a chain extending between and transferring motion from the front transmission assembly and the rear transmission assembly;
wherein the gear ring rotates on the same axis that the rear wheel pivots around.

18. The tadpole tricycle of claim 17 wherein the suspension system includes a shock absorber.

19. The tadpole tricycle of claim 17 wherein the toothed belt drives rotation of the rear wheel through a planetary gear.

20. The tadpole tricycle of claim 19 wherein the planetary gear is infinitely variable.

21. The tadpole tricycle of claim 17 comprising a secondary power connector configured to connect to a secondary power source.

22. The tadpole tricycle of claim 21 wherein the secondary power connector includes a hole configured to receive a shaft from an electric motor.

23. The tadpole tricycle of claim 21 wherein the rear transmission assembly includes the secondary power connector.

24. The tadpole tricycle of claim 17 comprising a front suspension system for the two front wheels.

25. The tadpole tricycle of claim 24 wherein the front suspension system is a double A-arm type suspension system.

26. The tadpole tricycle of claim 24 wherein the front suspension system includes a sway bar.

27. The tadpole tricycle of claim 17 comprising a variable speed crankset.

28. The tadpole tricycle of claim 27 wherein the crankset includes a planetary gear.

29. The tadpole tricycle of claim 27 wherein the crankset includes a single gear ring.

30. The tadpole tricycle of claim 17 wherein the chain is positioned inside tubular members.

31. The tadpole tricycle of claim 17 wherein the gear ring is enclosed in a housing.

32. The tadpole tricycle of claim 17 comprising an electric motor coupled to the rear transmission assembly, the electric motor being configured to drive rotation of the rear wheel.

\* \* \* \* \*